United States Patent

Kunimoto et al.

[11] Patent Number: 6,094,433
[45] Date of Patent: Jul. 25, 2000

[54] ATM SWITCHING NETWORK AND ATM SWITCHING SYSTEM IN WHICH THE TRANSFER OF INPUTTED CELLS IS CONTROLLED BY CONTROL CELLS, AND SIGNAL PROCESSING METHOD IN ATM SWITCHING NETWORK

[75] Inventors: Masao Kunimoto, Fujisawa; Kenji Kawakita, Urawa; Shinichi Iwaki, Kamakura; Satoshi Shimizu, Yokohama, all of Japan

[73] Assignee: Hitachi, Ltd., Tokyo, Japan

[21] Appl. No.: 08/568,359

[22] Filed: Dec. 6, 1995

[30] Foreign Application Priority Data

| Dec. 7, 1994 | [JP] | Japan | 6-303344 |
| Mar. 3, 1995 | [JP] | Japan | 7-043929 |
| Jun. 12, 1995 | [JP] | Japan | 7-144796 |

[51] Int. Cl.$^7$ ........................................ H04L 12/56
[52] U.S. Cl. .................. 370/397; 370/409; 370/410; 370/419; 370/469
[58] Field of Search .................. 370/217–219, 370/248–250, 242, 244, 395–401, 409, 410, 468, 469, 419, 420, 463, 522, 528; 709/249

[56] References Cited

U.S. PATENT DOCUMENTS

| 5,214,642 | 5/1993 | Kunimoto et al. | 370/397 |
| 5,432,777 | 7/1995 | Le Boudec et al. | 370/397 |
| 5,461,607 | 10/1995 | Miyagi et al. | 370/244 |
| 5,477,598 | 12/1995 | Takatori et al. | 370/399 |
| 5,550,821 | 8/1996 | Akiyoshi | 370/397 |
| 5,600,630 | 2/1997 | Takano et al. | 370/218 |
| 5,627,821 | 5/1997 | Miyagi | 370/242 |
| 5,659,540 | 8/1997 | Chen et al. | 370/249 |
| 5,734,652 | 3/1998 | Kwok | 370/395 |

FOREIGN PATENT DOCUMENTS

| 94-27425 | 12/1994 | Rep. of Korea . |
| 95-7340 | 3/1995 | Rep. of Korea . |

OTHER PUBLICATIONS

ITU–T Recommendation I.361 B–ISDN ATM Layer Specification (standard), Mar. 1993.

*Primary Examiner*—Seema S. Rao
*Attorney, Agent, or Firm*—Antonelli, Terry, Stout & Kraus, LLP

[57] ABSTRACT

A signal processing method for an ATM switching network formed by connecting a plurality of ATM switching networks in which header conversion tables of line interfaces can be rewritten by control cells, includes in response to occurrence of an abnormality in a call control processor of a ATM switching system A, informing an ATM switching system B of the occurrence of the abnormality, transferring call control information in the ATM switching system A to the ATM switching system B, rewriting header conversion tables included in a plurality of line interfaces of the ATM switching system A by using control cells generated by the ATM switching system A and thereby transferring signal channel cells arriving at the ATM switching system A after occurrence of the abnormality to the ATM switching system B, and rewriting header conversion tables included in a plurality of line interfaces of the ATM switching system A by using control cells generated by the ATM switching system B and thereby making a call control processor of the ATM switching system B effect route control of information channel cells within the ATM switching system A.

36 Claims, 37 Drawing Sheets

ORDINARY CELL
(SIGNAL CELL AND INFORMATION CELL)

CONTROL CELL

FIG. 8

| INPUT CELL HEADER (INPUT VPI,VCI) | OUTPUT ROUTE INFORMATION | OUTPUT CELL HEADER (OUTPUT VPI,VCI) | |
|---|---|---|---|
| | — | — | |
| (0,5) → | IN i → OUT15 | (0,i) | ... SIGNAL CELL FROM ATM TERMINAL "a" (TO BE TRANSFERRED TO SIGNAL PROCESSOR 1) |
| | — | — | |
| (0,10) → | IN i → OUT j | (0,12) | ... INFORMATION CELL FROM ATM TERMINAL "a" (TO BE TRANSFERRED TO LIF 10-j (TERMINAL "b")) |
| | — | — | |
| (91,i) → | IN i → OUT15 | (91,i) | ... CONTROL CELL TRANSMITTED BY LIF 10-i (TO BE TRANSFERRED TO SIGNAL PROCESSOR 1) |
| | — | — | |

HEADER CONVERSION TABLE 211-i
(AFTER COMPLETION OF STEP 640)

FIG. 9

| INPUT CELL HEADER (INPUT VPI,VCI) | OUTPUT ROUTE INFORMATION | OUTPUT CELL HEADER (OUTPUT VPI,VCI) | |
|---|---|---|---|
| | — | — | |
| (0,5) → | IN j → OUT15 | (0,j) | ... SIGNAL CELL FROM ATM TERMINAL "b" (TO BE TRANSFERRED TO SIGNAL PROCESSOR 1) |
| | — | — | |
| (0,12) → | IN j → OUT i | (0,10) | ... INFORMATION CELL FROM ATM TERMINAL "b" (TO BE TRANSFERRED TO LIF 10-i (TERMINAL "a")) |
| | — | — | |
| (91,j) → | IN j → OUT15 | (91,j) | ... CONTROL CELL TRANSMITTED BY LIF 10-j (TO BE TRANSFERRED TO SIGNAL PROCESSOR 1) |
| | — | — | |

HEADER CONVERSION TABLE 211-j
(AFTER COMPLETION OF STEP 640)

FIG. 12

| INPUT CELL HEADER (INPUT VPI,VCI) | OUTPUT ROUTE INFORMATION | OUTPUT CELL HEADER (OUTPUT VPI,VCI) |
|---|---|---|
| | — | — |
| (0,5) → | IN i → OUT15 | (0,i) |
| | — | — |
| (91,i) → | IN i → OUT15 | (91,i) |
| | — | — |

HEADER CONVERSION TABLE 211-iA
(AFTER INITIALIZATION)

... SIGNAL CELL FROM ATM TERMINAL "a"
(TO BE TRANSFERRED TO SIGNAL PROCESSOR 1A)

... CONTROL CELL TRANSMITTED BY LIF 10-iA
(TO BE TRANSFERRED TO SIGNAL PROCESSOR 1A)

FIG. 13

| INPUT CELL HEADER (INPUT VPI,VCI) | OUTPUT ROUTE INFORMATION | OUTPUT CELL HEADER (OUTPUT VPI,VCI) |
|---|---|---|
| | — | — |
| (0,5) → | IN j → OUT15 | (0,j) |
| | — | — |
| (91,j) → | IN j → OUT15 | (91,j) |
| | — | — |

HEADER CONVERSION TABLE 211-jA
(AFTER INITIALIZATION)

... SIGNAL CELL FROM ATM SWITCHING SYSTEM 2B
(TO BE TRANSFERRED TO SIGNAL PROCESSOR 1A)

... CONTROL CELL TRANSMITTED BY LIF 10-jA
(TO BE TRANSFERRED TO SIGNAL PROCESSOR 1A)

FIG. 14

| INPUT CELL HEADER (INPUT VPI,VCI) | OUTPUT ROUTE INFORMATION | OUTPUT CELL HEADER (OUTPUT VPI,VCI) |
|---|---|---|
| | — | — |
| (0,5) → | IN1 → OUT15 | (0,1) |
| | — | — |
| (91,1) → | IN1 → OUT15 | (91,1) |
| | — | — |

HEADER CONVERSION TABLE 211-1B
(AFTER INITIALIZATION)

... SIGNAL CELL FROM ATM SWITCHING SYSTEM 2A
(TO BE TRANSFERRED TO SIGNAL PROCESSOR 1B)

... CONTROL CELL TRANSMITTED BY LIF 10-1B
(TO BE TRANSFERRED TO SIGNAL PROCESSOR 1B)

FIG. 15

| INPUT CELL HEADER (INPUT VPI,VCI) | OUTPUT ROUTE INFORMATION | OUTPUT CELL HEADER (OUTPUT VPI,VCI) | |
|---|---|---|---|
| | — | — | |
| (0,5) → | IN i → OUT j | (1,i) | ... SIGNAL CELL FROM ATM TERMINAL "a" (TO BE TRANSFERRED TO ATM SWITCHING SYSTEM 2B) |
| | — | — | |
| (91,i) → | IN i → OUT j | (93,i) | ... CONTROL CELL TRANSMITTED BY LIF 10-iA (TO BE TRANSFERRED TO ATM SWITCHING SYSTEM 2B) |
| | — | — | |

HEADER CONVERSION TABLE 211-iA
(AFTER COMPLETION OF STEP 430)

FIG. 16

| INPUT CELL HEADER (INPUT VPI,VCI) | OUTPUT ROUTE INFORMATION | OUTPUT CELL HEADER (OUTPUT VPI,VCI) | |
|---|---|---|---|
| | — | — | |
| (0,5) → | IN j → OUT15 | (0,j) | ... SIGNAL CELL FROM ATM SWITCHING SYSTEM 2B (TO BE TRANSFERRED TO SIGNAL PROCESSOR 1A) |
| | — | — | |
| (1,1) → | IN j → OUT1 | (0,5) | ⎫ ... SIGNAL CELLS FROM ATM SWITCHING SYSTEM 2B (TO BE TRANSFERRED TO RESPECTIVE LIFS (TERMINALS)) |
| ⋮ | ⋮ | ⋮ | |
| (1,j-1) → | IN j → OUT j-1 | (0,5) | ⎭ |
| | — | — | |
| (91,j) → | IN j → OUT j | (93,j) | ... CONTROL CELL TRANSMITTED BY LIF 10-jA (TO BE TRANSFERRED TO ATM SWITCHING SYSTEM 2B) |
| | — | — | |
| (92,1) → | IN j → OUT1 | (90,1) | ⎫ ... CONTROL CELLS FROM ATM SWITCHING SYSTEM 2B (TO BE TRANSFERRED TO RESPECTIVE LIFS) |
| ⋮ | ⋮ | ⋮ | |
| (92,j) → | IN j → OUT j | (90,j) | ⎭ |
| | — | — | |

HEADER CONVERSION TABLE 211-jA
(AFTER COMPLETION OF STEP 430)

FIG. 17

| INPUT CELL HEADER (INPUT VPI,VCI) | OUTPUT ROUTE INFORMATION | OUTPUT CELL HEADER (OUTPUT VPI,VCI) | |
|---|---|---|---|
| | — | — | |
| (0,5) → | IN1 → OUT15 | (0,1) | ... SIGNAL CELL FROM ATM SWITCHING SYSTEM 2A (TO BE TRANSFERRED TO SIGNAL PROCESSOR 1B) |
| | — | — | |
| (1,1) → | IN1 → OUT15 | (1,1) | ... SIGNAL CELLS TRANSFERRED FROM ATM SWITCHING SYSTEM 2A (TO BE TRANSFERRED TO SIGNAL PROCESSOR 1B) |
| ⋮ | ⋮ | ⋮ | |
| (1,j-1) → | IN1 → OUT15 | (1,j-1) | |
| | — | — | |
| (91,1) → | IN1 → OUT15 | (91,1) | ... CONTROL CELL TRANSMITTED BY LIF 10-1B (TO BE TRANSFERRED TO SIGNAL PROCESSOR 1B) |
| | — | — | |
| (93,1) → | IN1 → OUT15 | (93,1) | ... CONTROL CELLS FROM RESPECTIVE LIFS OF ATM SWITCHING SYSTEM 2A (TO BE TRANSFERRED TO SIGNAL PROCESSOR 1B) |
| ⋮ | ⋮ | ⋮ | |
| (93,j) → | IN1 → OUT15 | (93,j) | |
| | — | — | |

HEADER CONVERSION TABLE 211-1B
(AFTER COMPLETION OF STEP 440)

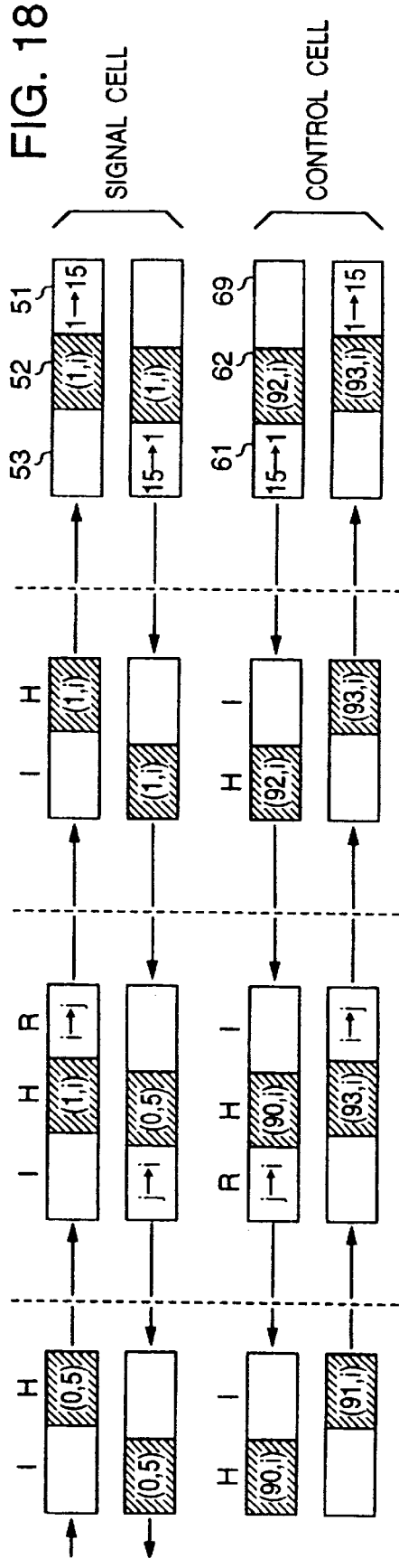
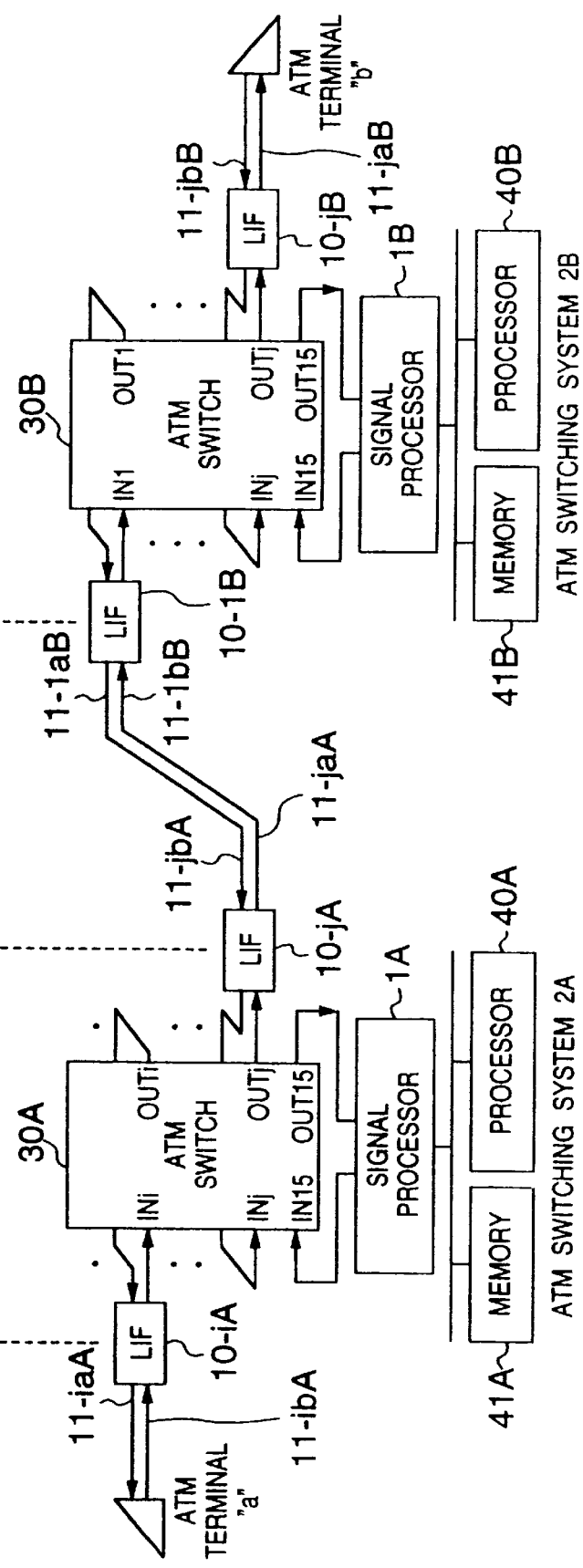
FIG. 18

FIG. 19

| INPUT CELL HEADER (INPUT VPI,VCI) | OUTPUT ROUTE INFORMATION | OUTPUT CELL HEADER (OUTPUT VPI,VCI) | |
|---|---|---|---|
| | — | — | |
| (0,5) → | IN i → OUT j | (1,i) | ... SIGNAL CELL FROM ATM TERMINAL "a" (TO BE TRANSFERRED TO ATM SWITCHING SYSTEM 2B) |
| | — | — | |
| (0,10) → | IN i → OUT j | (0,11) | ... INFORMATION CELL FROM ATM TERMINAL "a" (TO BE TRANSFERRED TO ATM SWITCHING SYSTEM 2B) |
| | — | — | |
| (91,i) → | IN i → OUT j | (93,i) | ... CONTROL CELL TRANSMITTED BY LIF 10-1A (TO BE TRANSFERRED TO ATM SWITCHING SYSTEM 2B) |
| | — | — | |

HEADER CONVERSION TABLE 211-iA
(AFTER ESTABLISHMENT OF INFORMATION CHANNEL)

FIG. 20

| INPUT CELL HEADER (INPUT VPI,VCI) | OUTPUT ROUTE INFORMATION | OUTPUT CELL HEADER (OUTPUT VPI,VCI) | |
|---|---|---|---|
| | — | — | |
| (0,5) → | IN j → OUT15 | (0,j) | ... SIGNAL CELL FROM ATM SWITCHING SYSTEM 2B (TO BE TRANSFERRED TO SIGNAL PROCESSOR 1A) |
| | — | — | |
| (0,11) → | IN j → OUT i | (0,10) | ... INFORMATION CELL FROM ATM TERMINAL "b" (TO BE TRANSFERRED TO LIF 10-iA (ATM TERMINAL "a")) |
| | — | — | |
| (1,1) → | IN j → OUT1 | (0,5) | ⎫ |
| ⋮ | ⋮ | ⋮ | ⎬ ... SIGNAL CELLS FROM ATM SWITCHING SYSTEM 2B (TO BE TRANSFERRED TO RESPECTIVE LIFS (TERMINALS)) |
| (1,j-1) → | IN j → OUT j-1 | (0,5) | ⎭ |
| | — | — | |
| (91,j) → | IN j → OUT j | (93,j) | ... CONTROL CELL TRANSMITTED BY LIF 10-jA (TO BE TRANSFERRED TO ATM SWITCHING SYSTEM 2B) |
| | — | — | |
| (92,1) → | IN j → OUT1 | (90,1) | ⎫ |
| ⋮ | ⋮ | ⋮ | ⎬ ... CONTROL CELLS FROM ATM SWITCHING SYSTEM 2B (TO BE TRANSFERRED TO RESPECTIVE LIFS) |
| (92,j) → | IN j → OUT j | (90,j) | ⎭ |
| | — | — | |

HEADER CONVERSION TABLE 211-jA
(AFTER ESTABLISHMENT OF INFORMATION CHANNEL)

FIG. 21

| INPUT CELL HEADER (INPUT VPI,VCI) | OUTPUT ROUTE INFORMATION | OUTPUT CELL HEADER (OUTPUT VPI,VCI) | |
|---|---|---|---|
| | — | — | |
| (0,5) → | IN1 → OUT15 | (0,1) | … SIGNAL CELL FROM ATM SWITCHING SYSTEM 2A (TO BE TRANSFERRED TO SIGNAL PROCESSOR 1B) |
| | — | — | |
| (0,11) → | IN1 → OUT j | (0,12) | … INFORMATION CELL FROM ATM TERMINAL "a" (TO BE TRANSFERRED TO ATM TERMINAL "b") |
| | — | — | |
| (1,1) → | IN1 → OUT15 | (1,1) | … SIGNAL CELLS TRANSFERRED FROM ATM SWITCHING SYSTEM 2A (TO BE TRANSFERRED TO SIGNAL PROCESSOR 1B) |
| ⋮ | ⋮ | ⋮ | |
| (1,j-1) → | IN1 → OUT15 | (1,j-1) | |
| | — | — | |
| (91,1) → | IN1 → OUT15 | (91,1) | … CONTROL CELL TRANSMITTED BY LIF 10-1B (TO BE TRANSFERRED TO SIGNAL PROCESSOR 1B) |
| | — | — | |
| (93,1) → | IN1 → OUT15 | (93,1) | … CONTROL CELLS FROM RESPECTIVE LIFS OF ATM SWITCHING SYSTEM 2A (TO BE TRANSFERRED TO SIGNAL PROCESSOR 1B) |
| ⋮ | ⋮ | ⋮ | |
| (93,j) → | IN1 → OUT15 | (93,j) | |
| | — | — | |

HEADER CONVERSION TABLE 211-1B
(AFTER ESTABLISHMENT OF INFORMATION CHANNEL)

FIG. 22

| INPUT CELL HEADER (INPUT VPI,VCI) | OUTPUT ROUTE INFORMATION | OUTPUT CELL HEADER (OUTPUT VPI,VCI) | |
|---|---|---|---|
| | — | — | |
| (0,5) → | IN j → OUT15 | (0,j) | … SIGNAL CELL FROM ATM TERMINAL "b" (TO BE TRANSFERRED TO SIGNAL PROCESSOR 1B) |
| | — | — | |
| (0,12) → | IN j → OUT1 | (0,11) | … INFORMATION CELL FROM ATM TERMINAL "b" (TO BE TRANSFERRED TO ATM SWITCHING SYSTEM 2A) |
| | — | — | |
| (91,j) → | IN j → OUT15 | (91,j) | … CONTROL CELL TRANSMITTED BY LIF 10-jB (TO BE TRANSFERRED TO SIGNAL PROCESSOR 1B) |
| | — | — | |

HEADER CONVERSION TABLE 211-jB
(AFTER ESTABLISHMENT OF INFORMATION CHANNEL)

FIG. 25

| INPUT CELL HEADER (INPUT VPI,VCI) | OUTPUT ROUTE INFORMATION | OUTPUT CELL HEADER (OUTPUT VPI,VCI) |
|---|---|---|
| | — | — |
| (0,5) → | IN i → OUT j | (1,i) |
| | — | — |
| (91,i) → | IN i → OUT j | (93,i) |
| | — | — |

HEADER CONVERSION TABLE 211-iA
(AFTER COMPLETION OF STEP 540)

... SIGNAL CELL FROM ATM TERMINAL "a"
(TO BE TRANSFERRED TO ATM SWITCHING SYSTEM 28)

... CONTROL CELL TRANSMITTED BY LIF 10-iA
(TO BE TRANSFERRED TO ATM SWITCHING SYSTEM 28)

FIG. 26

| INPUT CELL HEADER (INPUT VPI,VCI) | OUTPUT ROUTE INFORMATION | OUTPUT CELL HEADER (OUTPUT VPI,VCI) |
|---|---|---|
| | — | — |
| (0,5) → | IN i+1 → OUT15 | (0,i+1) |
| | — | — |
| (91,i+1) → | IN i+1 → OUT15 | (91,i+1) |
| | — | — |

HEADER CONVERSION TABLE 211-(i+1)A
(AFTER COMPLETION OF STEP 540)

... SIGNAL CELL FROM ATM TERMINAL "a"
(TO BE TRANSFERRED TO SIGNAL PROCESSOR 1A)

... CONTROL CELL TRANSMITTED BY LIF 10-(i+1)A
(TO BE TRANSFERRED TO SIGNAL PROCESSOR 1A)

FIG. 27

| INPUT CELL HEADER (INPUT VPI,VCI) | OUTPUT ROUTE INFORMATION | OUTPUT CELL HEADER (OUTPUT VPI,VCI) | |
|---|---|---|---|
| | — | — | |
| (0,5) → | IN j → OUT15 | (0,j) | ... SIGNAL CELL FROM ATM SWITCHING SYSTEM 2B (TO BE TRANSFERRED TO SIGNAL PROCESSOR 1A) |
| | — | — | |
| (1,1) → | IN j → OUT1 | (0,5) | ⎫ ... SIGNAL CELLS FROM ATM SWITCHING SYSTEM 2B (TO BE TRANSFERRED TO RESPECTIVE LIFS (TERMINALS)) |
| ⋮ | ⋮ | ⋮ | |
| (1,i) → | IN j → OUT i | (0,5) | ⎭ |
| | — | — | |
| (91,j) → | IN j → OUT15 | (91,j) | ... CONTROL CELL TRANSMITTED BY LIF 10-jA (TO BE TRANSFERRED TO SIGNAL PROCESSOR 1A) |
| | — | — | |
| (92,1) → | IN j → OUT1 | (90,1) | ⎫ ... CONTROL CELLS FROM ATM SWITCHING SYSTEM 2B (TO BE TRANSFERRED TO RESPECTIVE LIFS) |
| ⋮ | ⋮ | ⋮ | |
| (92,i) → | IN j → OUT i | (90,i) | ⎭ |
| | — | — | |

HEADER CONVERSION TABLE 211-jA
(AFTER COMPLETION OF STEP 540)

FIG. 28

| INPUT CELL HEADER (INPUT VPI,VCI) | OUTPUT ROUTE INFORMATION | OUTPUT CELL HEADER (OUTPUT VPI,VCI) | |
|---|---|---|---|
| | — | — | |
| (0,5) → | IN1 → OUT15 | (0,1) | ... SIGNAL CELL FROM ATM SWITCHING SYSTEM 2A (TO BE TRANSFERRED TO SIGNAL PROCESSOR 1B) |
| | — | — | |
| (1,1) → | IN1 → OUT15 | (1,1) | ... SIGNAL CELLS TRANSFERRED FROM ATM SWITCHING SYSTEM 2A (TO BE TRANSFERRED TO SIGNAL PROCESSOR 1B) |
| ⋮ | ⋮ | ⋮ | |
| (1,i) → | IN1 → OUT15 | (1,i) | |
| | — | — | |
| (91,1) → | IN1 → OUT15 | (91,1) | ... CONTROL CELL TRANSMITTED BY LIF 10-1B (TO BE TRANSFERRED TO SIGNAL PROCESSOR 1B) |
| | — | — | |
| (93,1) → | IN1 → OUT15 | (93,1) | ... CONTROL CELLS FROM RESPECTIVE LIFS OF ATM SWITCHING SYSTEM 2A (TO BE TRANSFERRED TO SIGNAL PROCESSOR 1B) |
| ⋮ | ⋮ | ⋮ | |
| (93,i) → | IN1 → OUT15 | (93,i) | |
| | — | — | |

HEADER CONVERSION TABLE 211-1B
(AFTER COMPLETION OF STEP 550)

FIG. 33

| INPUT CELL HEADER (INPUT VPI,VCI) | OUTPUT ROUTE INFORMATION | OUTPUT CELL HEADER (OUTPUT VPI,VCI) | |
|---|---|---|---|
| | — | — | |
| (0,5) → | IN i → OUT j | (0,i) | … SIGNAL CELL FROM LINE 11-ib (TO BE TRANSFERRED TO SIGNAL PROCESSOR 1'-1) |
| | — | — | |
| (91,i) → | IN i → OUT j | (91,i) | … CONTROL CELL TRANSMITTED BY LIF 10-i (TO BE TRANSFERRED TO SIGNAL PROCESSOR 1'-1) |
| | — | — | |

HEADER CONVERSION TABLE 211-i

FIG. 34

| INPUT CELL HEADER (INPUT VPI,VCI) | OUTPUT ROUTE INFORMATION | OUTPUT CELL HEADER (OUTPUT VPI,VCI) | |
|---|---|---|---|
| | — | — | |
| (0,5) → | IN j-2 → OUT j-1 | (0,j-2) | … SIGNAL CELL FROM LINE 11-(j-2)b (TO BE TRANSFERRED TO SIGNAL PROCESSOR 1'-2) |
| | — | — | |
| (91,j-2) → | IN j-2 → OUT j-1 | (91,j-2) | … CONTROL CELL TRANSMITTED BY LIF 10-(j-2) (TO BE TRANSFERRED TO SIGNAL PROCESSOR 1'-2) |
| | — | — | |

HEADER CONVERSION TABLE 211-(j-2)

FIG. 35

| INPUT CELL HEADER (INPUT VPI,VCI) | OUTPUT ROUTE INFORMATION | OUTPUT CELL HEADER (OUTPUT VPI,VCI) | |
|---|---|---|---|
| | — | — | |
| (0,i+1) → | IN j → OUT i+1 | (0,5) | ⎫ ... SIGNAL CELLS (TO BE TRANSFERRED TO RESPECTIVE LIFS (TERMINALS)) |
| ⋮ | ⋮ | ⋮ | |
| (0,j-2) → | IN j → OUT j-2 | (0,5) | ⎭ |
| | — | — | |
| (90,i+1) → | IN j → OUT i+1 | (90,i+1) | ⎫ ... CONTROL CELLS (TO BE TRANSFERRED TO RESPECTIVE LIFS) |
| ⋮ | ⋮ | ⋮ | |
| (90,j-2) → | IN j → OUT j-2 | (90,j-2) | ⎭ |
| (90,j-1) → | IN j → OUT j-1 | (90,j-1) | ... CONTROL CELL (DERECTED TO ITS OWN LIF) |
| | — | — | |
| (91,j-1) → | IN j → OUT j-1 | (91,j-1) | ... CONTROL CELL TRANSMITTED BY LIF 10-(j-1) (TO BE TRANSFERRED TO SIGNAL PROCESSOR 1'-2) |
| | — | — | |

HEADER CONVERSION TABLE 211-(j-1)

FIG. 36

| INPUT CELL HEADER (INPUT VPI,VCI) | OUTPUT ROUTE INFORMATION | OUTPUT CELL HEADER (OUTPUT VPI,VCI) | |
|---|---|---|---|
| | — | — | |
| (0,1) → | IN j → OUT1 | (0,5) | ⎫ ... SIGNAL CELLS (TO BE TRANSFERRED TO RESPECTIVE LIFS (TERMINALS)) |
| ⋮ | ⋮ | ⋮ | |
| (0,i) → | IN j → OUT i | (0,5) | ⎭ |
| | — | — | |
| (90,1) → | IN j → OUT1 | (90,1) | ⎫ ... CONTROL CELLS (TO BE TRANSFERRED TO RESPECTIVE LIFS) |
| ⋮ | ⋮ | ⋮ | |
| (90,i) → | IN j → OUT i | (90,i) | ⎭ |
| | — | — | |
| (90,j) → | IN j → OUT j | (90,j) | ... CONTROL CELL (DERECTED TO ITS OWN LIF) |
| | — | — | |
| (91,j) → | IN j → OUT j | (91,j) | ... CONTROL CELL TRANSMITTED BY LIF 10-j (TO BE TRANSFERRED TO SIGNAL PROCESSOR 1'-1) |
| | — | — | |

HEADER CONVERSION TABLE 211-j

FIG. 38

| INPUT CELL HEADER (INPUT VPI,VCI) | OUTPUT ROUTE INFORMATION | OUTPUT CELL HEADER (OUTPUT VPI,VCI) | |
|---|---|---|---|
| | — | — | |
| (0,1) → | IN j → OUT1 | (0,5) | ⎫ ... SIGNAL CELLS (TO BE TRANSFERRED TO RESPECTIVE LIFS (TERMINALS)) |
| ⋮ | ⋮ | ⋮ | |
| (0,j-1) → | IN j → OUT j-1 | (0,5) | ⎭ |
| | — | — | |
| (90,1) → | IN j → OUT1 | (90,1) | ⎫ ... CONTROL CELLS (TO BE TRANSFERRED TO RESPECTIVE LIFS) |
| ⋮ | ⋮ | ⋮ | |
| (90,j-1) → | IN j → OUT j-1 | (90,j-1) | ⎭ |
| (90,j) → | IN j → OUT j | (90,j) | ... CONTROL CELL (DERECTED TO ITS OWN LIF) |
| | — | — | |
| (91,j) → | IN j → OUT j | (91,j) | ... CONTROL CELL TRANSMITTED BY LIF 10-j (TO BE TRANSFERRED TO SIGNAL PROCESSOR 1'-1) |
| | — | — | |

HEADER CONVERSION TABLE 211-j

ATM SWITCHING NETWORK AND ATM SWITCHING SYSTEM IN WHICH THE TRANSFER OF INPUTTED CELLS IS CONTROLLED BY CONTROL CELLS, AND SIGNAL PROCESSING METHOD IN ATM SWITCHING NETWORK

BACKGROUND OF THE INVENTION

The present invention relates to packet switching systems and network configurations, and in particular to an apparatus and a network configuration suitable for signal processing in asynchronous transfer mode (ATM) switching networks for switching fixed length packets.

Currently, in ITU-T (International Telecommunication Union—Telecommunication standardization sector), standardization works of various recommendations for implementing the Broadband ISDN are under way. The Broadband ISDN aims at providing service with a line rate of 156 Mbits/sec, for example, to users by adopting an ATM switching method.

As for a method for implementing signal processing in switching systems implementing the ATM switching method (hereafter referred to as ATM switching systems), a method described in U.S. Pat. No. 5,214,642 is known. According to this method, signal processing is implemented by connecting subscriber lines and trunks to a signal processor via an ATM switch. Since the signal processor is shared by a plurality of subscriber lines and trunks via the ATM switch, an economical ATM switching system is implemented.

As for the ATM switching system for implementing the Broadband ISDN, signals of a large number of users undergo high speed processing and consequently a system of high reliability is needed. As a measure for maintaining communication in the event of a failure of a part of the ATM switching system, therefore, reliability improvement such as a conventionally known redundant configuration in the switching system is attempted as represented by "duplication," for example. In the "duplicated" configuration, functional blocks forming the ATM switching system, such as the switch, signal processor and processor, are duplicated block by block. In the case where one of the duplicated blocks fails, switchover to the other is conducted. Even when a fault has occurred, therefore, the normal state is quickly restored.

Furthermore, in the conventional ATM switching system, a signal processor is installed for each ATM switching system and a function of setting/releasing an information channel in response to a request from a user is implemented. The SVC (Signalling Virtual Channel) function is thus implemented.

In the conventional known ATM switching network, contrivances have been effected. For example, the signal processor is shared in the ATM switching system. Configuring the ATM switching network with due regard to securement of reliability and provision of a wide variety of communication services causes complicated configurations of switching systems and the whole network because of adoption of redundant configurations, resulting in an increased cost. As for the process of spread of the Broadband ISDN, large-scale switching networks forming a trunk line network having a large capacity are introduced at the beginning in the same way as the process of construction of the conventional networks. In this case, however, the number of subscribers subject to signal processing is very large. Even if there is a cost increase as described above, therefore, the cost increase per subscriber is suppressed to a relatively small value and consequently no problems are posed. When introduction of the Broadband ISDN has finally advanced to introduction thereof to small-sized communication facilities and communication networks, such as LANs and private switching networks, accommodating a small number of subscribers, a cost increase per subscriber becomes very large provided that a system configuration similar to that of a large scale switching network forming a trunk network as described above is used. Because communication services and traffic conditions applied to these small scale switching networks are different and diverse, and a smaller number of subscribers are accommodated by these small scale switching networks.

Owing to the progress of hardware techniques, there is presently little probability that hardware such as switches gets out of order. On the other hand, the number of steps of software for executing call control and the like has become large in order to implement various functions attendant upon introduction of intelligent networks (INs) for providing various communication services. The proportion of faults caused by software is thus increasing. In such a situation, duplication of each device in the switching network is not effective in many cases for relief in a fault caused by software and improvement of reliability and it increases the device complexity. For forming and spreading broadband communication systems and communication networks hereafter, it is important to take a reliability improving measure narrowed down to software faults.

Furthermore, in order to cope with the increase of IN functions, the processor executing the call control and the like is needed to have a greater processing capability year after year. In the present configuration of switching systems and switching networks, however, it is not easy to replace the processor of a switching system with that having a higher performance and a cost for replacement is also needed.

SUMMARY OF THE INVENTION

In view of the situations heretofore described, the present invention has been made.

An object of the present invention is to provide a switching system and a configuration and processing procedures of a switching system capable of easily continuing the signal processing in the event of occurrence of an abnormality such as a fault or an overload state in a call control processor in the switching system.

Another object of the present invention is to provide a switching system and a configuration and processing procedures of a switching system capable of easily enhancing the processing capability even when the processing capability of the call control processor in the switching system or the signal processor executing processing of the layer 2 or below of a signal channel has become insufficient.

Another object of the present invention is to provide means for implementing an ATM switching network, capable of easily providing the SVC function.

Still another object of the present invention is to provide, even for a small scale network such as a LAN or a private network, an ATM switching system and an ATM switching network having signal processing procedures and means capable of solving the above described problems and having an economical configuration.

In accordance with the present invention, upon occurrence of an abnormality such as a fault or an overload state in a call control processor included in an ATM switching system, another switching system in the network is informed of this fact and signal processing is continued by using a call control processor of the switching system thus informed.

In the conventional technique, a line interface and a controller (which is a processor in many cases) installed outside the line interface are connected together via a control line and contents of a header transformation table included in the line interface are rewritten via the control line. In the present invention, however, contents of a header conversion table included in a line interface are rewritten by using a control cell produced in a controller such as a processor installed outside the line interface and an input cell is outputted to a desired output port of an ATM switching system according to the communication situation.

In the present invention, the line interface and the controller are not connected together via a control line and a control cell can be sent to the line interface in the same way as an ordinary cell. In the case where a processor of an ATM switching system A which operated normally until then has ceased to operate due to a failure or has been overloaded, for example, therefore, the operation of the ATM switching system can be controlled by a processor of another ATM switching system B.

In accordance with the present invention, when three or more ATM switching systems are connected to form an ATM switching network, at least one specific switching system is used as a switching system dedicated exclusively to backup.

In accordance with the present invention, when three or more ATM switching systems are connected to form an ATM switching network and a fault has occurred in a certain ATM switching system, an adjacent ATM switching system is used as a backup switching system every route of each signal connection which has been administered by the faulty switching system.

In accordance with the present invention, an ATM switch is connected to a signal processor via a line interface device.

In accordance with the present invention, control of path in a ATM switch for a cell inputted to a plurality of ATM switching systems having no signal processors (hereafter referred to as ATM-HUB), i.e., header conversion table rewriting is executed by a certain specific ATM switching system connected in a switching network or a certain specific external call controller. Hereafter, an ATM switching system for an office is referred to as ATM-PBX.

In this case, a cell is produced by a signal processor of a specific ATM switching system installed outside the ATM-HUB or of an external call controller and sent to a line interface included in the ATM-HUB. Contents of the header conversion table are rewritten by using this control cell to control the transfer of inputted cells in the ATM-HUB.

In the present invention, when an abnormality such as a fault or an overload state has occurred in a call control processor included in the ATM switching system, another switching system in the network is informed of this fact and this switching system effects call control as a substitute. Thereby, reliability of the ATM switching system can be improved without incurring a cost increase of the switching system due to duplication.

In the case where three or more ATM switching systems are connected to form an ATM switching network, only at least one specific switching system is used as a switching system dedicated exclusively to backup. Thereby, reliability of the ATM switching system can be improved without incurring a cost increase of the switching system in the same way as the foregoing description.

When a fault has occurred in one certain ATM switching system in the case where three or more ATM switching systems are connected to form an ATM switching network, an adjacent ATM switching system is used as a backup switching system every route of each signal connection which has been administered by the faulty switching system. Thereby, the reliability of the ATM switching system can be easily improved.

Furthermore, an ATM switch is connected to a signal processor via a line interface device and then the above described backup processing is conducted. Thereby, more signal processors or more call controllers can be easily installed in the case where the signal processing capability has become insufficient.

Furthermore, control of path in an ATM switch for a cell inputted to a plurality of ATM-HUBs having no signal processors is executed by a certain specific ATM-PBX connected in a switching network or an external call controller. Thereby, the SVC function can be easily implemented.

As apparent from the foregoing description, when a fault has occurred in a call control processor of a certain ATM switching system included in an ATM switching network according to the present invention, another ATM switching system is informed of this fact and information required for continuation of signal processing is transferred to the substitute ATM switching system. Furthermore, cells of a signal channel received by the faulty ATM switching system are also transferred to the substitute ATM switching system. Signal processing of the faulty ATM switching system is thus backed up by the substitute ATM switching system. Thereby, backup of signal processing can be easily implemented. This results in an effect that degradation of switching processing capability of the ATM switching network and suspension of switching processing are prevented.

Furthermore, when a call control processor of a certain ATM switching system has fallen into an overload state, another ATM switching system is informed of this fact and cells of a new signal channel arriving at the ATM switching system in the overload state are transferred to the substitute ATM switching system. The substitute ATM switching system conducts processing of the new signal channel as a substitute for the overloaded ATM switching system. This results in another effect that the load of signal processing in the ATM switching system can be distributed.

Furthermore, as a result of a signal processor being connected to an ATM switch via a line interface device, there is also brought about another effect that more signal processors and call controllers can be installed more easily.

Furthermore, a plurality of ATM-HUBs having no signal processors, and an ATM-PBX or an external controller form an ATM switching network, and path control in ATM switch of the ATM-HUBs (i.e., setting the header conversion table in the LIF) is executed by the ATM-PBX or external call controller. This brings about an effect that an ATM switching network effecting the SVC function can be implemented easily and inexpensively.

BRIEF DESCRIPTION OF THE DRAWINGS

FIG. 8 is a diagram showing the configuration of a header conversion table after an information channel has been established in FIG. 7;

FIG. 9 is a diagram showing the configuration of a header conversion table after an information channel has been established in FIG. 7;

FIG. 12 is a diagram showing the configuration of a header conversion table after initialization in FIG. 11;

FIG. 13 is a diagram showing the configuration of a header conversion table after initialization in FIG. 11;

FIG. 14 is a diagram showing the configuration of a header conversion table after initialization in FIG. 11;

FIG. 15 is a diagram showing the configuration of a header conversion table at the time when a fault has occurred in FIG. 11;

FIG. 16 is a diagram showing the configuration of a header conversion table at the time when a fault has occurred in FIG. 11;

FIG. 17 is a diagram showing the configuration of a header conversion table at the time when a fault has occurred in FIG. 11;

FIG. 18 is a diagram illustrating the operation of header conversion between two ATM switching systems in FIG. 11;

FIG. 19 is a diagram showing the configuration of a header conversion table after an information channel has been established in FIG. 11;

FIG. 20 is a diagram showing the configuration of a header conversion table after an information channel has been established in FIG. 11;

FIG. 21 is a diagram showing the configuration of a header conversion table after an information channel has been established in FIG. 11;

FIG. 22 is a diagram showing the configuration of a header conversion table after an information channel has been established in FIG. 11;

FIG. 25 is a diagram showing the configuration of a header conversion table at the time when an overload state has occurred in FIG. 24;

FIG. 26 is a diagram showing the configuration of a header conversion table at the time when an overload state has occurred in FIG. 24;

FIG. 27 is a diagram showing the configuration of a header conversion table at the time when an overload state has occurred in FIG. 24;

FIG. 28 is a diagram showing the configuration of a header conversion table at the time when an overload state has occurred in FIG. 24;

FIG. 33 is a diagram showing the configuration of a header conversion table after initialization in FIG. 31;

FIG. 34 is a diagram showing the configuration of a header conversion table after initialization in FIG. 31;

FIG. 35 is a diagram showing the configuration of a header conversion table after initialization in FIG. 31;

FIG. 36 is a diagram showing the configuration of a header conversion table after initialization in FIG. 31;

FIG. 38 is a diagram showing the configuration of a header conversion table after initialization in FIG. 37;

DESCRIPTION OF THE PREFERRED EMBODIMENTS

The present invention is premised on the in-channel control method, i.e., it is premised on an assumption that header conversion table rewriting is executed by using a control cell (i.e., a cell used to rewrite the header conversion tables). A switching system and network according to the present invention is configured so that paths, in an ATM switch, of cells of a signal channel (hereafter referred to as signal cells) and cells of an information channel (hereafter referred to as information cells) are established by transfer of control cells. The signal cell stores a call control message and is transmitted and received. The information cell stores information transmitted and received between subscriber terminals, such as voice or picture data. In the ensuing description, an abbreviation "ordinary cell" are used as the name designating both the signal cell and information cell.

Prior to detailed description, the schematic configuration and operation will be first described by referring to block configuration diagrams of an ATM switching system shown in FIGS. 1 through 4 to which the present invention is applied.

Figure 1:
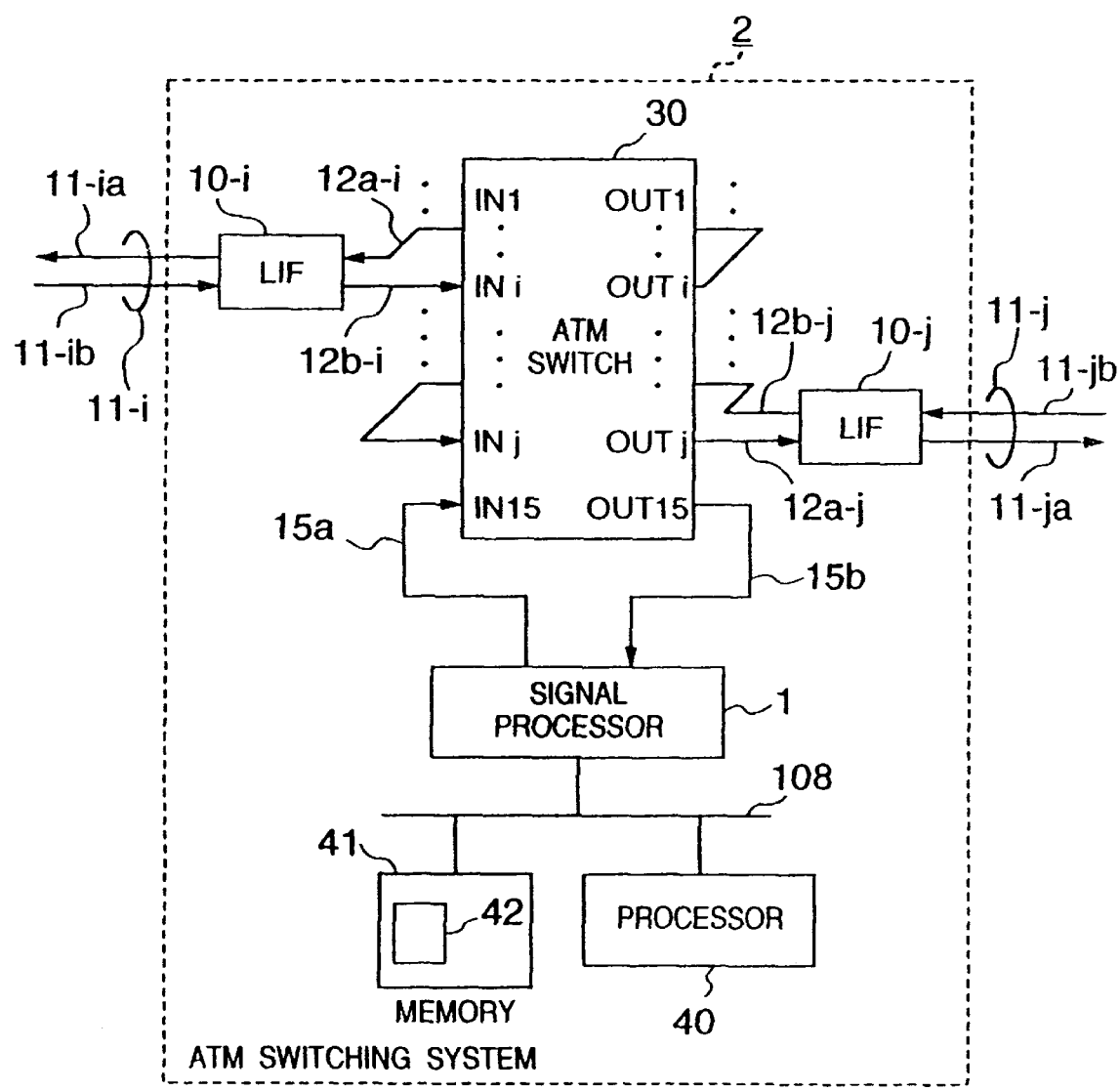
FIG. 1 is a block configuration diagram showing the configuration of an ATM switching system to which the present invention is applied.
Figure 2:
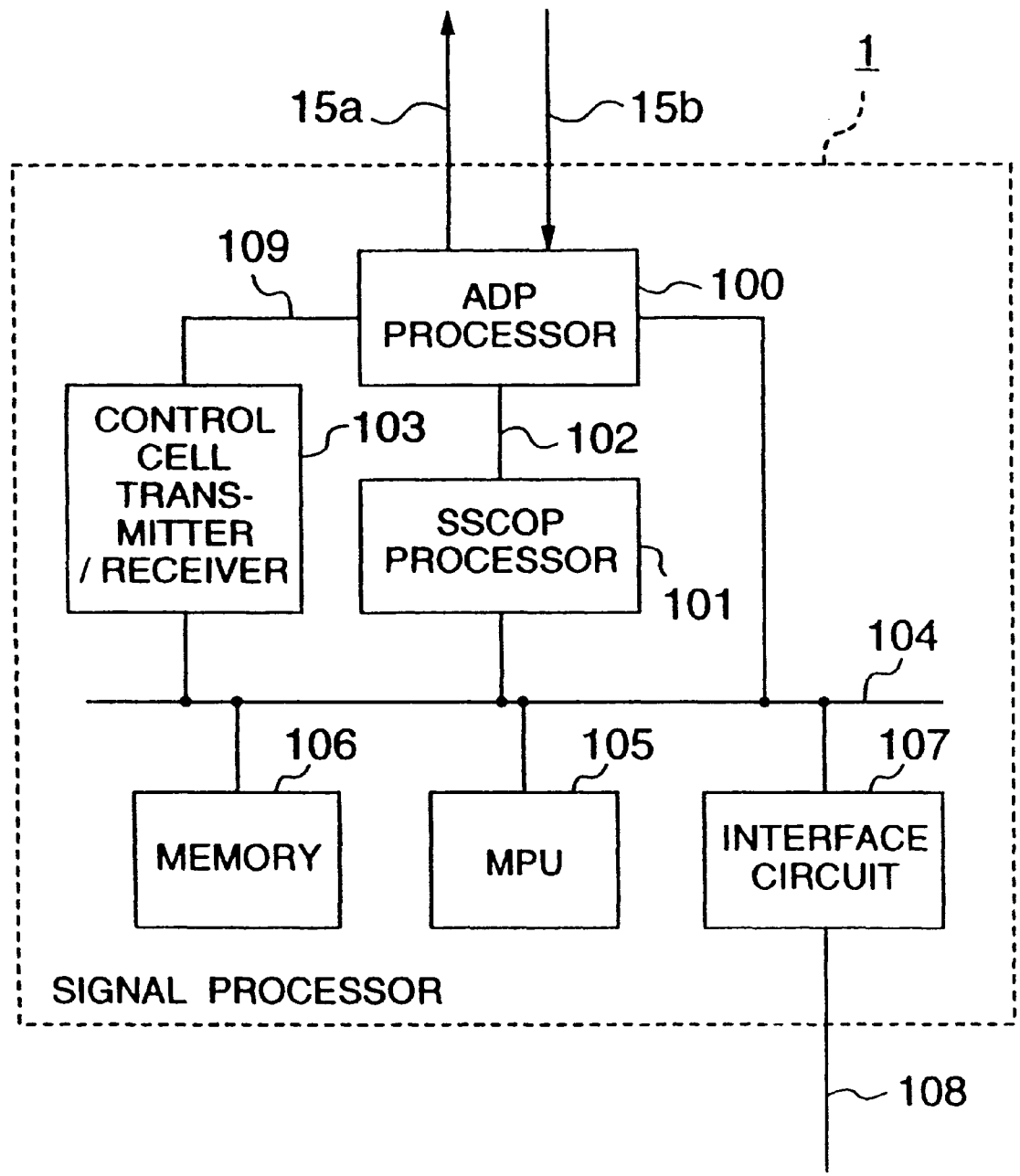
FIG. 2 is a block configuration diagram showing the configuration of a signal processor of the ATM switching system illustrated in FIG. 1.
Figure 4:
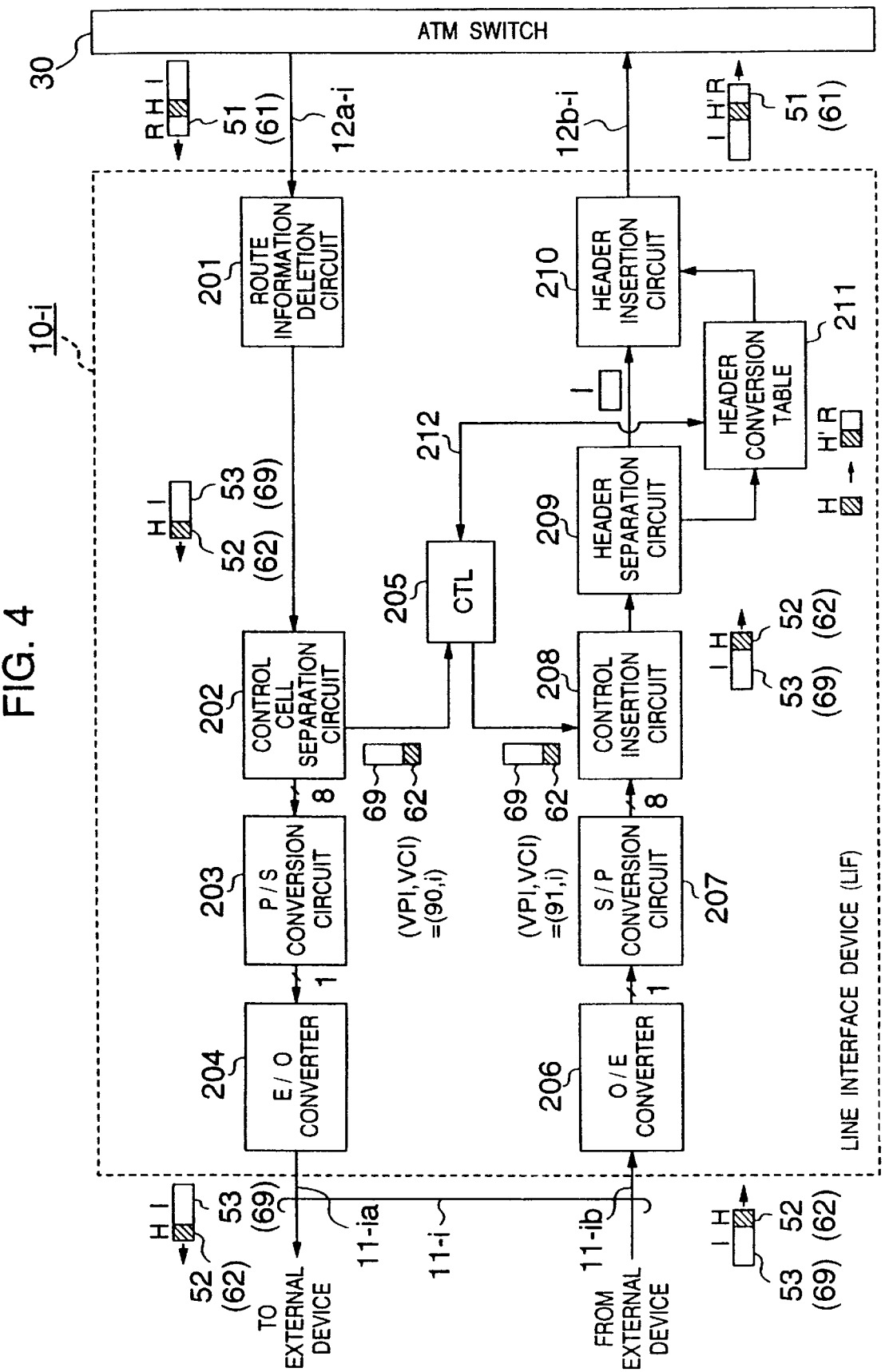
FIG. 4 is a diagram showing the configuration of a line interface device of the ATM switching system illustrated in FIG. 1.

In the in-channel control method to which the present invention is applied, signal cells sent from a terminal or another ATM switching system are inputted to a signal processor 1 via a line interface device (LIF) 10 (10-1, . . . , 10-j) and an ATM switch 30 of an ATM switching system 2 shown in FIG. 1. The cells are then sent to a call control processor implemented in a processor 40 via an adaptation processor (ADP processor) 100 (FIG. 2) and an SSCOP processor 101 included in a signal processor 1. The cells are processed in the call control processor. On the basis of a result thereof, the call control processor transmits information for rewriting a header conversion table 211 (FIG. 4) included in the LIF 10 to a control cell transmitter/receiver 103 (FIG. 2). In the control cell transmitter/receiver 103, a control cell containing information for rewriting the header conversion table 211 is produced. The control cell is sent to the LIF 10 via the ATM switch 30. In the LIF 10, the control cell is separated in a control cell separator 202 (FIG. 4). The control cell rewrites the header conversion table 211 via a controller CTL 205.

Instead of directly writing the header conversion table 211 provided in the LIF 10 via a bus 104 (FIG. 2) of the signal processor 1, the ATM switching system to which the present invention is applied is configured so that an arbitrary signal processor 1 provided in the ATM switching system and the ATM switching network executes writing via an ATM switch. In other words, information for rewriting the header conversion table supplied from a call control processor provided in the ATM switching system and ATM switching network is sent to the LIF 10 via the control cell transmitter/receiver 103 of the signal processor 1 and the ATM switch 30 as a control cell.

An ATM switching system and an ATM switching network according to the present invention has the above described configuration. When a fault which is one of abnormal states has occurred in a call control processor of a certain switching system, this device transfers a received cell to another switching system or communication device. The device to which the signal cell has been transferred conducts call control of the faulty device as a substitute, derives information for rewriting the header conversion table, then returns the information for rewriting the header conversion table to the faulty device as a control cell. The header conversion table 211 provided in the LIF 10 in the faulty switching system is thus rewritten. On the basis of contents of the rewritten header conversion table, a path of an information channel in an ATM switch is established. Exchange and communication of information between terminals can be performed continuously.

Hereafter, an embodiment of an ATM switching network and an ATM switching network according to the present invention will be described by referring to drawing.

First of all, an example of the system configuration of the ATM switching system or communication device to which the present invention is applied will now be described. FIG. 1 is a block configuration diagram showing an example of an ATM switching system used in an ATM switching network according to the present invention.

With reference to FIG. 1, an ATM switching system 2 includes an ATM switch 30 for exchanging cells having a fixed length, a plurality of line interface devices (LIF) 10-1 through 10-j for conducting header conversion with respect to cells inputted from optical fibers 11-1 through 11-j, a signal processor 1 for conducting protocol processing of layer 2 or below (such as processing for reassembling a plurality of cells into one signal channel message) with respect to cells of a signal channel, a processor 40 for conducting processing of layer 3 (call control) with respect to the reassembled message, and a memory 41 to be used by a processor 40 as storage means of various kinds of information.

By taking arbitrary one optical fiber 11-i out of the optical fibers 11-1 through 11-j as an example, the flow of cells will now be described. Signal cells (such as cells sent from the user to request information channel establishment) inputted from an optical fiber 11-ib are sent to the signal processor 1 via an LIF 10-i and the ATM switch 30 (i.e., a path extending from an input port INi to an output port OUT15). In the signal processor 1, one message is reassembled from one or more signal cells. With respect to this message, the processor 40 conducts predetermined protocol processing. As a result of the above described protocol processing, the processor 40, for example, orders a control cell transmitter/receiver 103 (FIG. 2) included in the signal processor 1 to transmit a control cell to rewrite the header conversion table 211 (FIG. 4) included in the LIF 10-i. The generated control cell is transmitted from the signal processor 1 and it arrives at the LIF 10-i via the ATM switch 30 (i.e., a path extending from an input port IN15 to an output port OUTi). A CTL 205 (FIG. 4) included in the LIF 10-i rewrites the header conversion table and establishes an information channel.

If an information channel (i.e., a cell for transferring information from a user to another user) is inputted from the optical fiber 11-ib in this state, this cell is outputted from the LIF 10-i, for example, to an optical fiber 11-ja via the ATM switch 30 (i.e., a path extending from an input port INi to an output port OUTj) and an LIF 10-i.

Details of each of the above described devices and circuits will now be described.

With reference to FIG. 1, the ATM switching system 2 includes the signal processor 1, the line interface device (LIF) 10 (more precisely speaking, a plurality of LIFs 10-1 through 10-j), the ATM switch 30, the processor 40, and the memory 41. The signal processor 1 is connected to the ATM switch 30 via buses 15 (a transmitting bus 15a and a receiving bus 15b). Furthermore, the signal processor 1 is connected to the processor 40 via a bus 108. The processor 40 conducts protocol processing (such as call control) of layer 3 or above of the signal channel and sets the header conversion table (211 of FIG. 4 which will be described in detail) for altering destination identifiers contained in cells to exchange cells in the ATM switch 30 provided in the LIF 10. Via the bus 108, the processor 40 is connected to the memory 41. The memory 41 is used for the storage area and work area of a program to be executed by the processor 40. In this memory 41, a call control information table 42, for example, is contained. The detailed configuration of the call control information table 42 will be described later by referring to FIG. 3.

The ATM switch 30 is exchange means for exchanging fixed length cells. The ATM switch 30 accommodates optical fibers 11 (11-1 through 11-j) having a data transmission rate of, say, 156 Mbits/sec via a line interface device (LIF) 10 (10-1 through 10-j) for conducting optical/electrical conversion and cell header conversion and exchanges cells inputted to/outputted from optical fibers. This ATM switch 30 is connected to each LIF (10-1, . . . , 10-j) via a bus 12 (12-1, . . . , 12-j). In the ATM switching system of the present embodiment, each of buses 12 and 15 include a pair of a transmitting bus (i.e., a bus directed in a direction for transmitting signals to the LLF and represented by a suffix "a" in drawing) and a receiving bus (i.e., a bus directed in a direction for receiving signals from the LLF and represented by a suffix "b" in drawing) each having an 8-bit width in order to process each signal as parallel data by taking a byte as the unit. The bus 12 includes a pair of a transmitting bus 12a and a receiving bus 12b. The bus 15 includes a pair of a transmitting bus 15a and a receiving bus 15b.

FIG. 2 is a block configuration diagram showing an example of a detailed configuration of the above described signal processor 1.

In the signal processor 1, a plurality of segmented and inputted fixed length cells are reassembled to reconstruct a message before segmentation, at the time of reception. At the time of outputting in the signal processor 1, one message is segmented into a plurality of fixed length cells and the fixed length cells are outputted. The signal processor 1 includes an adaptation processor (ADP processor) 100, an SSCOP processor 101, a control cell transmitter/receiver 103, an interface circuit 107, an arithmetic processor (MPU) 105, a memory 106, a bus 109, a bus 102, and a bus 104. The adaptation processor (ADP processor) 100 conducts conversion processing with respect to fixed length cells processed in the ATM switch 30 and variable length signal channel data processed within the signal processor 1. The SSCOP processor 101 processes an SSCOP (Service Specific Connection Oriented Protocol), which is a protocol corresponding to layer 2 of a signal channel. The control cell transmitter/receiver 103 transmits/receives control cells (60 of FIG. 6) for controlling the LIF 10 and the ATM switch 30. The interface circuit 107 conducts exchange of information between the processor 40 and the signal processor 1. The arithmetic processor (MPU) 105 controls the ADP processor 100, the SSCOP processor 101 and the control cell transmitter/receiver 103 and conducts processing of an UNI-SSCF (User Network Interface—Service Specific Convergence Sublayer) protocol used in communication between a terminal and a switching system. Furthermore, the arithmetic processor (MPU) 105 conducts processing of an NNI-SSCF (Network Node Interface—SSCF) protocol used between switching systems. The memory 106 is used as an area for storing programs to be executed by the MPU 105 and for transferring data between the processor 40 and the MPU 105 and between the MPU 105 and the SSCOP processor 101. The bus 109 transmits thereon data of the control cells 60. The bus 102 transmits thereon variable length signal data. The bus 104 connects the ADP processor 100, the SSCOP processor 101, the control cell transmitter/receiver 103, the interface circuit 107, the MPU 105, and the memory 106.

The ADP processor 100 is connected to the ATM switch 30 via the buses 15 (the transmitting bus 15a and the receiving bus 15b). Furthermore, the ADP processor is connected to the SSCOP processor 101 via the bus 102. Furthermore, the ADP processor is connected to the control cell transmitter/receiver 103 via the bus 109. The interface circuit 107 is connected to the processor 40 and the memory 41 via the bus 108.

Figure 3:
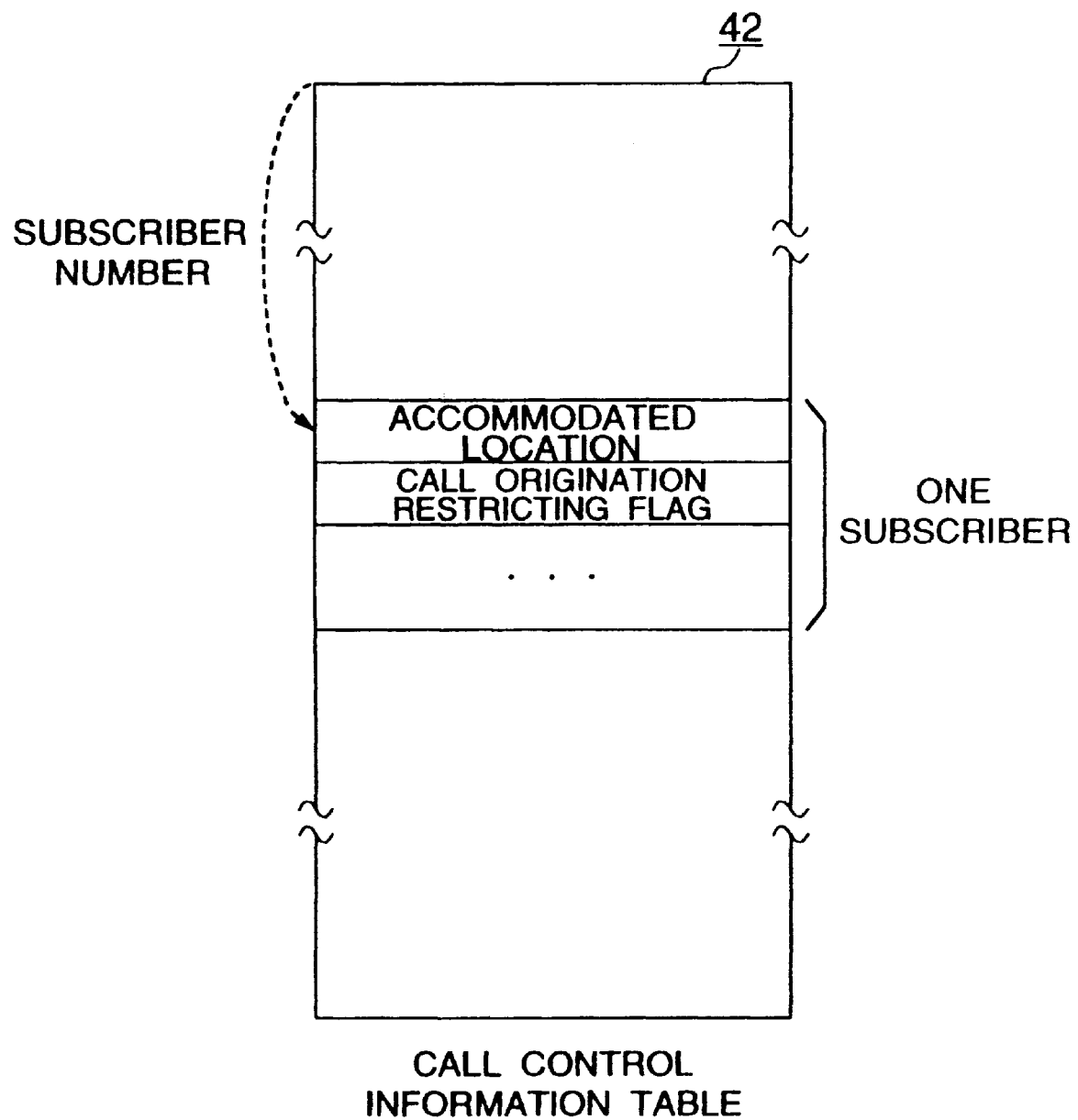
FIG. 3 is a diagram showing the configuration of a call control information table used in an ATM switching system.

FIG. 3 is a table configuration diagram showing an example of contents of the call control information table 42 accommodated in the memory 41 of the ATM switching system illustrated in FIG. 1.

In the configuration of the call control information table 42 in the present embodiment, subscriber numbers (dial numbers) are used as address information. In a position retrieved by an address, there is recorded information such as an accommodated location of a subscriber (i.e., a number of a bus 12 (12-1, . . . , 12-j) connected to the ATM switch 30) and an call origination restricting flag (representing whether an international call origination is permitted).

The configuration of the line interface device (LIF) 10 will now be described by referring to FIG. 4. FIG. 4 is a block configuration diagram showing an example of a detailed configuration of the line interface device 10. By taking LIF 10-i as a representative example out of a plurality of LIFs 10 (10-1 through 10-j), the configuration is shown.

With reference to FIG. 4, the LIF 10-i includes a route information deletion circuit 201, a control cell separation circuit 202, a parallel-serial conversion circuit (P/S conversion circuit) 203, and an electrical/optical converter (E/O converter) 204. The route information deletion circuit 201 deletes route information "R" 51 or 61 respectively added to the heads of cells which will be described later (an ordinary cell 50 illustrated in FIG. 5 and a control cell 60 illustrated in FIG. 6). The control cell separation circuit 202 extracts only a control cell 60 sent from the signal processor 1 via the ATM switch 30 (more exactly speaking, a control cell of (VPI, VCI)=(90, i) as described below) out of cells inputted to the LIF 10-i and transfers the extracted cell to the control circuit CTL 205 for rewriting the header conversion table 211. The parallel-serial conversion circuit (P/S conversion circuit) 203 converts 8-bit parallel cell data inputted from the transmitting bus 12a-i to serial data bit by bit. The electrical/optical converter (E/O converter) 204 converts the serial data to an optical signal and outputs the optical signal to a transmitting optical fiber 11-ia.

The LIF 10-i includes an optical/electrical converter (O/E converter) 206, a serial-parallel conversion circuit (S/P conversion circuit) 207, a control cell insertion circuit 208, a header separation circuit 209, a header insertion circuit 210, and a header conversion table 211. The optical/electrical converter (O/E converter) 206 converts an optical cell signal inputted from an external device (a subscriber terminal or another ATM switching system) via a receiving optical fiber 11-ib to an electrical signal. The serial-parallel conversion circuit 207 converts a serial signal inputted from the O/E converter 206 to 8-bit parallel data. The control cell insertion circuit 208 inserts a control cell 60 inputted from the CTL 205 (more exactly speaking, a control cell of (VPI, VCI)=(91, i) as described below) between cells received from the line 11-ib (the ordinary cell 50 illustrated in FIG. 5 and the control cell 60 illustrated in FIG. 6).

The header separation circuit 209 separates a cell header portion "H" 52 (or 62) of an inputted cell, outputs the cell header portion "H" 52 (or 62) to the header conversion table 211, and outputs an information field 53 (or 69) of an inputted cell to the header insertion circuit 210.

The header conversion table 211 is formed by a memory (RAM). When a cell header "H" is inputted from the header separation circuit 209, retrieval is effected in the memory by using a virtual path identifier (VPI) and a virtual channel identifier (VCI) of the header portion as an address. From the retrieval position, a new cell header "H" and the above described route information "R" 51 (or 61) are read out. These pieces of information are outputted to the header insertion circuit 210. The header insertion circuit 210 adds the new cell header "H" and the route information "R" read out from the header conversion table 211 to the head of the information field 53 (FIG. 5) or 69 (FIG. 6) sent from the header separation circuit 209 and sends the cell 50 (or 60) to the ATM switch 30 via a receiving bus 12b-i.

As for contents of the header conversion table 211, their initial values are set (written) by the CTL 205 via a bus 212 as will be described later by referring to FIG. 7. Values other than the initial values are set by the processor 40 (or the MPU 105) by using the control cell 60. If the processor 40, for example, orders the control cell transmitter/receiver 103 to set (write) information in the header conversion table 211, the control cell 60 arrives at the control circuit 205 via the bus 109, the ADP processor 100, the bus 15a, the ATM switch 30, the bus 12a and the control cell separation circuit 202. The CTL 205 sets contents of the header conversion table 211 via the bus 212.

The configuration of cells used in the ATM switching network according to the present invention will now be described.

Figure 5:
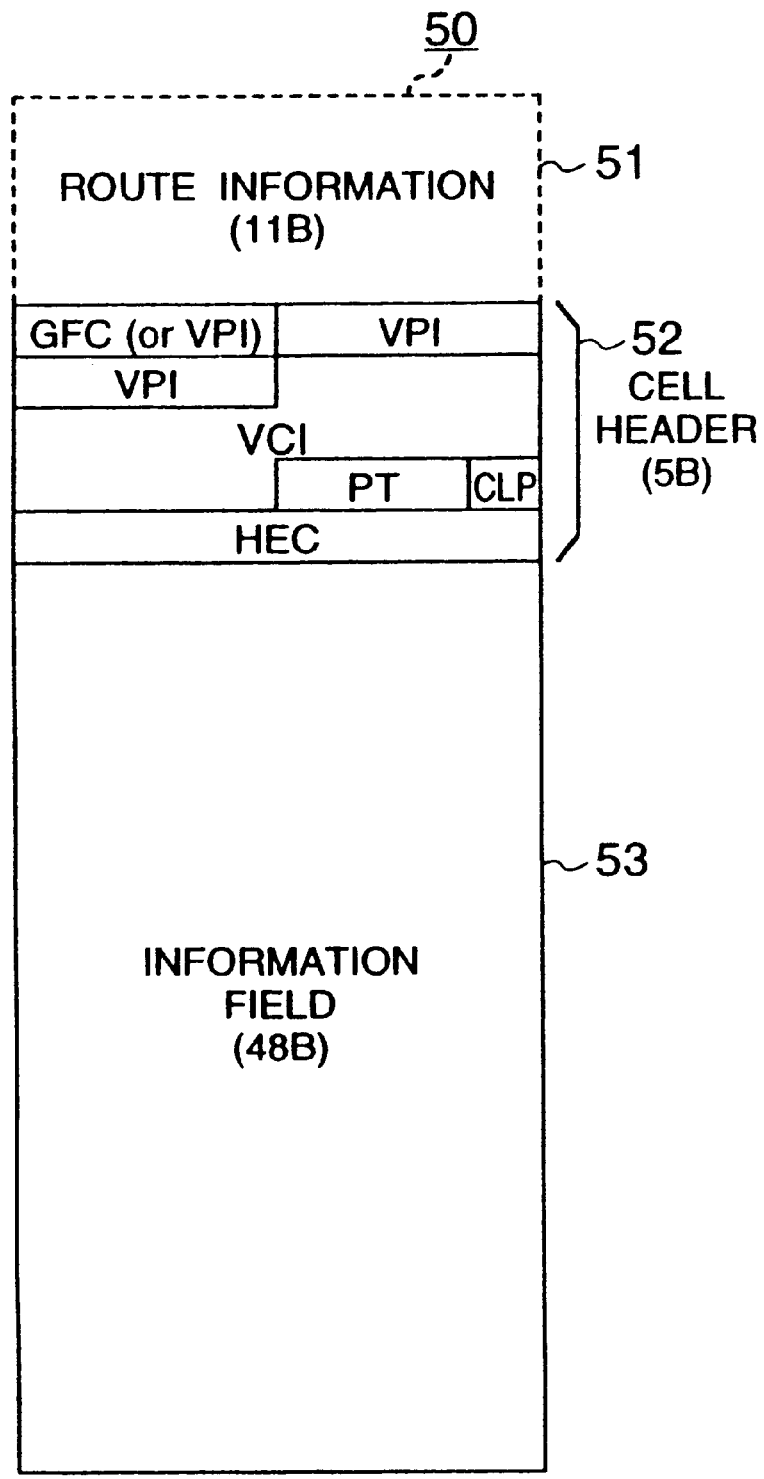
FIG. 5 is a diagram showing the configuration of an ordinary cell.

FIG. 5 is a cell configuration diagram showing the format of an ordinary cell (signal cell and information cell) inputted from a subscriber terminal or another ATM switching system via an optical fiber 11b.

The ordinary cell 50 includes a five-byte cell header 52 and 48-byte information field 53. The cell header 52 includes a generic flow control (GFC), a virtual path identifier (VPI) which is a first connection identifier, a virtual channel identifier (VCI) which is a second connection identifier, a payload type (PT), a cell loss priority (CLP), and header error control (HEC).

Figure 6:
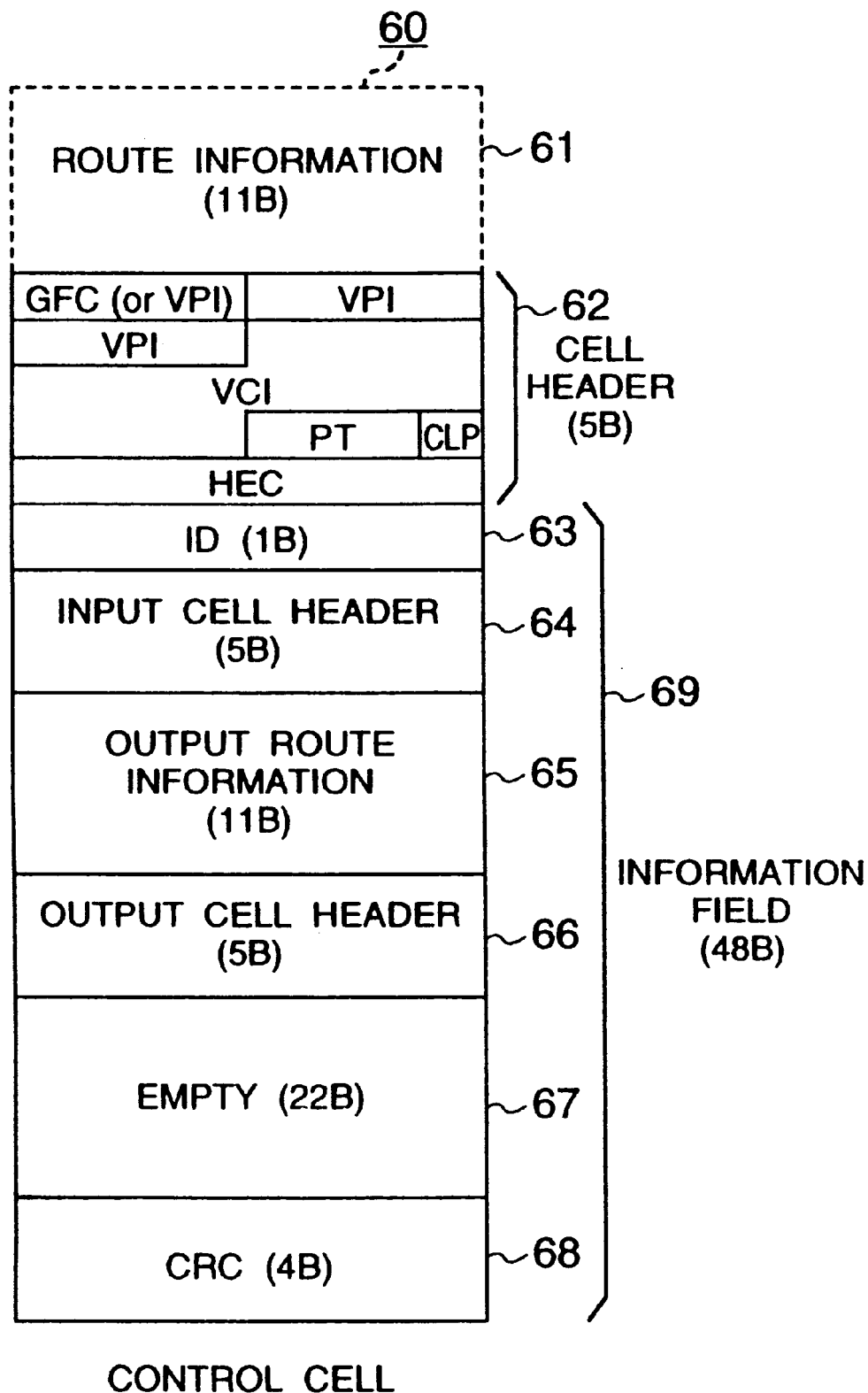
FIG. 6 is a diagram showing the configuration of a control cell.

FIG. 6 is a cell configuration diagram showing the cell format of a control cell according to the cell structure of the ITU-T Recommendation I.361 for an ATM switching method.

In the same way as the ordinary cell shown in FIG. 5, a control cell 60 includes a five-byte cell header 62 (having the same configuration as the header 52 of the ordinary cell shown in FIG. 5), and 48-byte information field 69 accommodating control data to be used in the in-channel control method of the present invention. The information field 69 includes one-byte ID field 63, five-byte input cell header 64, 11-byte output route information 65, five-byte output cell header 66, and four-byte cyclic redundancy check code (CRC) byte 68. Since all bytes of the information field 69 shown in FIG. 6 are not used as information concerning the control, empty bytes 67 (22 bytes in the present embodiment) are contained in the information field 69.

By the way, the ID field 63 located at the top of the byte information field 69 is an identifier indicating whether the control cell 60 is a write instruction for the header conversion table 211 or a read instruction. The next input cell header 64 indicates to which address position (VPI, VCI) of the header conversion table 211 the write instruction or read instruction is directed. If the ID field 63 is a write instruction, then the output route information 65 and the output cell header 66 indicate cell routing information in the ATM switch to be written in a specified address position of the header conversion table 211 and data of a header to be added (such as output VPI, VCI). If the ID field 63 is a read instruction, then the output route information 65 and the output cell header 66 indicate cell routing information in the ATM switch read out from a specified address position of the header conversion table 211 and data of a header to be added (such as output VPI, VCI).

The 11-byte route information 51 and 61 respectively shown in FIGS. 5 and 6 is information for distributing cells to output buses at high speed by using only hardware. The ATM switch 30 is implemented typically by connecting a plurality of switches in multiple stages. In the route information, therefore, there is recorded information for indicating to which output bus a cell should be transmitted when the cell is to be exchanged in ATM switches of respective stages. By the way, the route information 51 and 61 is added only in the ATM switching system 1. In subscriber lines and trunks, the route information is deleted and then each cell is transmitted.

Whether a certain cell is a control cell 60 or an ordinary cell 50 is discriminated by the VPI contained in the header portion 52 or 62 of the cell. For example, a cell with VPI=90 or 91 is regarded as a control cell in its own switching system. This VPI is not used for ordinary cells 50 passed between a subscriber line and a trunk via the switch 30. In order to allow accepting a control cell supplied from another switching system when a signal processor of another switching system backs up the signal processing as will be described later, VPI=92, 93 or the like, for example, is allocated. This VPI is not used for control cells in a subscriber line or its own switching system.

Cells inputted via the receiving optical fiber 11b are transmitted/received between a subscriber terminal or another ATM switching system and the signal processor. In the case of a signal cell used for call control such as start or end of communication between terminals or switching systems, route information for the switch 30 to route an input cell to the signal processor 1 is preset in an address in the header conversion table 211 in LIF10. The address corresponds to the VPI, VCI added to the signal cell. The cell after header conversion is outputted to the bus 15b by the ATM switch 30, reassembled into a predetermined message by the signal processor 1, and sent to the processor 40.

In the above described message, information such as numbers of a call originating terminal and a destination terminal needed for call control is stored. The processor 40 conducts processing of layer 3 (call control) on the basis of the message. If as a result it is necessary, for example, to send a signal channel message (such as call termination notice to another subscriber terminal or call setting request to a subscriber terminal connected to another ATM switching system), the processor 40 issues, to the signal processor 1, a request for sending the message.

On the basis of the request from the processor 40, the signal processor 1 conducts SSCOP processing and ADP processing and sends the generated cells to the ATM switch 30 via the bus 15a. In accordance with the route information 51 added in the ADP processor included in the signal processor 1, these cells arrive at an LIF 10 connected to another subscriber terminal or switching system, and these cells are then transferred to the destination terminal or switching system via a subscriber line or a trunk.

By referring to FIGS. 7 through 10, contents of the foregoing description will now be described in more detail.

Figure 7:
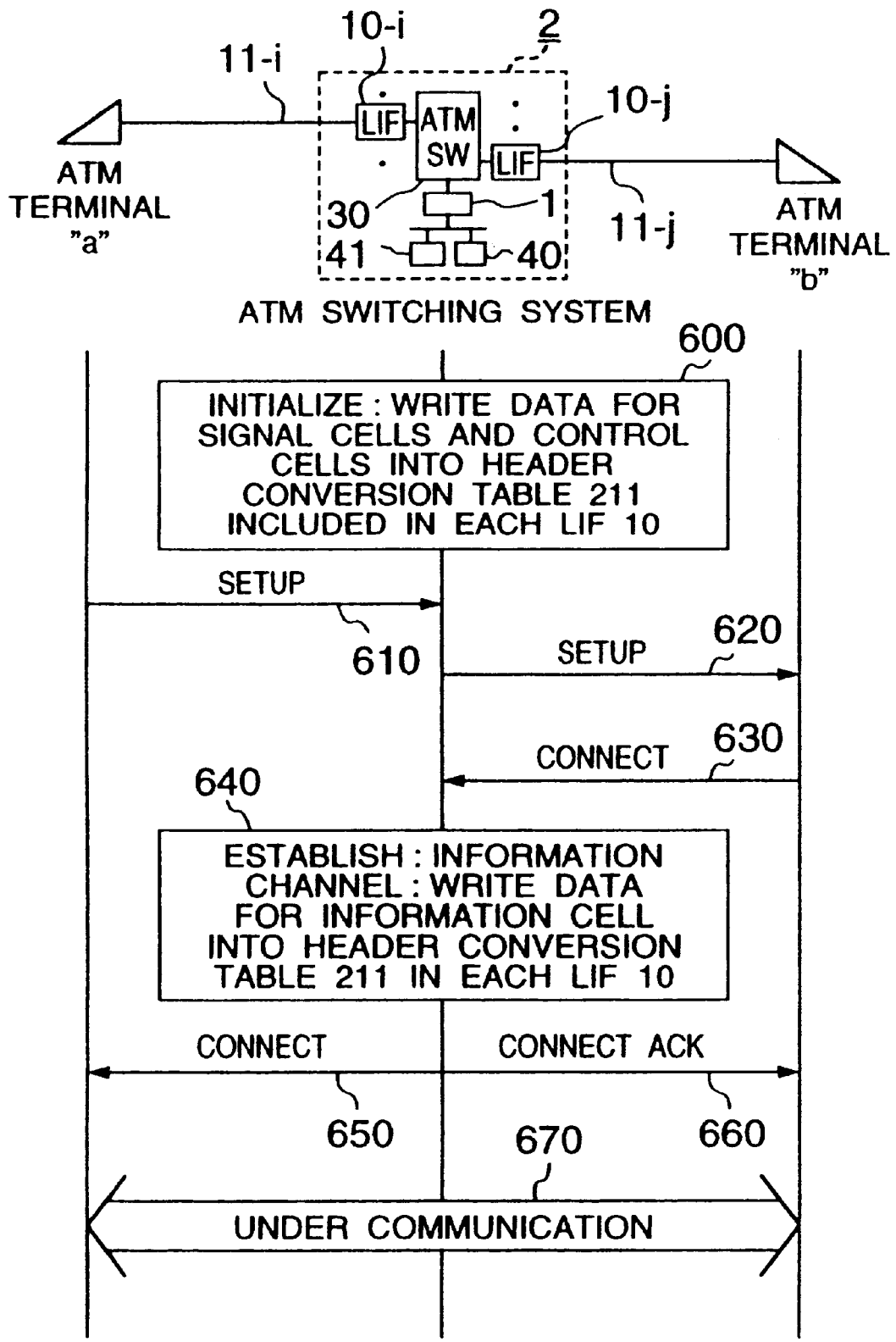
FIG. 7 is a diagram illustrating the configuration and operation of an ATM switching system according to the present invention.

Assuming that an ATM terminal "a" and an ATM terminal "b" are connected to the ATM switching system 2 illustrated in FIG. 1, FIG. 7 shows an example of a sequence for establishing an information channel between the ATM terminal "a" and the ATM terminal "b" in response to a request issued from the ATM terminal "a." It is now assumed that the ATM terminal "a" is connected to an LIF 10-i of an ATM switching system 2 via an optical fiber 11-i and the ATM terminal "b" is connected to an LIF 10-j via an optical fiber 11-j. Character i is an integer not less than 1 and not greater than j−1.

As initialization at the time of, for example, turning on of power, each of CTLs 205 included in LIF 10-1 through 10-j writes output route information which is cell routing information in the ATM switch and data of a header to be added (output VPI, VCI) into areas corresponding to (input VPI, VCI)=(0, 5) (signal cell) and (91, k) (control cell) included in the header conversion table 211 in each LIF 10 via the bus 212 of FIG. 4 by using outputs of dip switches or ROMs (step 600). Character k denotes an LIF number of cell transmission source or destination, and it is an integer 1, . . . , j.

Figure 10:
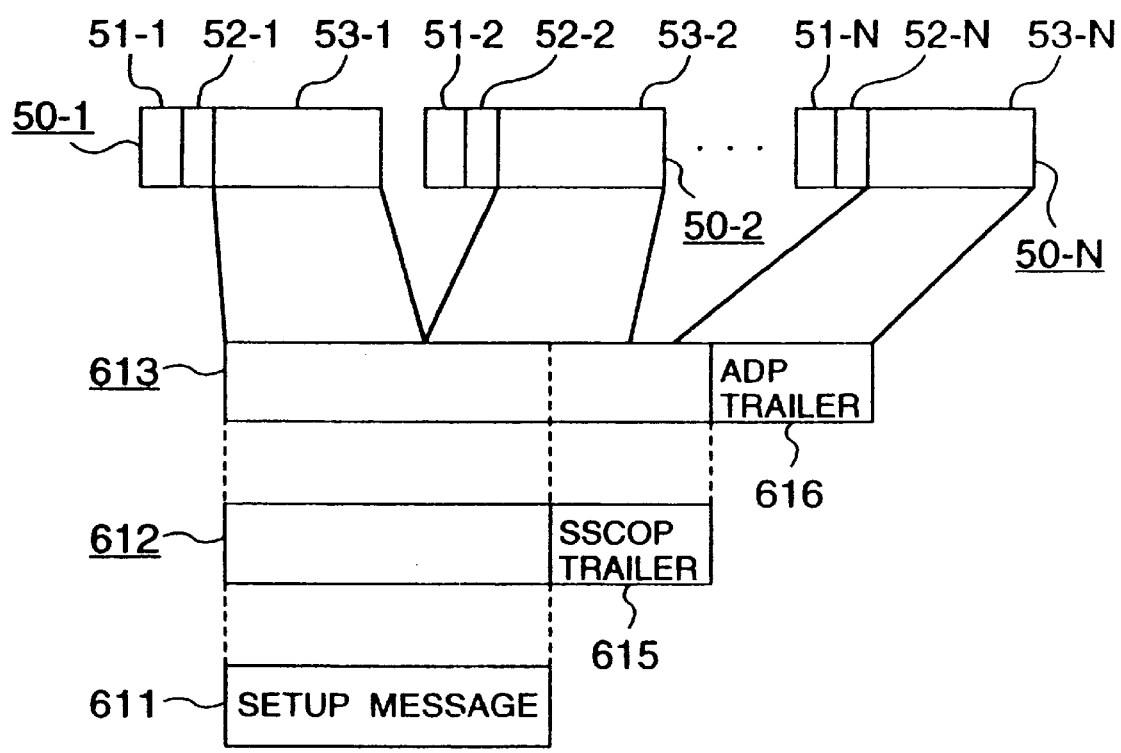
FIG. 10 is a diagram illustrating the SETUP message segmentation/reassembling operation.

FIGS. 8 and 9 are table configuration diagrams showing examples of setting header conversion tables 211-$i$ and 211-$j$. FIG. 10 is an operation diagram illustrating the operation for segmenting a message into cells and reassembling cells into a message. By the way, data for information cells of (input VPI, VCI)=(0, 10) shown in FIG. 8 and (input VPI, VCI)=(0, 12) shown in FIG. 9 are written at step 640 which will be described later. As described before, the header conversion table 211 stores all data of route information 51 (or 61) and a new cell header 52 (or 62), i.e., all data of GFC (or VPI), VPI, VCI, PT, CLP and HEC in the cell header shown in FIGS. 5 and 6 in a position searched by using (VPI, VCI) of the header portion of an input cell as an address. In FIGS. 8 and 9 (as well as drawing of header conversion table in FIGS. 12, 13, 14 and others), however, only the route information and (VPI, VCI) out of these pieces of output information are shown as examples. Output route information "INi→OUT15" shown in FIG. 8, for example, represents that a cell is routed, in the ATM switch 30 shown in FIG. 1, from an input bus 12$b$-$i$ to the output bus 15$b$.

It is assumed in the present embodiment that it is predetermined that a cell of (VPI, VCI)=(0, 5) is used as a signal cell. Furthermore, it is assumed that a cell of (VPI, VCI)=(90, k) (where k is a number of the LIF 10) is used as a control cell to be transmitted from the signal processor 1 to an LIF 10-$k$ and a cell of (VPI, VCI)=(91, k) is used as a control cell to be transmitted from the LIF 10-$k$ to the signal processor 1. Character k is an integer 1, . . . , j.

When the above described initialization has been completed, a SETUP message requesting establishment of an information channel with respect to the ATM terminal "b" is transmitted from the ATM terminal "a" to the ATM switching system 2 as shown in FIG. 7 (step 610). This message is segmented into one or more cells. The one or more cells are transmitted over the optical fiber 11-$i$ (more precisely speaking, 11-$ib$) as a signal cell of (VPI, VCI)=(0, 5). (According to the example shown in FIG. 8,) these cells which have arrived at the LIF 10-$i$ are provided with route information 51 for routing cells from the input port INi to the output port OUT15 and a new cell header (VPI, VCI)=(0, i) by the header separation circuit 209, the header conversion table 211 and the header insertion circuit 210. Then these cells are outputted to the bus 12$b$-$i$ (FIG. 1). These cells obtained by segmenting the SETUP message and outputted to the bus 12$b$-$i$ are denoted by 50-1 through 50-N in FIG. 10 (where N is an integer not less than 1).

The cells 50-1 through 50-N outputted to the bus 12$b$-$i$ arrives at the signal processor 1 via the OUT15 of the ATM switch 30 and the bus 15$b$ shown in FIG. 1. In the signal processor 1, the route information 51 and the header 52 of each cell are deleted and a message 613 is reassembled. Furthermore, by referring to an ADP trailer 616 defined by ITU-T recommendations, predetermined processing, such as a check on cell loss, is conducted. If there are no abnormalities, a message 612 with the ADP trailer 616 deleted is sent to the SSCOP processor 101 via the bus 102 of FIG. 2. While FIGS. 8 and 9 show examples of the LIF 10-$i$, $j$, (output VPI, VCI) for the signal cell of (VPI, VCI)=(0, 5) inputted to each of other LIFs is provided with a value (0, k) which varies LIF to LIF, where k is a number of LIF and is an integer not less than 1 and not greater than j. In the ADP processor 100, the above described message reassembling processing is conducted for every (VPI, VCI) of each cell. Even if signal cells from a plurality of different LIFs simultaneously arrive at the ADP processor 100, therefore, which LIF a cell has come from can be discriminated depending upon the value of the output VCI. Therefore, the ADP processor 100 is prevented from reassembling a plurality of signal cells sent from different LIFs into one message by mistake.

By referring to the SSCOP trailer 615, the SSCOP processor 101 then conducts predetermined protocol processing. For example, the SSCOP processor 101 checks whether a sequence number written in the SSCOP trailer is equal to an expected value. If there are no problems, the SSCOP processor 101 deletes the SSCOP trailer 615 and transfers an reassembled message 611 (SETUP message) to the memory 106 via the bus 104 of FIG. 2.

The MPU 105 then conducts processing of the above described UNI-SSCF protocol, such as partial conversion of the message type, on the SETUP message transferred to the memory 106 and transfers this to the memory 41 (FIG. 1) via the bus 104, the interface circuit 107 and the bus 108.

The SETUP message transferred to the memory 41 contains information, such as numbers of origination source and destination terminal (the ATM terminal "b" in the present embodiment), needed for call control. On the basis of the message, the processor 40 conducts processing of layer 3 (call control). As a result, the processor 40 produces on the memory 41 a new SETUP message for informing the ATM terminal "b" that establishment of an information channel has been requested by the ATM terminal a.

This new SETUP message is transferred to the memory 106 via the bus 108, the interface circuit 107 and the bus 104 of FIG. 2 by the processor 40. The new SETUP message subjected to processing of the UNI-SSCF protocol by the MPU 105 is then transferred to the SSCOP processor 101 via the bus 104 and the SSCOP trailer 615 is added thereto (FIG. 10). The new SETUP message with the SSCOP trailer added thereto is transferred to the ADP processor 100 via the bus 102 and the ADP trailer 616 is added thereto. A resultant new SETUP message is segmented into one or more cells (50-1, 50-2, . . . , 50-N). The one or more cells are transmitted to the bus 15$a$ (FIG. 1). The route information field 51 of each cell has information preset therein to route each cell from the input bus 15$a$ of the ATM switch 30 to the output bus 12$a$-$j$. Furthermore, the header information field 52 of each cell has information of (VPI, VCI)=(0, 5) and other information set therein. By referring to the call control information table 42 of FIG. 3, the processor 40 specifies these route information and header information with respect to each transmission message.

As shown in FIG. 1, the cell(s) generated from the new SETUP message sent to the bus 15$a$ are transmitted to the optical fiber 11-$j$ via the ATM switch 30, the bus 12$a$-$j$ and the LIF 10-$j$ and transferred to the ATM terminal "b" (step 620).

The ATM terminal "b" transmits a CONNECT message indicating that the SETUP message (i.e., information channel setting request from the ATM terminal "a") sent at the above described step 620 is accepted (step 630). In the same way as the cells containing the messages of the steps 610 and 620, (VPI, VCI) of this CONNECT message (more precisely speaking, one or more cells containing the CONNECT message and various trailers in the information field 53 thereof) is (0, 5). In accordance with the example shown in FIG. 9, therefore, these cells of the CONNECT message which have arrived at the LIF 10-j are provided with the route information 51 for routing cells from the input port INj of the ATM switch 30 to the output port 15 and a new cell header (VPI, VCI)=(0, j) by the header separation circuit 209, the header conversion table 211, and the header insertion circuit 210 and outputted to the bus 12b-j (FIG. 1).

The cells outputted to the bus 12b-j arrive at the signal processor 1 via the OUT15 of the ATM switch 30 and the bus 15b. Thereafter, the cells are reassembled in accordance with the procedure of FIG. 10 identical to the SETUP message of the step 610 and the reassembled cells are transferred to the memory 41.

Upon recognizing the fact that the CONNECT message has arrived from the ATM terminal "b," the processor 40 determines that values other than values determined beforehand for other purposes by ITU-T recommendations and other than values already used on that line, for example, such as (VPI, VCI)=(0, 10) and (0, 12), should be used for information channels between the ATM terminals "a" and "b" and the ATM switching system 2, respectively. By using the control cell, the processor 40 writes data of the output route information and output cell header for the information channel into the LIF 10-i to which the ATM terminal "a" is connected and the header conversion tables 211-i and 211-j in the LIF 10-j to which the ATM terminal "b" is connected (step 640).

To be concrete, the processor 40 orders the control cell transmitter/receiver 103 via the bus 108, the interface circuit 107 and the bus 104 to write route information for routing information cells from the input port INi to the output port OUTj, output header information for cells of the information channel (information cells), i.e., (output VPI, VCI)=(0, 12), and other information in an area corresponding to (input VPI, VCI)=(0, 10) of the header conversion table 211-i shown in FIG. 8. The control cell transmitter/receiver 103 produces a control cell having a format shown in FIG. 6. In the route information 61, information for routing the cell from the input port IN15 to the output port OUTi is set. In the cell header 62, (output VPI, VCI) indicating that the cell is a control cell for the LIF 10-i and other information are set. In the ID 63, a number indicating that it is a write instruction for the header conversion table 211, such as 1, is set. In the input cell header 64, (input VPI, VCI)=(0, 10) and other information are set. In the output route information 65, route information for routing the information cell from the input port INi to the output port OUTj is set. In the output cell header 66, (output VPI, VCI)=(0, 12) and other information are set. In the CRC 68, a result obtained by making a calculation on four-byte cyclic code check bytes for checking whether there is a bit error and correcting it is set. Data of the output route information 65 and the output cell header 66 are data to be written into the header conversion table 211.

The control cell transmitted to the bus 15a (FIG. 1) arrives at the LIF 10-i via the ATM switch 30 and the bus 12a-i. In the LIF 10-i, the route information 61 of FIG. 6 is deleted by the route information deletion circuit 201. In the control cell separation circuit 202, only the control cell of (VPI, VCI)=(90, i) is separated and sent to the CTL 205. With respect to the header conversion table 211(-i), the CTL 205 writes output route information for information cell and data of output cell header into the area corresponding to (input VPI, VCI)=(0, 10) as shown in FIG. 8.

With respect to the header conversion table 211(-j) included in the LIF 10-j, the processor 40 similarly writes output route information (INj→OUT1) for information cell and output cell header (output VPI, VCI)=(0, 10) into the area corresponding to (input VPI, VCI)=(0, 12) as shown in FIG. 9.

To the ATM terminal "a," the processor 40 transmits a CONNECT message indicating that establishment of the information channel has been completed (step 650). This CONNECT message contains information for informing that (VPI, VCI)=(0, 10) has been allocated to cells of the information channel (information cells).

Furthermore, the processor 40 transmits a CONNECT ACK message for informing completion of information channel establishment to the ATM terminal "b" (step 660). In the same way, this CONNECT ACK message also contains information informing that (VPI, VCI)=(0, 12) has been allocated to information cells.

Thereafter, the ATM terminal "a" uses (VPI, VCI)=(0, 10) and the ATM terminal "b" uses (VPI, VCI)=(0, 12) to communicate with each other (step 670). For example, the information cell of (VPI, VCI)=(0, 10) transmitted from the ATM terminal "a" is subjected, in the header conversion table 211(-i) of the LIF 10-i, to header conversion shown in FIG. 8. In other words, route information 51 for routing the information cell from the input port INi of the ATM switch 30 to the output port OUTj is added to the information cell, and (VPI, VCI) of the cell header is rewritten to become (0, 12). The information cell thus subjected to header conversion is outputted to the bus 12b-i. The information cell thus outputted to the bus 12b-i is outputted to the bus 12a-j via the OUTj of the ATM switch 30. In the route information deletion circuit 201(-j) of the LIF 10-i, the route information 51 is deleted. The information cell is transferred to the ATM terminal "b" via the optical fiber 11-j.

In the header conversion table 211(-j) of the LIF 10-j, the information cell of (VPI, VCI)=(0, 12) transmitted from the ATM terminal "b" is subjected to header conversion shown in FIG. 9. The information cell thus subjected to header conversion is transferred to the ATM terminal "a" via the ATM switch 30 and the LIF 10-i.

Hereafter, an embodiment of an ATM switching network according to the present invention, including a combination of the above described switching system and communication devices will be described by referring to drawing.

Figure 11:
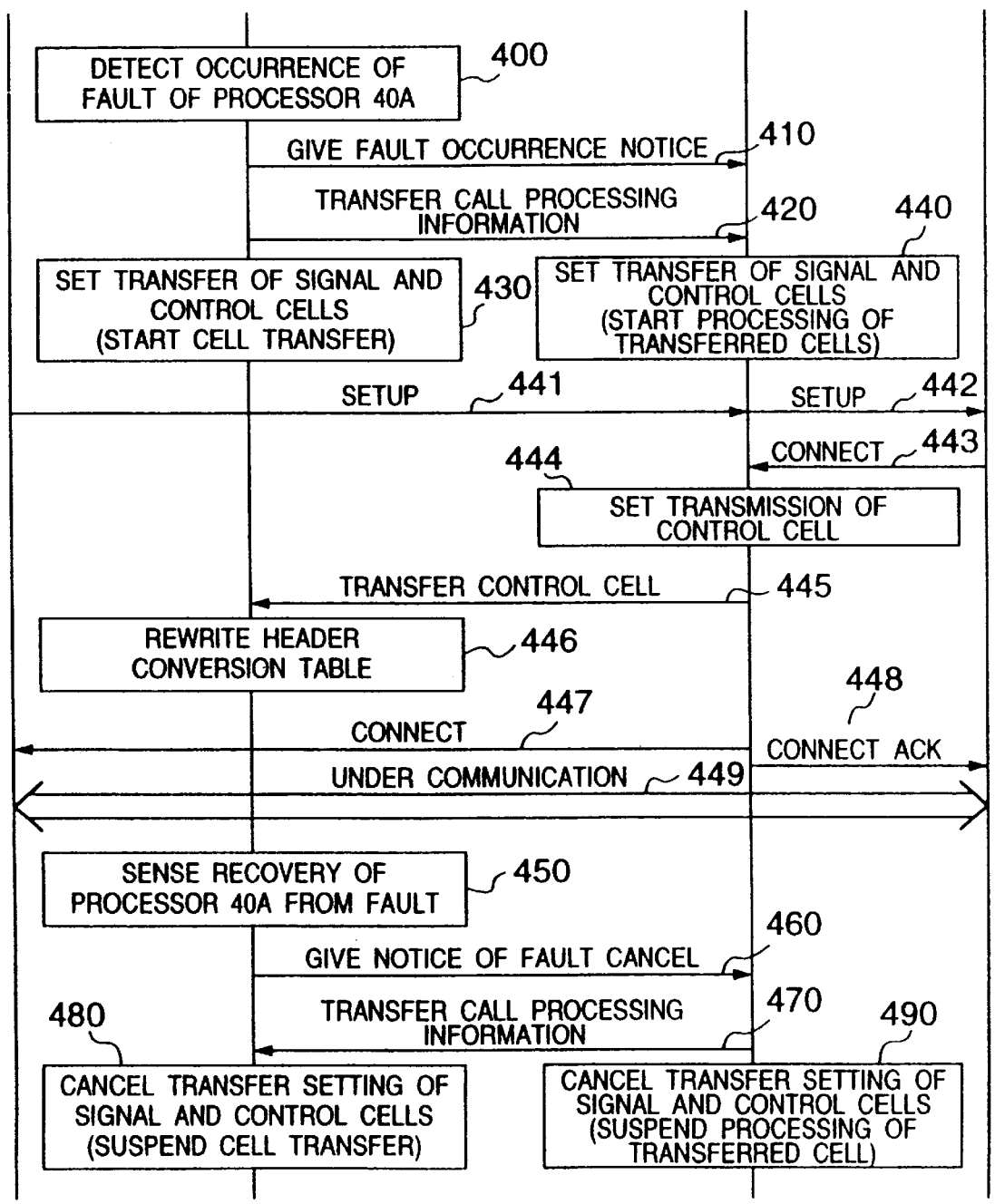
FIG. 11 is a diagram illustrating the configuration and operation of an embodiment of an ATM switching network according to the present invention.

It is now assumed in a switching network including an ATM switching system 2A and an ATM switching system 2B that a fault has occurred in a processor 40A included in the ATM switching system 2. FIG. 11 is a diagram illustrating the operation conducted when the ATM switching system 2B conducts the call control processing of the ATM switching system 2A as a substitute. Herein, faults include stoppage of processor processing caused by faults of software, besides faults of hardware. Hereafter, description will be effected by referring to FIGS. 1 through 4 as well. In the ensuing description, each functional block in the ATM switching system 2A is denoted by the numeral of the functional block shown in FIGS. 1 through 4 plus a suffix A, whereas each functional block in the ATM switching system 2B is denoted by the numeral of the functional block shown in FIGS. 1 through 4 plus a suffix B.

In FIG. 11, an ATM terminal "all is connected to an LIF 10-iA of an ATM switching system 2A via an optical fiber 11-iA. An LIF 10-jA of the ATM switching system 2A is connected to an LIF 10-1B of the ATM switching system 2B via an optical fiber 11-iA (11-1B). An ATM terminal "b" is connected to an LIF 10-jB of an ATM switching system 2B via an optical fiber 11-jB.

Prior to step 400 in FIG. 11, data for signal cells and data for control cell to be transmitted by the LIF 10 (more precisely speaking, to be transmitted by the CTL 205 in the LIF 10) were written beforehand into the header conversion table 211 included in the LIF 10 of each of the ATM switching system 2A and the ATM switching system 2B as initialization at the time of, for example, turning on of power in the same way as the example described before by referring to step 600 of FIG. 7. This will now be described by referring to FIGS. 12, 13 and 14.

FIG. 12 shows an example of data setting in a header conversion table 211-$i$A included in the LIF 10-$i$A of the ATM switching system 2A after initialization. Data for transferring a signal cell of (input VPI, VCI)=(0, 5) from the ATM terminal "a" to the signal processor 1A and transferring a control cell transmitted by the LIF 10-$i$A to the signal processor 1A are set. FIG. 13 shows an example of data setting in a header conversion table 211-$j$A included in the LIF 10-$j$A of the ATM switching system 2A after initialization. Data for transferring a signal cell of (input VPI, VCI)=(0, 5) from the ATM switching system 2B to the signal processor 1A and transferring a control cell transmitted by the LIF 10-$j$A to the signal processor 1A are set. FIG. 14 shows an example of data setting in a header conversion table 211-1B included in the LIF 10-1B of the ATM switching system 2B after initialization. Data for transferring a signal cell of (input VPI, VCI)=(0, 5) from the ATM switching system 2A to the signal processor 1B and transferring a control cell transmitted by the LIF 10-1B to the signal processor 1A are set.

The ATM switching system 2 (2A, 2B) of the present embodiment is configured so that the signal processor 1 (1A, 1B) periodically communicates with the processor 40 (40A, 40B). Therefore, the MPU 105A included in the signal processor 1A of the ATM switching system 2A periodically communicates with the processor 40A via the bus 104A, the interface circuit 107A and the bus 108A. When a fault has occurred in the processor 40A, occurrence of the fault of the processor 40A can be sensed by disappearance of a response from the processor 40A. Upon occurrence of a fault, the processor 40A may autonomously inform the MPU 105A of occurrence of the fault (step 400).

Upon sensing occurrence of the fault of the processor 40A, the MPU 105A orders the SSCOP processor 101A (FIG. 2) to transmit a message informing the ATM switching system 2B of occurrence of a fault of its own switching system as signal cells (step 410). In the same way as the SETUP message described by referring to FIG. 10, this message is segmented into one or more cells, and the one or more cells are transmitted as signal cells of (VPI, VCI)=(0, 5). These cells are transferred from the signal processor 1A to the signal processor 1B via the ATM switch 30A, the LIF 10-$j$A, optical fiber 11-$j$A (11-1B), the LIF 10-1B and the ATM switch 30B.

Subsequently, the MPU 105A transfers necessary data contained in a call control information table 42A included in a memory 41A and a memory 106A (hereafter referred to as call processing information) so that the ATM switching system 2B may take over call control processing which has been conducted by the ATM switching system 2A until then (step 420). In the same way as the fault occurrence informing message of the step 410, these pieces of information are also transmitted as signal cells of (VPI, VCI)=(0, 5). In the case where it is not necessary to take over the call control processing, i.e., in the case where every signal channel connection already established when a fault has occurred is temporarily disconnected, the step 420 is not required. In the present embodiment, an answer message for the fault occurrence notice (step 410) is not provided because processing at the time of fault occurrence is emergent. Alternatively, a procedure for transmitting a signal cell of an answer message from the ATM switching system 2B to the ATM switching system 2A may be provided between the step 410 and the step 420.

Subsequently, the MPU 105A orders the control cell transmitter/receiver 103A (FIG. 2) to transmit (1) a control cell for rewriting the header conversion table 211A included in each LIF 10A so as to transfer signal cells inputted to every LIF 10A included in the ATM switching system 2A and the control cell transmitted by each LIF 10A, to the ATM switching system 2B, and (2) a control cell for rewriting the header conversion table 211A so as to transfer signal cells and control cell transmitted from the ATM switching system 2B, to a predetermined LIF 10A included in the ATM switching system 2A (step 430).

On the other hand, the processor 40B included in the ATM switching system 2B orders the control cell transmitter/receiver 103B to transmit a control cell for rewriting the header conversion table 211-1B included in the LIF 10-1B so as to transfer signal cells (cells of (VPI, VCI)=(1, 1) through (1, $j$–1)) and control cells (cells of (VPI, VCI)=(93, 1) through (93, $j$)) transferred from the ATM switching system 2A, to the signal processor 1B. Thereafter, the processor 40B starts processing of the signal cells and control cells transferred from the ATM switching system 2A (step 440). A setting example of the header conversion table 211-$i$A after the above described step 430 has been completed is shown in FIG. 15. A setting example of the header conversion table 211-$j$A after the above described step 430 has been completed is shown in FIG. 16. A setting example of the header conversion table 211-1B after the above described step 440 has been completed is shown in FIG. 17.

With reference to FIG. 15, an area of (input VPI, VCI)=(0, 5) contains data for transferring signal cells sent from the ATM terminal "a" to the ATM switching system 2B. An area of (input VPI, VCI)=(91, i) contains data for transferring a control cell generated by the LIF 10-$i$A to the ATM switching system 2B. A value "1" of the VPI of the output cell header of the signal cell represents that the cell is a signal cell to be transferred between the ATM switching system 2A and the ATM switching system 2B. A value of VCI in the case where VPI=1 indicates a number of the LIF 10A of the ATM switching system 2A (1, . . . , $j$–1). A value "193" of the VPI of the output cell header of the signal cell represents that the cell is a control cell to be transferred from the ATM switching system 2A toward the ATM switching system 2B. Furthermore, a value of VCI in the case where VPI=93 indicates a number of the LIF 10A of the ATM switching system 2A (1, . . . , $j$).

With reference to FIG. 16, areas of (input VPI, VCI)=(1, 1) through (1, $j$–1) contain data for transferring signal cells sent from the ATM switching system 2B, to respective LIFs included in the ATM switching system 2A. An area of (input VPI, VCI)=(91, $j$) contains data for transferring a control cell generated by the LIF 10-$j$A, to the ATM switching system 2B. In addition, areas of (input VPI, VCI)=(92, 1) through (92, $j$) contain data for transferring control cells sent from the ATM switching system 2B, to respective LIFs 10A included in the ATM switching system 2A. A value "92" of the VPI of the input cell header of the control cell represents that the cell is a control cell to be transferred from the ATM switching system 2B toward the ATM switching system 2A. Furthermore, a value of VCI in the case where VPI=92 indicates a number of a destination LIF 10A of the ATM switching system 2A (1, . . . , j). In FIG. 16, an area corresponding to the signal cell of (input VPI, VCI)=(0, 5) contains data for signal cell transmitted from the signal processor 1B of the ATM switching system 2B to the signal processor 1A of the ATM switching system 2A at the time of initialization as shown in FIG. 13. This data is referred to when a signal cell transmitted at step 470 which will be described later is inputted to the LIF 10-*j*A via the optical fiber 11-*j*A (11-1B).

With reference to FIG. 17, areas of (input VPI, VCI)=(1, 1) through (1, j−1) contain data for transferring signal cells transferred from the ATM switching system 2A, to the signal processor 1B included in the ATM switching system 2B. Areas of (input VPI, VCI)=(93, 1) through (93, j) contain data for transferring control cells sent from respective LIFs 10A included in the ATM switching system 2A, to the signal processor 1B. In FIG. 17, an area corresponding to the signal cell of (input VPI, VCI)=(0, 5) contains data for signal cell transmitted from the signal processor 1A of the ATM switching system 2A to the signal processor 1B of the ATM switching system 2B at the time of initialization as shown in FIG. 14. This data is referred to when a signal cell transmitted at the step 410 or 420, or step 460 which will be described later is inputted to the LIF 10-1B via the optical fiber 11-1B (11-*j*A).

Flow of signal cells and control cells in the case where a setting request of an information channel with the ATM terminal "b" is issued from the ATM terminal "a" in the setting states of the header conversion table shown in FIGS. 15 through 17 will now be described by referring to FIGS. 11 and 18.

The ATM terminal "a" transmits a SETUP message for requesting establishment of an information channel with respect to the ATM terminal "b" as a signal cell of (VPI, VCI)=(0, 5) (step 441). This signal cell is inputted to the LIF 10-*i*A via an optical fiber 11-*ib*A (FIG. 18). By the header conversion table 211-*i*A shown in FIG. 15, route information 51 (FIG. 5) for routing the cell from INi of the ATM switch 30A to OUTj thereof is added to the signal cell and (VPI, VCI) within the header is converted to (1, i). From the signal cell outputted from the INi of the ATM switch 30A to the OUTj thereof, only the route information field is deleted in the LIF 10-*j*A. The signal cell with the route information field thus deleted is outputted to an optical fiber 11-*ja*A (11-1*b*B). The signal cell of (VPI, VCI)=(1, i) outputted to the optical fiber 11-1*b*B (11-*ja*A) is inputted to the LIF 10-1B. By the header conversion table 211-1B shown in FIG. 17, route information 51 for routing the cell from IN1 of the ATM switch 30B to OUT15 thereof is added to the signal cell. The signal cell outputted from the IN1 of the ATM switch 30B to the OUT15 is transferred to the signal processor 1B and subjected to processing similar to that of the steps 610 through 620. A SETUP message is transmitted to the ATM terminal "b" (step 442).

Upon receiving a CONNECT message (step 443) from the ATM terminal "b," the processor 40B in the ATM switching system 2B produces control cell data for establishing an information channel from the ATM terminal "a" to the ATM terminal "b" and an information channel from the ATM terminal "b" to the ATM terminal "a" on header conversion tables 211 respectively of the LIF 10-*i*A, the LIF 10-*j*A, the LIF 10-1B and the LIF 10-*j*B. The processor 40B orders a control cell transmitter/receiver 103B (FIG. 2) to transmit a control cell (step 444). The present step corresponds to the step 640 of FIG. 7.

For example, a control cell for rewriting a header conversion table 211-*i*A included in the LIF 10-*i*A is transmitted on a route hereafter described (step 445).

In the present embodiment, the signal processor 1 provides every cell to be transmitted by itself with route information 51 (FIG. 5) or route information 61 (FIG. 6). A control cell of (VPI, VCI)=(92, i) headed for the LIF 10-*i*A is provided with route information 51 for routing the cell from IN15 of the ATM switch 30B (FIG. 18) to OUT1 thereof. The control cell of (VPI, VCI)=(92, i) transmitted from the signal processor 1B is outputted from the IN15 of the ATM switch 30B to the OUT1 thereof. In the LIF 10-1B, only the route information field of the control cell of (VPI, VCI)=(92, i) is deleted. The control cell with the route information field thus deleted is outputted to an optical fiber 11-1*a*B (11-*jb*A). The control cell of (VPI, VCI)=(92, i) outputted to the optical fiber 11-*jb*A (11-1*a*B) is inputted to the LIF 10-*j*A. By the header conversion table 211-*j*A shown in FIG. 16, route information 61 for routing the cell from INj of the ATM switch 30A to OUTi thereof is added to the control cell. In addition, (VPI, VCI) in the header is converted to (90, i). The control cell outputted from the INj of the ATM switch 30A to the OUTi is subjected in the route information deletion circuit 201-*i*A (FIG. 4) included in the LIF 10-*i*A to deletion of only the route information field. The control cell is separated in the control cell separation circuit 202-*i*A and sent to the CTL 205-*i*A. By the CTL 205-*i*A, the header conversion table 211-*i*A is rewritten in the same way as the cases of FIGS. 8 and 9 (step 446).

A control cell which is transmitted by the LIF 10-*i*A and which contains information read out from the header conversion table 211 as described before by referring to the control format of FIG. 6 is transferred on a route hereafter described.

A control cell of (VPI, VCI)=(91, i) generated by the CTL 205-*i*A (FIG. 4) in the LIF 10-*i*A is sent to a header separation circuit 209-*i*A via a control cell insertion circuit 208-*i*A and furthermore sent to a header insertion circuit 210-*i*A. By the header conversion table 211-*i*A shown in FIG. 15, route information 51 for routing the cell from INi of the ATM switch 30A to OUTj thereof is added to the control cell and (VPI, VCI) within the header is converted to (93, i). From the control cell outputted from the INi of the ATM switch 30A to the OUTj thereof, only the route information field is deleted in the LIF 10-*j*A. The control cell with the route information field thus deleted is outputted to the optical fiber 11-*ja*A (11-1*b*B). The control cell of (VPI, VCI)=(93, i) outputted to the optical fiber 11-1*b*B (11-*ja*A) is inputted to the LIF 10-1B. By the header conversion table 211-1B shown in FIG. 17, route information 51 for routing the cell from IN1 of the ATM switch 30B to OUT15 thereof is added to the control cell. The control cell outputted from the IN1 of the ATM switch 30B to the OUT15 is transferred to the signal processor 1B.

In order to inform that establishment of an information channel has been completed, the processor 40B then transmits a CONNECT message to the ATM terminal "a" (step 447). Furthermore, the processor 40B transmits a CONNECT ACK message to the ATM terminal "b" (step 448).

Examples of setting of the header conversion tables 211 respectively in the LIF 10-*i*A, the LIF 10-*j*A, the LIF 10-1B and the LIF 10-*j*B after completion of the above described step 446 are shown in FIGS. 19 through 22, respectively. As (VPI, VCI) of an information cell in the present embodiment, (0, 10), (0, 11), and (0, 12) are used between the ATM terminal "a" and the ATM switching system 2A, between the ATM switching system 2A and the ATM switching system 2B, and between the ATM switching system 2B and the ATM terminal "b," respectively. By thus setting the header conversion tables of respective LIFs, communication between the ATM terminals "a" and "b" is conducted by the ATM switching system 2B (step 449).

Figure 23:
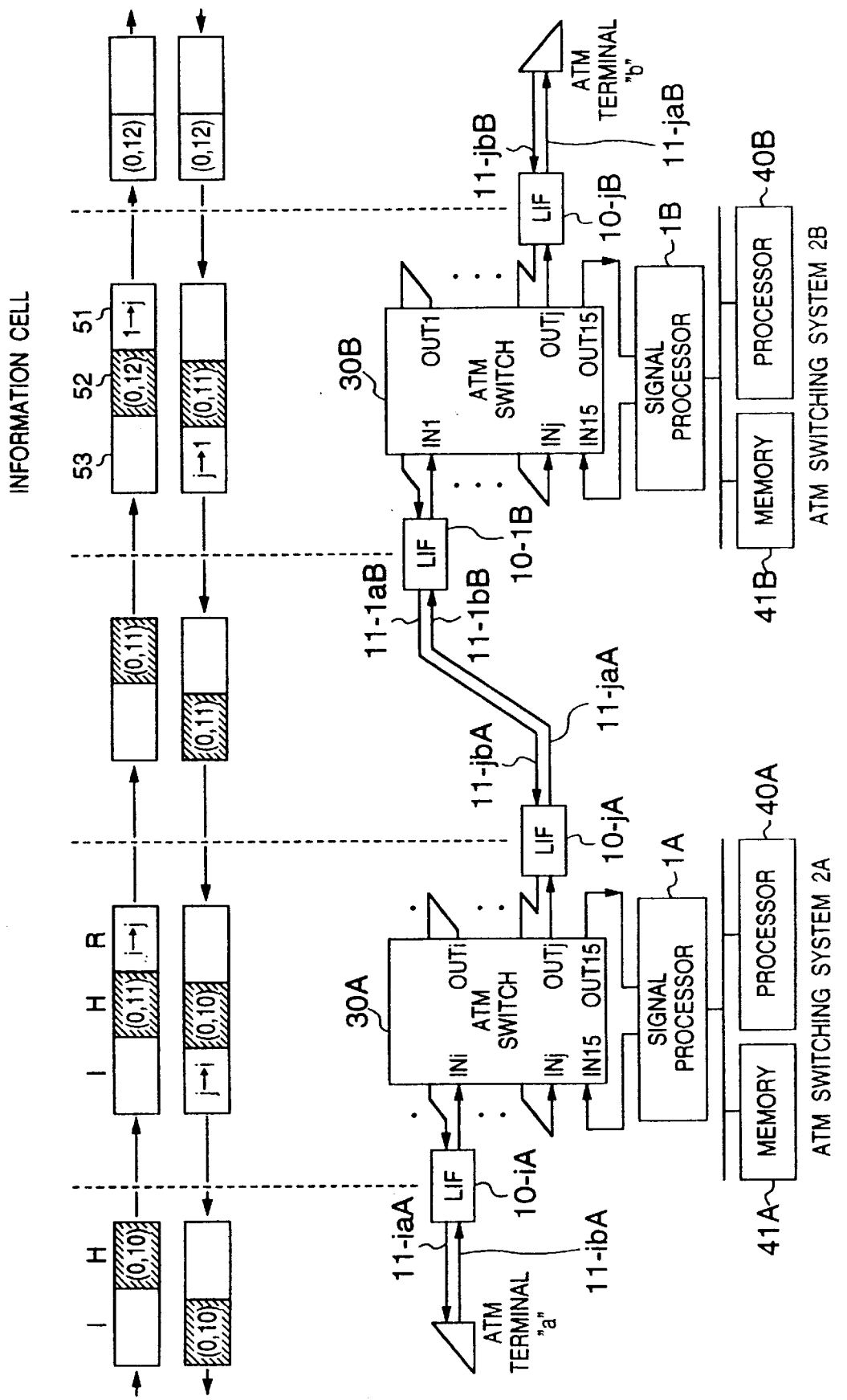
FIG. 23 is a diagram illustrating the flow of information cells in FIG. 11.

By referring to FIG. 23, flow of an information cell transmitted from the ATM terminal "a" to the ATM terminal "b" will now be described. An information cell of (VPI, VCI)=(0, 10) transmitted from the ATM terminal "a" is inputted to the LIF 10-$i$A via the optical fiber 11-$ib$A. By the header conversion table 211-$i$A shown in FIG. 19, route information 51 for routing the cell from INi of the ATM switch 30A to OUTj thereof is added to the information cell and (VPI, VCI) within the header is converted to (0, 11). From the information cell outputted from the INi of the ATM switch 30A to the OUTj thereof, only the route information field is deleted in the LIF 10-$j$A. The information cell with the route information field thus deleted is outputted to the optical fiber 11-$ja$A (11-$1b$B). The information cell of (VPI, VCI)=(0, 11) outputted to the optical fiber 11-$1b$B (11-$ja$A) is inputted to the LIF 10-1B. By the header conversion table 211-1B shown in FIG. 21, route information 51 for routing the cell from IN1 of the ATM switch 30B to OUTj thereof is added to the information cell and (VPI, VCI) within the header is converted to (0, 12). From the information cell outputted from the IN1 of the ATM switch 30B to the OUTj, only the route information field is deleted in the LIF 10-$j$B. The information cell with the route information field thus deleted is transferred to the ATM terminal "b" via an optical fiber 11-$ja$B.

By referring to FIG. 23, flow of an information cell transmitted from the ATM terminal "b" to the ATM terminal "a" will now be described. An information cell of (VPI, VCI)=(0, 12) transmitted from the ATM terminal "b" is inputted to the LIF 10-$j$B via the optical fiber 11-$jb$B. By a header conversion table 211-$j$B shown in FIG. 22, route information 51 for routing the cell from INj of the ATM switch 30B to OUT1 thereof is added to the information cell and (VPI, VCI) within the header is converted to (0, 11). From the information cell outputted from the INj of the ATM switch 30B to the OUT1 thereof, only the route information field is deleted in the LIF 10-1B. The information cell with the route information field thus deleted is outputted to the optical fiber 11-$1a$B (11-$jb$A). The information cell of (VPI, VCI)=(0, 11) outputted to the optical fiber 11-$jb$A (11-$1a$B) is inputted to the LIF 10-$j$A. By the header conversion table 211-$j$A shown in FIG. 20, route information 51 for routing the cell from INj of the ATM switch 30A to OUTi thereof is added to the information cell and (VPI, VCI) within the header is converted to (0, 10). From the information cell outputted from the INj of the ATM switch 30$a$ to the OUTi, only the route information field is deleted in the LIF 10-$i$A. The information cell with the route information field thus deleted is transferred to the ATM terminal "a" via the optical fiber 11-$ja$A.

In this way, an information channel between the ATM terminal "a" connected to the ATM switching system 2A and the ATM terminal "b" connected to the ATM switching system 2B has been established by the ATM switching system 2B. Even when a fault has occurred in the processor 40A of the ATM switching system 2A, the ATM switching system 2B conducts call control processing as a substitute for the ATM switching system 2A. Switching operation of the ATM switching system 2A is thus continued. In the ATM switching system and the ATM switching network according to the present invention, therefore, degradation in function of the switching network is prevented.

A procedure for the ATM switching system 2A to restart the call control processing in the case where the processor has recovered from a fault will now be described by referring to FIG. 11 again.

When an MPU 105A detects recovery of the processor 40A from a fault state by a notice from the processor 40A or the like (step 450), the MPU 105A transmits a message of cancel notice of the fault state to the ATM switching system 2B as a signal cell (step 460). Upon receiving this message, the processor 40B in the ATM switching system 2B transfers the call processing information received from the ATM switching system 2A at the step 420 (with the above described data of establishment of a new information channel added) to the ATM switching system 2A as a signal cell (step 470).

Upon completion of reception of call processing information from the ATM switching system 2B, the MPU 105A in the ATM switching system 2A cancels transfer setting of signal cell and control cell set at the step 430 (step 480) and informs the processor 40A of restart of call control processing. On the other hand, the processor 40B in the ATM switching system 2B cancels transfer setting of signal cell and control cell set at the step 440 and suspends call control processing for the ATM switching system 2A (step 490).

Figure 45:
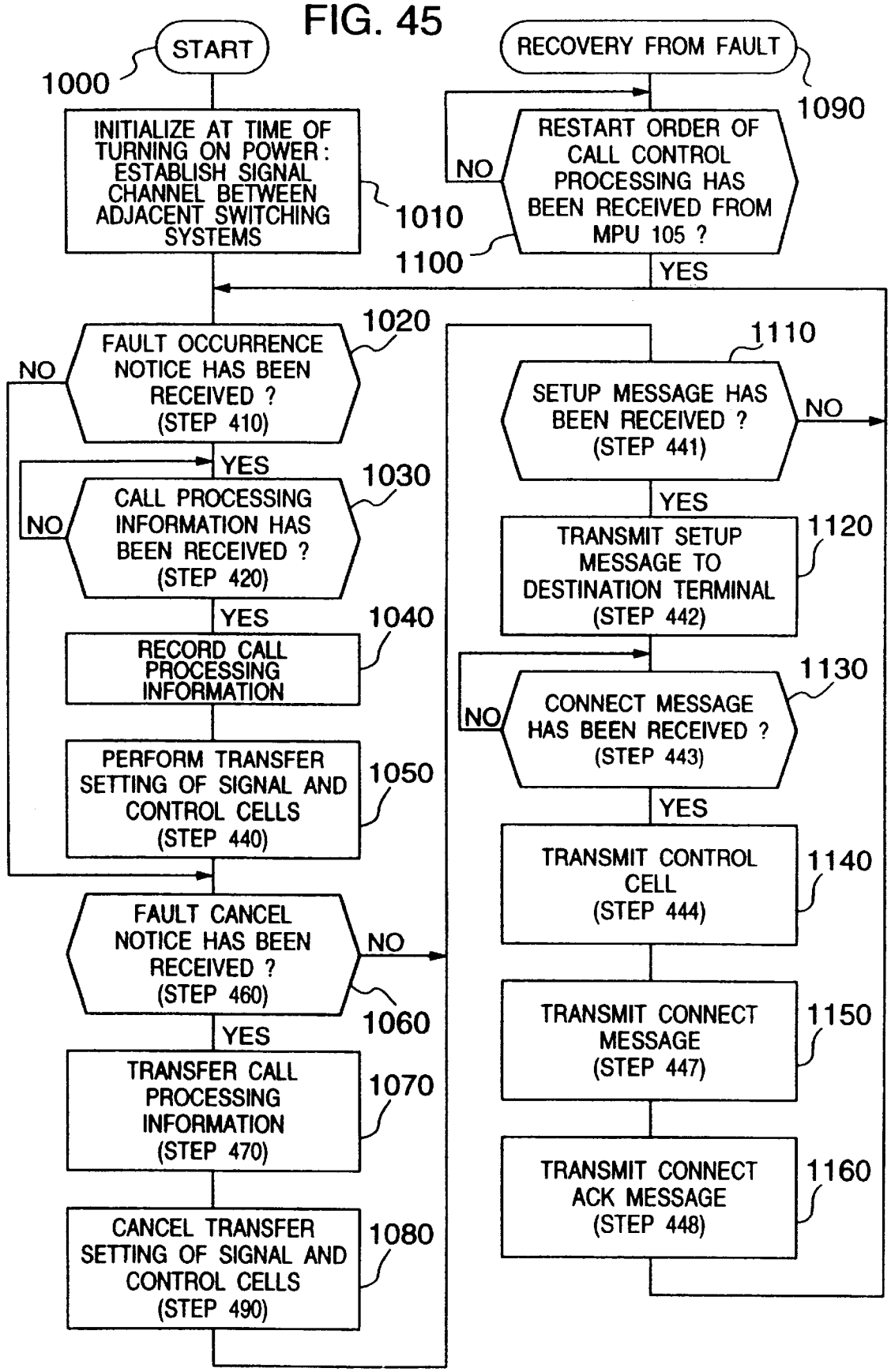
FIG. 45 is a flow chart illustrating the operation of a processor 40 shown in FIG. 11.

FIG. 45 shows an outline of operation of the processor 40 in the present embodiment. After start (step 1000), the processor 40 orders the signal processor 1 to establish a signal channel (connection) with an adjacent switching system (the switching system 2B in the present embodiment as initialization at the time of turning on power or the like (step 1010). Fault occurrence notice/cancel message which will be described later and call processing information are transferred over this signal channel (connection).

Subsequently, a received message is checked step 1020. If the received message is "fault occurrence notice (message transmitted at the step 410 in FIG. 11)," processing proceeds to step 1030. Otherwise, processing proceeds to step 1060. At step 1030, reception of call processing information transmitted subsequently (step 420) is waited. If call processing information has been received, then processing proceeds to step 1040 and the received call processing information is recorded on the memory 106 (FIG. 2) or in the call control information table 42 (FIG. 3) on the memory 41 (FIG. 1). Subsequently at step 1050, transfer setting of signal and control cells is performed and processing proceeds to step 1060.

At step 1060, it is checked whether the received message is "fault cancel notice (transmitted at step 460)." If a result is "yes," processing proceeds to step 1070. If a result is "no," processing proceeds to step 1110. At step 1070, transfer of call processing information (step 470) is performed. Then processing proceeds to step 1080 to cancel the transfer setting of signal and control cells (step 490) and processing proceeds to step 1110.

At step 1110, the received message is checked. If the received message is a SETUP message (step 441), processing proceeds to step 1120. Otherwise, processing proceeds to step 1020. At step 1120, a new SETUP message is generated and transmitted to a destination terminal (the ATM terminal "b" in the present embodiment) (step 442). Subsequently at step 1130, reception of a CONNECT message from the ATM terminal "b" is waited (step 443). If a CONNECT message has been received, processing proceeds to step 1140 and a control cell for establishing an information channel is transmitted from the control cell transmitter/receiver 103 (step 444). Subsequently, processing proceeds to step 1150 and a CONNECT message is transmitted to the ATM terminal "a" (step 447). Furthermore, processing proceeds to step 1160 and a CONNECT ACK message is transmitted to the ATM terminal "b" (step 448). After the processing of the step 1160 has been completed, processing returns to the step 1020.

In the case where the processor 40 has been recovered from the fault (step 1090), a restart order of call control processing from the MPU 105 is waited at step 1100. Upon receiving the restart order, processing proceeds to step 1020 and the check of the received message is restarted.

Figure 46:
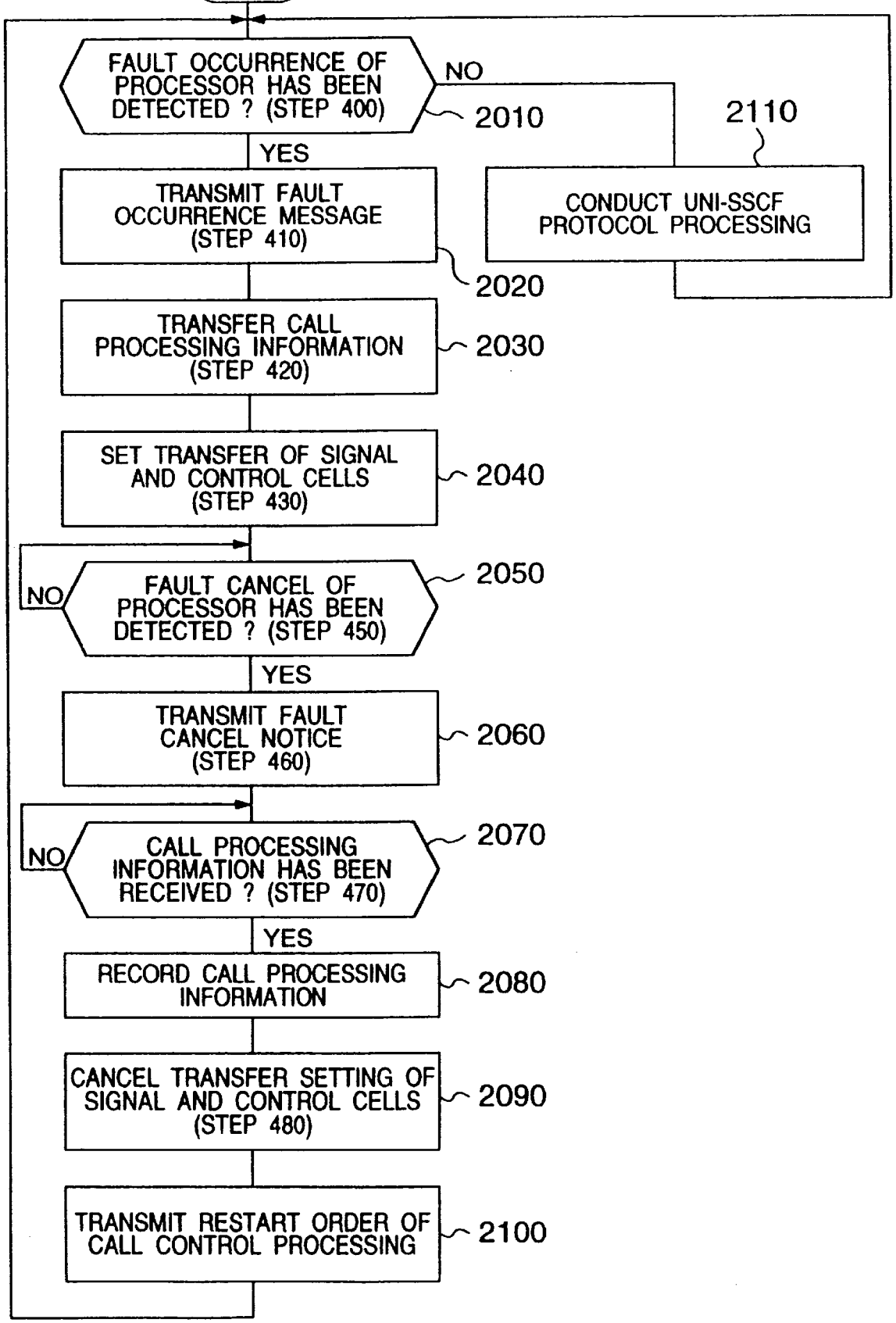
FIG. 46 is a flow chart illustrating the operation of an MPU 105 shown in FIG. 11.

FIG. 46 shows outline of operation of the MPU 105 in the present embodiment. After start (step 2000), the MPU 105 determines at step 2010 whether there is a fault in the processor 40 (step 400). If there is a fault, processing proceeds to step 2020. If there is not a fault, processing proceeds to step 2110 and processing of the UNI-SSCF protocol is conducted.

At step 2020, a message informing an adjacent switching system (the ATM switching system 2B in the present embodiment) of occurrence of a fault is transmitted (step 410). Subsequently at step 2030, call processing information is transferred (step 420). Then processing proceeds to step 2040 and transfer setting of signal and control cells is performed (step 430). Subsequently at step 2050, detection of fault cancel of the processor 40 is waited (step 450). Upon detection of the fault cancel, the MPU 105 transmits a message of fault cancel notice to the adjacent switching system at step 2060 (step 460). Subsequently at step 2070, reception of call processing information from the adjacent switching system is waited (step 470). Upon receiving the call processing information, processing proceeds to step 2080 and call processing information is recorded on the memory 106 (FIG. 2) or in the call control information table 42 (FIG. 3) on the memory 41 (FIG. 1). Then processing proceeds to step 2090 and transfer setting of signal and control cells is canceled (step 480). Subsequently, processing proceeds to step 2100 to transmit a restart order of call control processing to the processor 40 and processing returns to step 2010.

By referring to FIG. 24, another embodiment of an ATM switching network according to the present invention will now be described.

Figure 24:
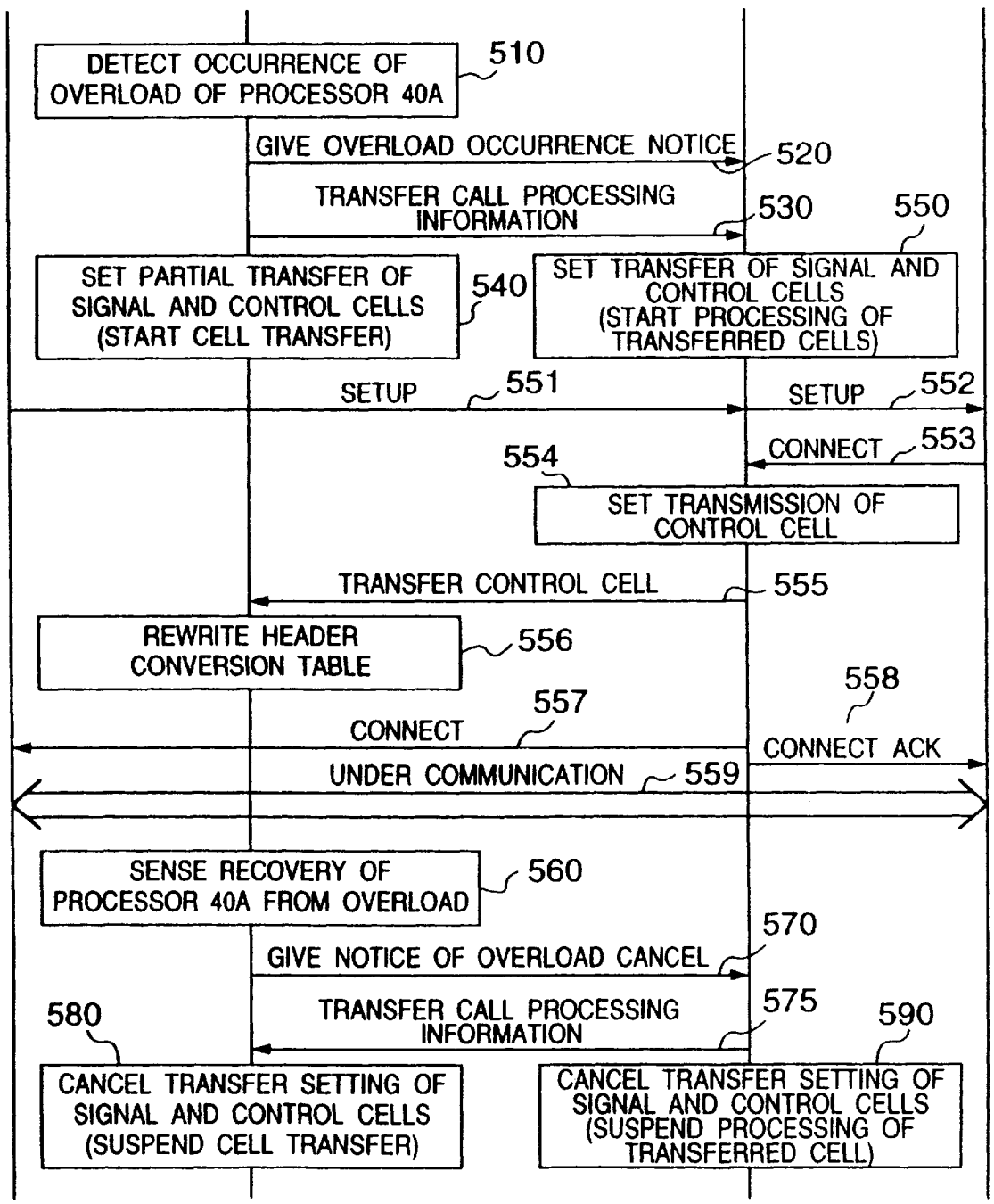
FIG. 24 is a diagram illustrating the configuration and operation of another embodiment of an ATM switching network according to the present invention.

In a configuration of an ATM switching network in which two ATM switching systems (ATM switching system 2A and ATM switching system 2B) are connected, FIG. 24 is an operation diagram illustrating operation different from that of the foregoing embodiment. To be concrete, in an ATM switching network in which the ATM switching system 2A and the ATM switching system 2B are connected, a processor 40A in the ATM switching system 2A might fall into an overload state which is one of abnormal states and thus new call control processing might become difficult. In this case, an adjacent ATM switching system 2B conducts a part of call control processing of the ATM switching system 2A as a substitute for the ATM switching system 2A. FIG. 24 illustrates an operation sequence of such an embodiment of a switching network.

With reference to FIG. 24, an ATM terminal "a" is connected to LIF 10-iA of the ATM switching system 2A via an optical fiber 11-iA. Furthermore, LIF 10-jA of the ATM switching system 2A is connected to LIF 10-1B of the ATM switching system 2B via the optical fiber 11-iA (11-1B). An ATM terminal "b" is connected to LIF 10-jB of the ATM switching system B via an optical fiber 11-jB. In the same way as the embodiment described by referring to FIG. 11, data for signal cells and control cells transmitted by LIF 10 (more precisely speaking, CTL 205 in the LIF 10) have been written beforehand into a header conversion table 211 included in the LIF 10 of each of the ATM switching system 2A and the ATM switching system 2B as initialization at the time of turning on power or the like.

When an MPU 105A recognizes that a processor 40A is in an overload state (step 510) by a notice from the processor 40A, for example, the MPU 105A transmits, as a signal cell, a message informing the ATM switching system 2B of occurrence of the overload state of the processor 40A (step 520) and requests the ATM switching system 2B to conduct call control processing as a substitute for the ATM switching system 2A. In order to make it possible for the ATM switching system 2B to conduct call control processing as a substitute, the MPU 105A transfers a part of call processing information (information of a subscriber for which the ATM switching system 2B is requested to conduct processing as a substitute) to the ATM switching system 2B (step 530).

By a procedure similar to the step 430 of the embodiment shown in FIG. 11, transfer of signal and control cells is started (step 540). By a procedure similar to the step 440 of the embodiment shown in FIG. 11, processing of signal and control cells transferred from the ATM switching system 2A is started in the ATM switching system 2B (step 550). However, the present embodiment differs from the foregoing embodiment in that signal cells inputted from all subscriber lines (optical fibers 11-1A through 11-(j−1)'A) of the ATM switching system 2A are not transferred, but only signal cells of part of subscriber lines and control cells from LIFs 10 to which the part of subscriber lines are connected are transferred.

Examples of setting in the header conversion tables 211 respectively in LIF 10-iA, LIF 10-(i+1)A, LIF 10-jA and LIF 10-1B obtained when the sequence heretofore described has been completed are shown in FIGS. 25, 26, 27 and 28, respectively. In the present embodiment, it is assumed that the ATM switching system 2B conducts processing of signal cells inputted to LIFs 10 ranging from LIF 10-1A through LIF 10-iA as a substitute for the ATM switching system 2A and the ATM switching system 2A conducts processing of signal cells inputted to LIFs 10 ranging from LIF 10-(i+1)A through LIF 10-jA.

FIG. 25 shows an example of setting of a header conversion table 211-iA in the LIF 10-iA for transferring signal and control cells. It is set by a procedure similar to the step 430 shown in FIG. 11. In the same way as the setting example shown in FIG. 15, contents of the header conversion table 211-iA are set so as to transfer a signal cell sent from an ATM terminal and a control cell transmitted from the LIF 10-iA to the ATM switching system 2B.

FIG. 26 shows an example of setting of a header conversion table 211-(i+1)A in the LIF 10-(i+1)A, for which processing of signal and control cells is conducted by its own switching system (ATM switching system 2A). It is set by a procedure (initialization) similar to that of the setting example shown in FIG. 12. Contents of the header conversion table 211-(i+1)A are set so as to transfer a signal cell sent from an ATM terminal and a control cell transmitted from the LIF 10-(i+1)A to a signal processor 1A included in the ATM switching system 2A.

FIG. 27 shows an example of setting of a header conversion table 211-jA in the LIF 10-jA, which is connected to the ATM switching system 2B via an optical fiber 11-jA (the optical fiber 11-1B). It is set by a procedure similar to the step 430 shown in FIG. 11. In the same way as the setting example shown in FIG. 16, contents of the header conversion table 211-jA are set so as to transfer a signal cell and a control cell sent from the ATM switching system 2B to each LIF included in the ATM switching system 2A. In the present embodiment, however, value ranges of input cell headers of signal and control cells set in the header conversion table are different from those of FIG. 16 because the ATM switching system 2B is requested to conduct only processing of part of subscriber lines. Furthermore, processing of a control cell transmitted by the LIF 10-jA is executed by the signal processor 1A.

FIG. 28 shows an example of setting of a header conversion table 211-1B in the LIF 10-1B, which is connected to the ATM switching system 2A via the optical fiber 11-1B (11-jA). It is set by a procedure similar to the step 440 shown in FIG. 11. In the same way as the setting example shown in FIG. 17, contents of the header conversion table 211-1B are set so as to transfer a signal cell and a control cell sent from the ATM switching system 2A to a signal processor 1B included in the ATM switching system 2B. In the present embodiment, however, value ranges of input cell headers of signal and control cells set in the header conversion table are different from those of FIG. 17 in the same way as the above described case of the header conversion table 211-jA (FIG. 16).

In the setting states of the header conversion tables shown in FIGS. 25 through 28, it is assumed that the ATM terminal "a" sends a request to establish an information channel with the ATM terminal "b." Flow of signal, control and information cells in this case (steps 551 through 559 of FIG. 24) is the same as the flow from the step 441 through the step 449 described by referring to FIG. 11.

A procedure followed in the case where the processor 40A has recovered from the overload state will now be described by referring to FIG. 24.

When an MPU 105A detects recovery of the processor 40A from the overload state by a notice from the processor 40A or the like (step 560), the MPU 105A transmits a message giving a cancel notice of the overload state to the ATM switching system 2B as a signal cell (step 570). Upon receiving this message, the processor 40B in the ATM switching system 2B transfers call processing information for the ATM switching system 2A as a signal cell (step 575). Upon completion of transfer of signal information, the MPU 105A in the ATM switching system 2A cancels transfer setting of signal and control cells set at the step 540 (step 580) and informs the processor 40A of restart of call control processing. On the other hand, the ATM switching system 2B cancels transfer setting of signal and control cells set at the step 550 and suspends call control processing for the ATM switching system 2A (step 590).

In the configuration of the present embodiment, the ATM switching system 2A takes over call control processing for the ATM switching system 2A which has been begun to be conducted by the ATM switching system 2B as a substitute when the processor 40A is recovered from the overload state. Alternatively, processing of step 570 and subsequent steps may be omitted and call control processing for the ATM switching system 2A taken by the ATM switching system 2B may be continued as it is until the processor 40B gets into the overload state. In the present embodiment, the ATM switching system 2B conducts only processing of part of subscriber lines as a substitute. Alternatively, the ATM switching system 2B may also conduct the processing of signal channels which is being processed by the ATM switching system 2A by transferring part or all of signal information of the ATM switching system 2A in the same way as the foregoing embodiment.

Another embodiment of an ATM switching network according to the present invention will now be described by referring to FIG. 29.

Figure 29:
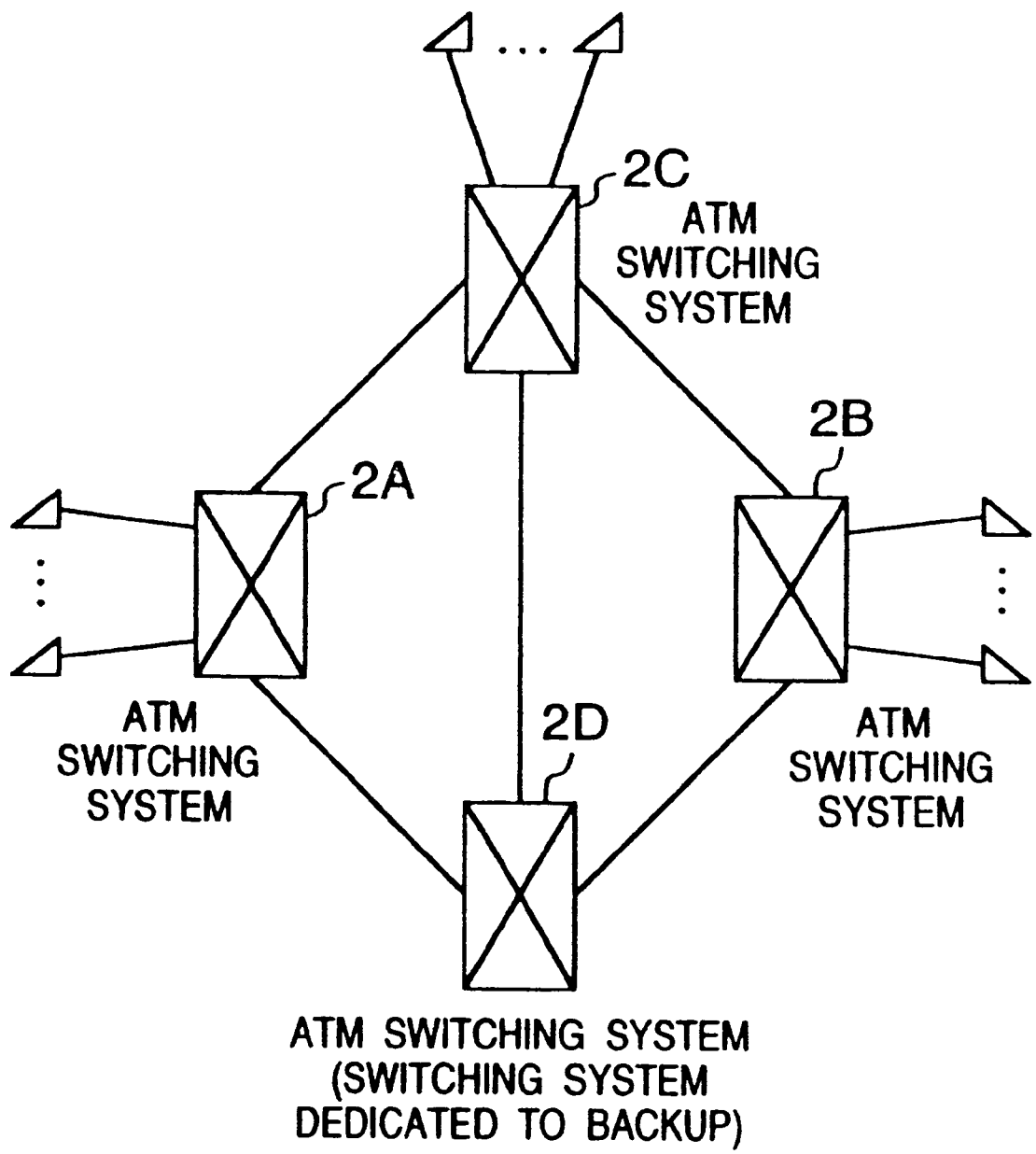
FIG. 29 is a diagram showing the configuration of another embodiment of an ATM switching network according to the present invention.

FIG. 29 is a network configuration diagram showing the configuration of an ATM switching network according to the present invention in which four ATM switching systems (ATM switching systems 2A, 2B, 2C and 2D) are connected. To be concrete, FIG. 29 shows an example of an ATM switching network including the ATM switching systems 2A, 2B, 2C and 2D and using only the ATM switching system 2D as a switching system dedicated exclusively to backup. If in the present embodiment a fault has occurred in a processor 40A of the ATM switching system 2A or the processor 40A has fallen into an overload state, the ATM switching system 2D dedicated exclusively to backup backs up the call control processing by using a procedure of one of the two embodiments shown in FIGS. 11 and 24. As for the ATM switching systems 2B and 2C as well, the ATM switching system 2D serves as a backup.

If a relation between the ATM switching system 2A and the ATM switching system 2D in FIG. 29 is replaced by the relation between the ATM switching system 2A and the ATM switching system 2B in FIG. 11 or 24, call control processing can be backed up by the same procedure as that described by referring to FIG. 11 or 24. As for a relation between the ATM switching system 2B and the ATM switching system 2D or a relation between the ATM switching system 2B and the ATM switching system 2D as well, call control processing can be backed up in the same way by using a procedure described by referring to FIG. 11 or 24.

In the present embodiment, however, there may be a case where the ATM switching system backs up call control processing of three ATM switching systems (ATM switching systems 2A, 2B and 2C) simultaneously. In order to determine in such a case as well from which ATM switching system a signal cell and a control cell have been transferred to the ATM switching system 2D or to which a signal cell and a control cell have been transmitted by the ATM switching system 2D, different values are adopted as VPI values of signal cells and control cells transferred between respective switching systems.

For example, a signal cell to be transferred between the ATM switching system 2A and the ATM switching system 2D is provided with a VPI value of 1. A control cell in a direction of ATM switching system 2D→2A is provided with a VPI value of 92. A control cell in a direction of 2A→2D is provided with a VPI value of 93.

A signal cell to be transferred between the ATM switching system 2B and the ATM switching system 2D is provided with a VPI value of 2. A control cell in a direction of ATM switching system 2D→2B is provided with a VPI value of 94. A control cell in a direction of 2B→2D is provided with a VPI value of 95.

A signal cell to be transferred between the ATM switching system 2C and the ATM switching system 2D is provided with a VPI value of 3. A control cell in a direction of ATM switching system 2D→2C is provided with a VPI value of 96. A control cell in a direction of 2C→2D is provided with a VPI value of 97.

In the present embodiment, only one ATM switching system (2D) is used as a switching system dedicated exclusively to backup. Alternatively, a plurality of switching systems may be dedicated exclusively to backup. This configuration is implemented by using the switching system 2C as a switching system for backing up the ATM switching system 2A, using the switching system 2D as a switching system for backing up the ATM switching system 2B, and backing up call control processing by using the procedure shown in FIG. 11 or 24. In an application example of the present embodiment, the signal processor 1 is not provided in the ATM switching systems 2A, 2B and 2C, but the signal processor 1 is provided only in the ATM switching system 2D. Signal processing for the ATM switching systems 2A, 2B and 2C is thus subjected to centralized 5 processing conducted in the ATM switching system 2D so as to facilitate execution of signal processing in the network. Details of this embodiment will be described later by referring to FIG. 39.

Another embodiment of an ATM switching network according to the present invention will now be described by referring to FIG. 30.

Figure 30:
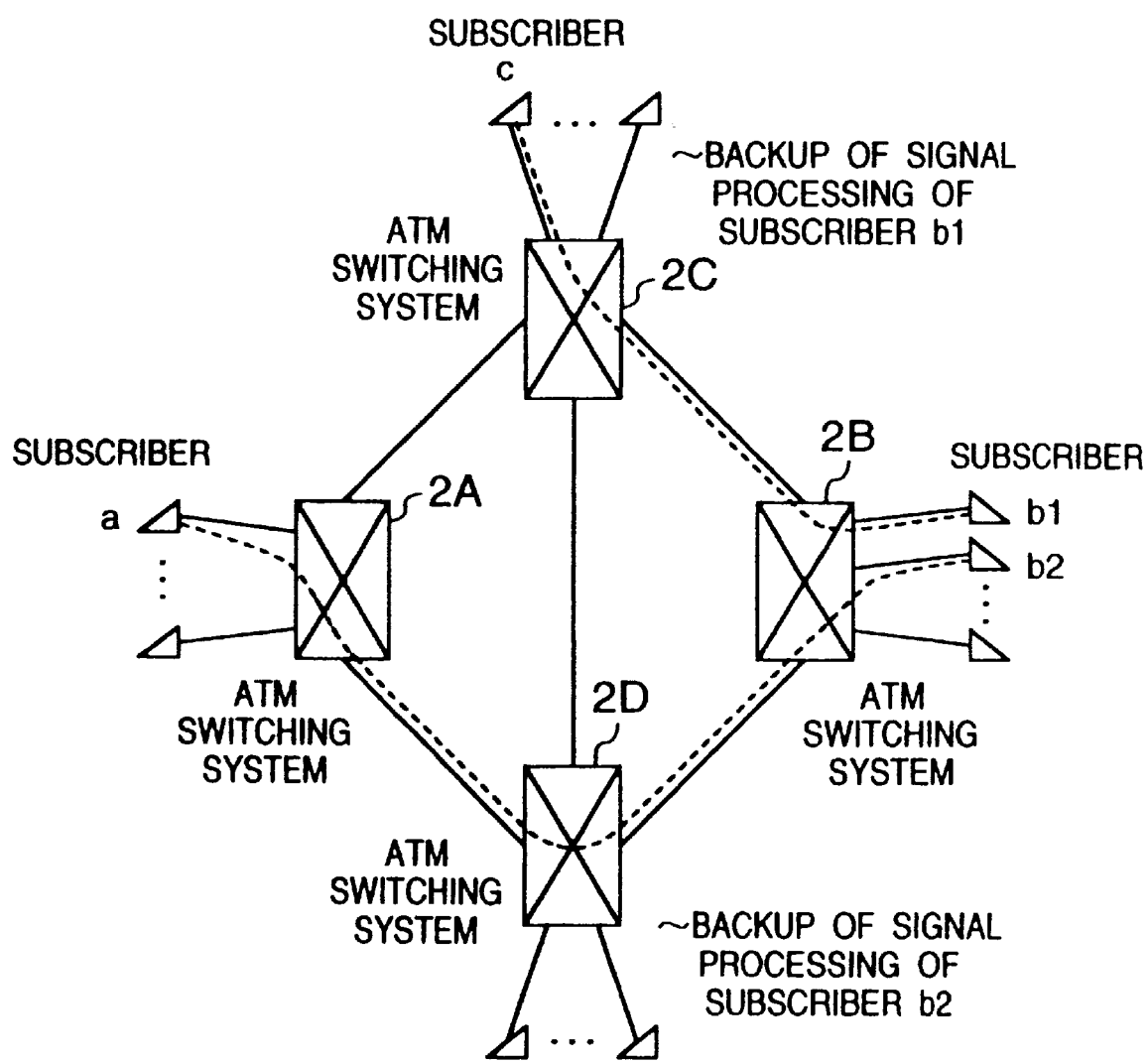
FIG. 30 is a diagram showing the configuration of another embodiment of an ATM switching network according to the present invention.

FIG. 30 is also a network configuration diagram showing the con figuration of an ATM switching network ac cording to the present invention in which four ATM switching systems (ATM switching systems 2A, 2B, 2C and 2D) are connected. To be concrete, FIG. 30 shows an example of an ATM switching network including the ATM switching systems 2A, 2B, 2C and 2D. Unlike the above described embodiment, a switching system dedicated exclusively to backup is not provided, but each switching system backs up an adjacent switching system.

In the present embodiment, a connection of a signal channel passing through the ATM switching systems 2C and 2B is established between a subscriber "c" accommodated in the ATM switching system 2C and a subscriber "b1" accommodated in the ATM switching system 2B. On a route represented by a broken line in FIG. 30, signal cells are thus transmitted and received. In addition, a connection of a signal channel passing through the ATM switching systems 2D and 2B is established between a subscriber "a" accommodated in the ATM switching system 2A and a subscriber "b2" accommodated in the ATM switching system 2B. Assuming in this state that a fault or overload state has occurred in a processor 40B of the ATM switching system 2B as in the foregoing embodiments, operation will now be described. In this case, as for the signal channel connection between the subscriber "c" and the subscriber "b1," call control processing of the ATM switching system 2B is backed up by the ATM switching system 2C. As for the signal channel connection between the subscriber "a" and the subscriber "b2," call control processing of the ATM switching system 2D is backed up by the ATM switching system 2C. As for the backup procedure, a procedure similar to that used in the foregoing embodiments is employed.

By thus making an adjacent ATM switching system along each connection back up the call control processing, it becomes unnecessary to transfer, via a plurality of switching systems, control cells for establishing and canceling an information connection. This results in an effect that backup of signal processing is facilitated.

In an application example of the present embodiment, a switching system dedicated exclusively to backup is not provided in an ATM switching network unlike the foregoing embodiment shown in FIG. 29. Respective switching systems in the network inform other switching systems of situation of their loads (the number of messages waiting for processing), or a device for monitoring the situation of loads of the switching systems is provided. Thereby, a switching system having the lightest load in the ATM switching network can be specified. The switching system having the lightest load backs up call control processing. Load distribution of call control processing in the network is thus accomplished.

The foregoing embodiments of the ATM switching network have been described with respect to ATM switching systems. However, the present invention can be applied to any communication devices so long as the communication devices have such structures that information of signal channels (call control messages) can be transferred to other switching systems and switches in its own switching system can be controlled from other switching systems.

Another embodiment of an ATM switching system according to the present invention will now be described by referring to FIG. 31.

Figure 31:
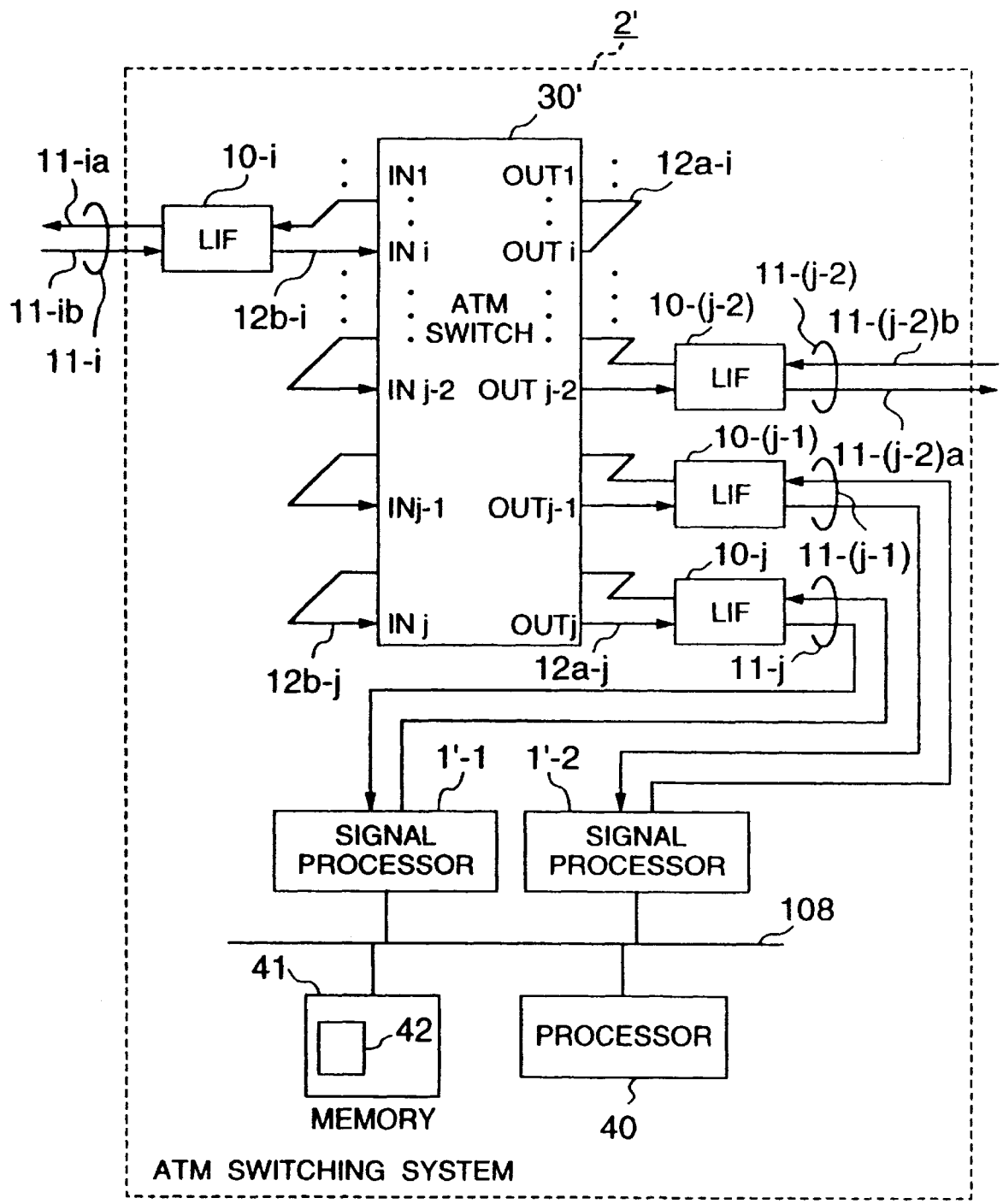
FIG. 31 is a diagram showing the configuration of another embodiment of an ATM switching network according to the present invention.

FIG. 31 is a block configuration diagram showing another configuration example of an ATM switching system used in an ATM switching network of the present invention.

An ATM switching system 2' of the present embodiment is different from the system configuration example of the ATM switching system 2 shown in FIG. 1 in the following points. Two signal processors 1'-1 and 1'-2 are respectively connected to line interface devices (LIFs) 10-$j$ and 10-($j$−1) via optical fibers 11-$i$ and 11-($j$−1) having data transmission rate of, say, 156 Mbits/sec, respectively. In addition, the above described signal processors 1'-1 and 1'-2 are connected to a processor 40 and a memory 41 via a bus 108. In the present embodiment, the number of input/output ports of an ATM switch 30' has been decided to be j for facilitating the description. However, the ATM switch 30' shown in FIG. 31 is different from the ATM switch 30 of FIG. 1 (having j+1 input/output ports) only in the number of input/output ports, and the ATM switch 30' shown in FIG. 31 has essentially the same structure as the ATM switch 30 of FIG. 1 does.

Figure 32:
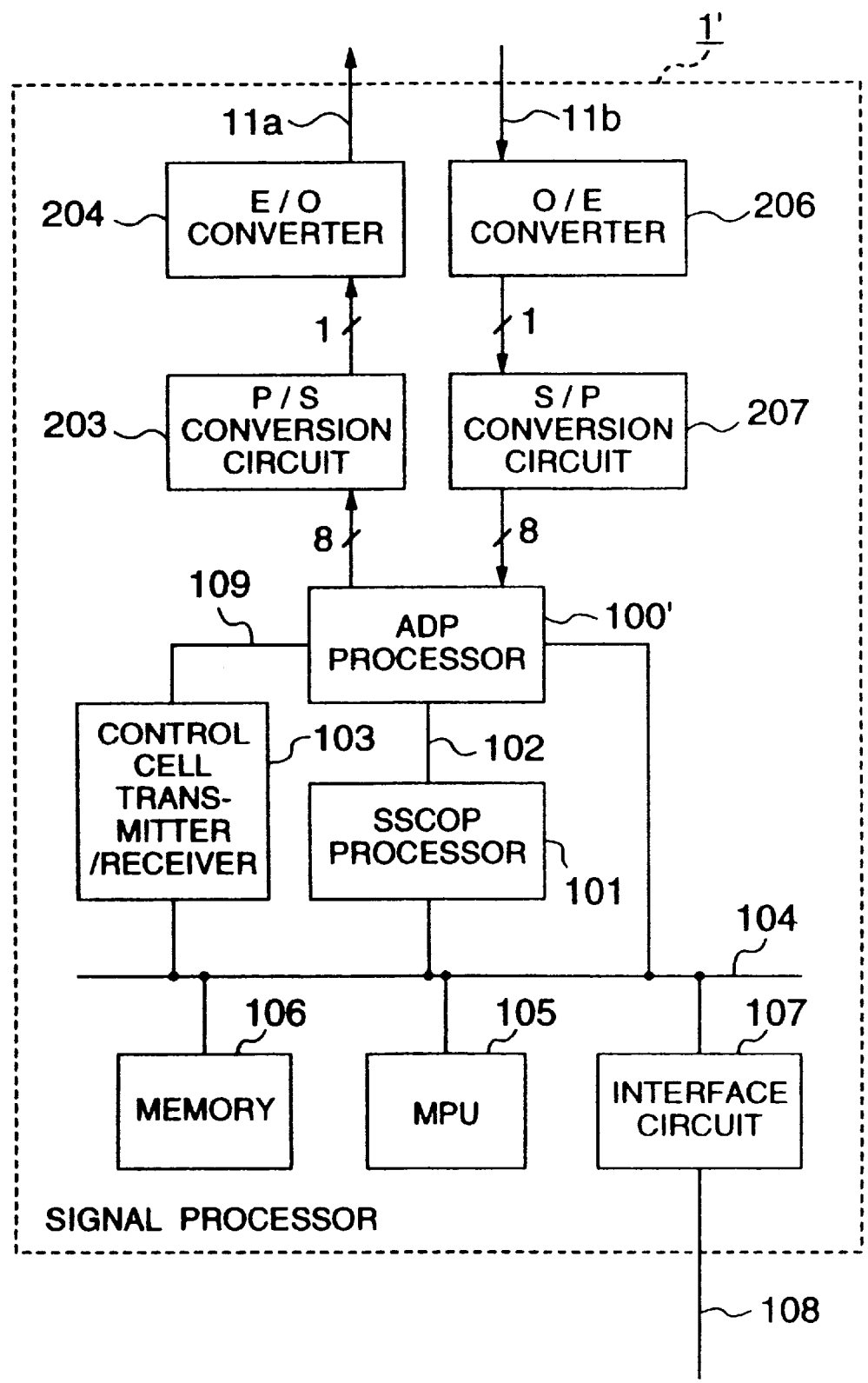
FIG. 32 is a block configuration diagram showing the configuration of a signal processor of an ATM switching system of FIG. 31.

FIG. 32 is a block configuration diagram of the signal processor 1' connected to the switching system 2'. The signal processor 1' differs from the signal processor 1 shown in FIG. 2 in the following points. An ADP processor 100' for conducting conversion processing between fixed length cells and variable length signal data is connected to a parallel-serial conversion circuit (P/S conversion circuit) 203 for outputting cell data serially bit by bit. The parallel-serial conversion circuit 203 is connected to an electrical/optical converter (E/O converter) 204 for converting the above described serial data to optical signals and outputting the optical signals to an optical fiber 11$a$ for transmission. The ADP processor 100' is connected to a serial-parallel conversion circuit (S/P conversion circuit) 207 for converting serial signals to eight-bit parallel data. The serial-parallel conversion circuit 207 is connected to an optical/electrical converter (O/E converter) 206 for converting optical cell signals inputted from the line interface device 10 via an optical fiber 11$b$ for reception to electrical signals.

The format of cells (the ordinary cell 50 of FIG. 5 and the control cell 60 of FIG. 6) transmitted/received by the ADP processor 100' shown in FIG. 32 will now be described by taking the ordinary cell shown in FIG. 5 as an example. Among cell formats, a format including the cell header 52 and the information field 53 but not including the route information 51, which is prescribed as a network interface standard in ITU-T recommendation I.361 is used. By adopting such a standard format, changes of the signal processor (such as device replacement or an installation place change) and selective combinations of a speech path portion including the ATM switch 30' and the LIF (10-1 through 10-$j$) and the signal processor 1 become high in degree of freedom. A switching system which is easy to handle with and an economical switching system can thus be constructed.

A concrete example will now be described. As in the above described configuration, a signal processor 1' is connected to the ATM switch 30' via the LIF (line interface device) 10-$j$. And the format of cells transmitted/received by the signal processor 1' is decided to be the standard cell format. Thereby, the signal processor 1' can be connected to an arbitrary line interface device 10 (10-1 through 10-$j$). In the case where the line interface device 10-$j$, for example, has become faulty, the signal processor 1'-1 can be easily reconnected to another line interface device. Furthermore, in the case where the capability of a signal processor has become insufficient because the signal processor backs up signal processing of another switching system, additional signal processors can be easily installed by additionally connecting signal processors to free LIFs 10. These effects are obtained.

FIGS. 33 through 36 show examples of setting, after initialization, of header conversion tables 211 included in LIF 10-i, LIF 10-(j–2), LIF 10-(j–1) and LIF 10-j, respectively. In the present embodiment, the signal processor 1'-1 controls header conversion tables 211 included in LIF 10-1 through LIF 10-i (where i is an integer not less than 2 and not greater than j–3) and LIF 10-j, and the signal processor 1'-2 controls header conversion tables 211 included in LIF 10-(i+1) through LIF 10-(j–1).

With reference to FIG. 33, an area corresponding to (input VPI, VCI)=(0, 5) contains data for transferring signal cells inputted via an optical fiber 11-ib to the signal processor 1'-1. An area of (input VPI, VCI)=(91, i) contains data for transferring a control cell generated by the LIF 10-i to the signal processor 1'-1.

Prior to describing an example of setting of a header conversion table 211-(j–1) shown in FIG. 35, an example of setting of a header conversion table 211-j shown in FIG. 36 will now be described.

With reference to FIG. 36, an area of (input VPI, VCI)=(90, j) contains data for control cell (output route information and output cell header) transmitted from the signal processor 1'-1 to the LIF 10-j. An area of (input VPI, VCI)=(91, j) contains data for control cell generated by the LIF 10-j and transmitted to the signal processor 1'-1. When the ATM switching system is started (at the time of power turning on, for example), these data are written by a CTL 205-j included in the LIF 10-i. In such a state that data are stored into these two areas, a control cell of (VPI, VCI)=(90, j) for writing data into the header conversion table 211-j is transmitted from the signal processor 1'-1. This control cell passes through the O/E converter (FIG. 4) included in the LIF 10-i. In a header separation circuit 209-j, a header conversion table 211-j and a header insertion circuit 210-j, output route information for routing the cell from IN; of the ATM switch 30' to OUTj thereof is added to the control cell (in accordance with data shown in FIG. 36). The control cell is then inputted from a bus 12b-j (FIG. 31) to the ATM switch 30' and outputted to an output port OUTj. Furthermore, the control cell is inputted to the LIF 10-j again via a bus 12a-j and transferred to a CTL 205-j via a route information deletion circuit 201-i and a control cell separation circuit 202-j. The CTL 205-j writes data into the header conversion table 211-j.

By the above described procedure, areas corresponding to (input VPI, VCI)=(0, 1) through (0, i) contain data for transferring signal cells sent from the signal processor 1'-1 to the LIF 10-1 through 10-i included in the ATM switching system 2' as shown in FIG. 36. Areas of (input VPI, VCI)=(90, 1) through (90, i) contain data for transferring control cells sent from the signal processor 1'-1 to the LIF 10-1 through 10-i included in the ATM switching system 2'.

As for the header conversion table 211-(j–1) shown in FIG. 35 as well, areas corresponding to (input VPI, VCI)=(0, i+1) through (0, j–2) contain data for transferring signal cells sent from the signal processor 1'-2 to LIF 10-(i+1) through the 10-(j–2) included in the ATM switching system 2' by a procedure similar to the above described setting procedure of the header conversion table 211-j. Areas corresponding to (input VPI, VCI)=(90, 1+1) through (90, j–2) contain data for transferring control cells sent from the signal processor 1'-2 to the LIF 10-(i+1) through 10-(j–2) included in the ATM switching system 2'.

An (up) control cell transmitted from the LIF 10-j (more precisely speaking, the CTL 205-j) to the signal processor 1'-1 and a (down) control cell transmitted from the signal processor 1'-1 to the LIF 10-j are transferred partially through the same route. For example, an up control cell of (VPI, VCI)=(91, j) generated by the CTL 205-j passes through a control cell insertion circuit 208-j. In the header separation circuit 209-j, the header conversion table 211-j and the header insertion circuit 210-j, output route information for routing the cell from the INj of the ATM switch 30' to the OUTj thereof is added to the up control cell (in accordance with data shown in FIG. 36). The up control cell is then inputted from the bus 12b-j to the ATM switch 30' and outputted to the output port OUTj. Furthermore, the up control cell is inputted to the LIF 10-j again via the bus 12a-j, outputted to a bus 11a-j via the route information deletion circuit 201-j, the control cell separation circuit 202-j, a P/S conversion circuit 203-j and an E/O conversion circuit 204-j, and transferred to the signal processor 1'-1. The route on which the up control cell returns from the LIF 10-j to the LIF 10-j via the ATM switch 30' partially overlaps a route of a down control cell leaving the signal processor for each LIF. In order to discriminate between an up control cell and a down cell, therefore, they are provided with different values of (VPI, VCI). Up control cells are provided with (VPI, VCI)=(91, j), whereas down control cells are provided with (VPI, VCI)=(90, j). Alternatively, by newly adding a control cell separation circuit between the S/P conversion circuit 207 and the control cell insertion circuit 208 in the line interface device (LIF) shown in FIG. 4, extracting a control cell inputted from an external device by using this newly added control cell separation circuit, and sending the extracted control cell to the CTL 205, the route of the up control cell may be separated from the route of the down control cell and the same VPI value may be used for both up and down control cells.

In the above described embodiment, two signal processors 1' are provided. In the case where the capability of signal processors becomes insufficient, however, three or more signal processors may be installed. Furthermore, in the case where a plurality of protocols must be implemented in order to construct a switching network capable of providing various communication services to subscribers accommodated in the switching network, a signal processor may be installed for each protocol. For example, two signal processors may be installed to use one as a signal processor dedicated exclusively to signal protocol processing with respect to subscribers and use the other as a signal processor dedicated exclusively to signal protocol processing with respect to other switching systems.

The ATM switching system used in the ATM switching network of the present invention may have a configuration other than that of the foregoing embodiments.

Figure 37:
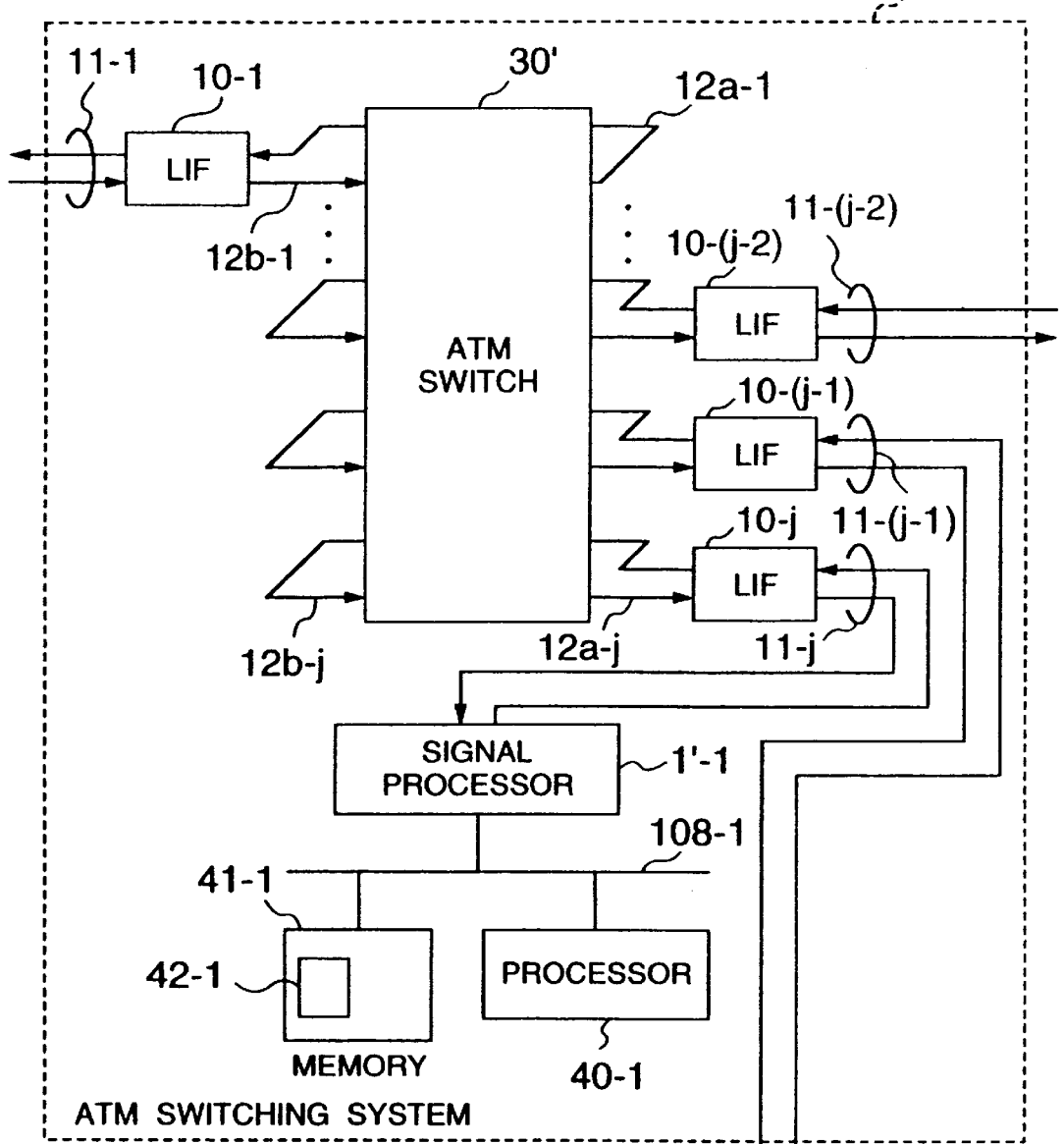
FIG. 37 is a diagram showing the configuration of another embodiment of an ATM switching system according to the present invention.

FIG. 37 is a block configuration diagram showing another configuration example of an ATM switching system used in the ATM switching network of the present invention.

In the embodiment shown in FIG. 31, a plurality of signal processors are installed in the ATM switching system. In the present embodiment, however, an external call control device 3 including a signal processor 1'-2, a memory 41-2 and a processor 40-2 is installed outside an ATM switching system 2" as shown in FIG. 37. In this way, a call control device is added or installed outside the ATM switching system. For the purpose of backing up signal processing, or in the case where the capability of signal processor or call control processor becomes insufficient, signal processing capability can be enhanced more easily than the configuration of the ATM switching system shown in FIG. 31.

FIG. 38 shows an example of setting of the header conversion table 211-j included in the LIF 10-i before the external call control device 3 is connected to an ATM switching system in FIG. 37 and after initialization of the table. It is set by a procedure similar to the setting method of the header conversion table shown in FIG. 35 or 36. Before the external call control device 3 is connected to the ATM switching system, a signal processor 1'-1 and a processor 40-1 administers (rewrites) header conversion tables included in LIF 10-1 through LIF 10-j. When the external call control device 3 is to be connected, a header conversion table 211-(j–1) included in LIF 10-(j–1), for example, is set as shown in FIG. 35 by a control cell from the signal processor 1'-1.

In the present embodiment, signal processing of the ATM switching system 2'' may be implemented by only the external call control device 3 without disposing the signal processor 1'-1, the processor 40-1 and the memory 41-1. Its concrete configuration example will be described later by referring to FIG. 42.

As apparent from the foregoing description, the ATM switching systems described by referring to FIGS. 31 through 38 also can be used as switching systems in other embodiments of an ATM switching network according to the present invention.

As another embodiment of a switching network according to the present invention, the present invention is applied to an intra-office ATM-LAN (Local Area Network), which has a configuration of a small-scale switching network having a combination of a small-scale switching system and communication devices as represented by a network in an enterprise. The configuration and operation in this case will now be described.

Figure 39:
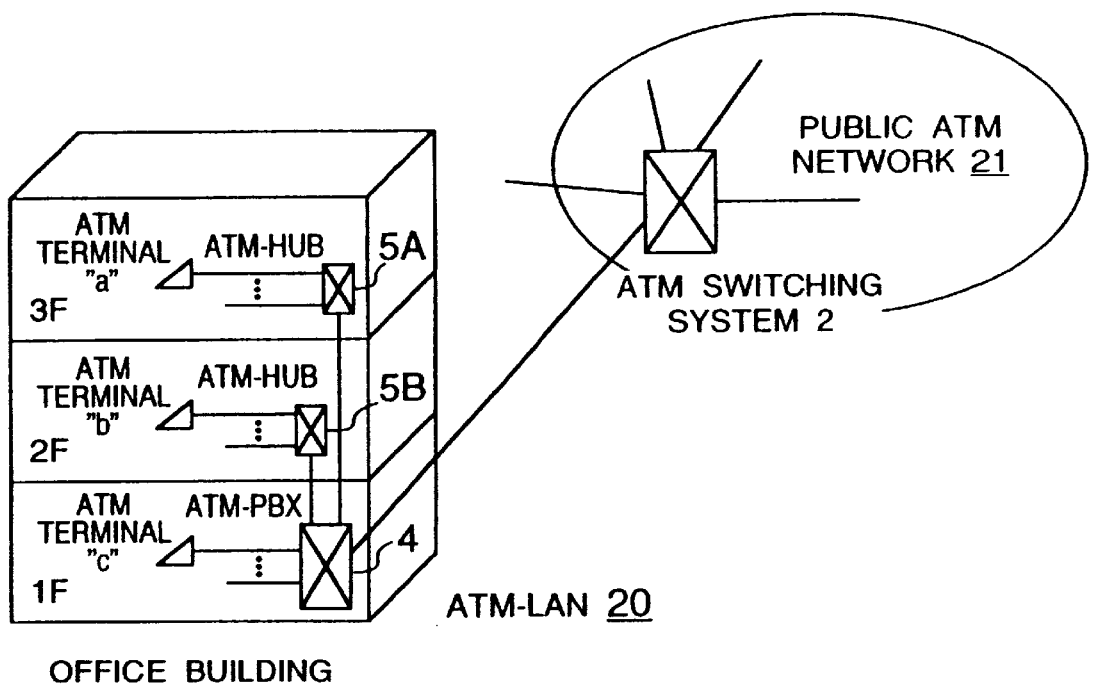
FIG. 39 is a diagram showing the configuration of another embodiment of an ATM switching system according to the present invention.

FIG. 39 is a network configuration diagram showing the configuration of an ATM-LAN which is another embodiment of an ATM switching network. With reference to FIG. 39, an ATM-LAN 20 includes an ATM-PBX 4 having a call control function, two ATM-HUBs having no call control function, a plurality of ATM terminals accommodated in the ATM-PBX 4 and the ATM-HUBs, and lines interconnecting them.

As the ATM-PBX 4 used in the present embodiment, an ATM switching system shown in FIG. 1, 31 or 37 described before by referring to foregoing embodiments is selected and disposed in the network. Among lines possessed by the ATM-PBX 4, however, an arbitrary number of lines are connected to an ATM switching system included in a public ATM switching network 21 (for example, such as the ATM switching system 2 shown in FIG. 1 in order to expand the network by connection with another communication network.

Figure 40:
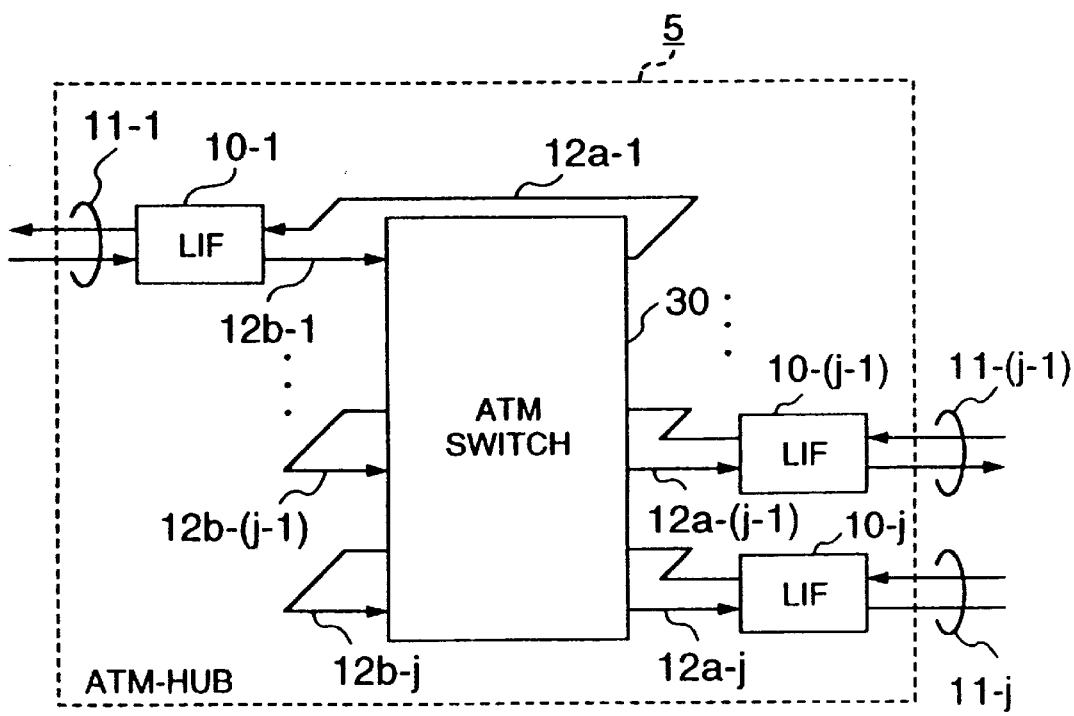
FIG. 40 is a block configuration diagram showing the configuration of an ATM-HUB illustrated in FIG. 39.

FIG. 40 is a block configuration diagram showing the system configuration of the ATM-HUB 5 used in the present embodiment. The basic configuration of the ATM-HUB 5 is equivalent to the configuration of the ATM switching system 2, 2' or 2'' referred to before in the description of the foregoing embodiments, except that the signal processor 1, the processor 40, the memory 41, and buses and LIFs 10 associated with them are deleted. The ATM-HUB 5 thus includes the ATM switch 30' (which may be the ATM switch 30) for switching fixed length cells, optical fibers 11 (11-1 through 11-j) each having a data transmission rate of 156 Mbits/sec, for example, pairs 12 (12-1 through 12-j) of transmission buses and reception buses each having an eight-bit width, for example, and line interface devices (LIFs) 10 (10-1 through 10-j) for performing conversion of optical/electrical signals and conversion of header portions for respective cells. The ATM-HUB 5 has only a switch function in order to accommodate ATM terminals and transmit/receive information between terminals. Its control is effected by an external device (ATM-PBX 4 in the present embodiment). By disposing an appropriate number of switching means each having a simple and economical configuration in appropriate places according to the scale of a switching network, a network which is easy to handle with and economical can be formed and provided even if it is a small-scale network.

Figure 41:
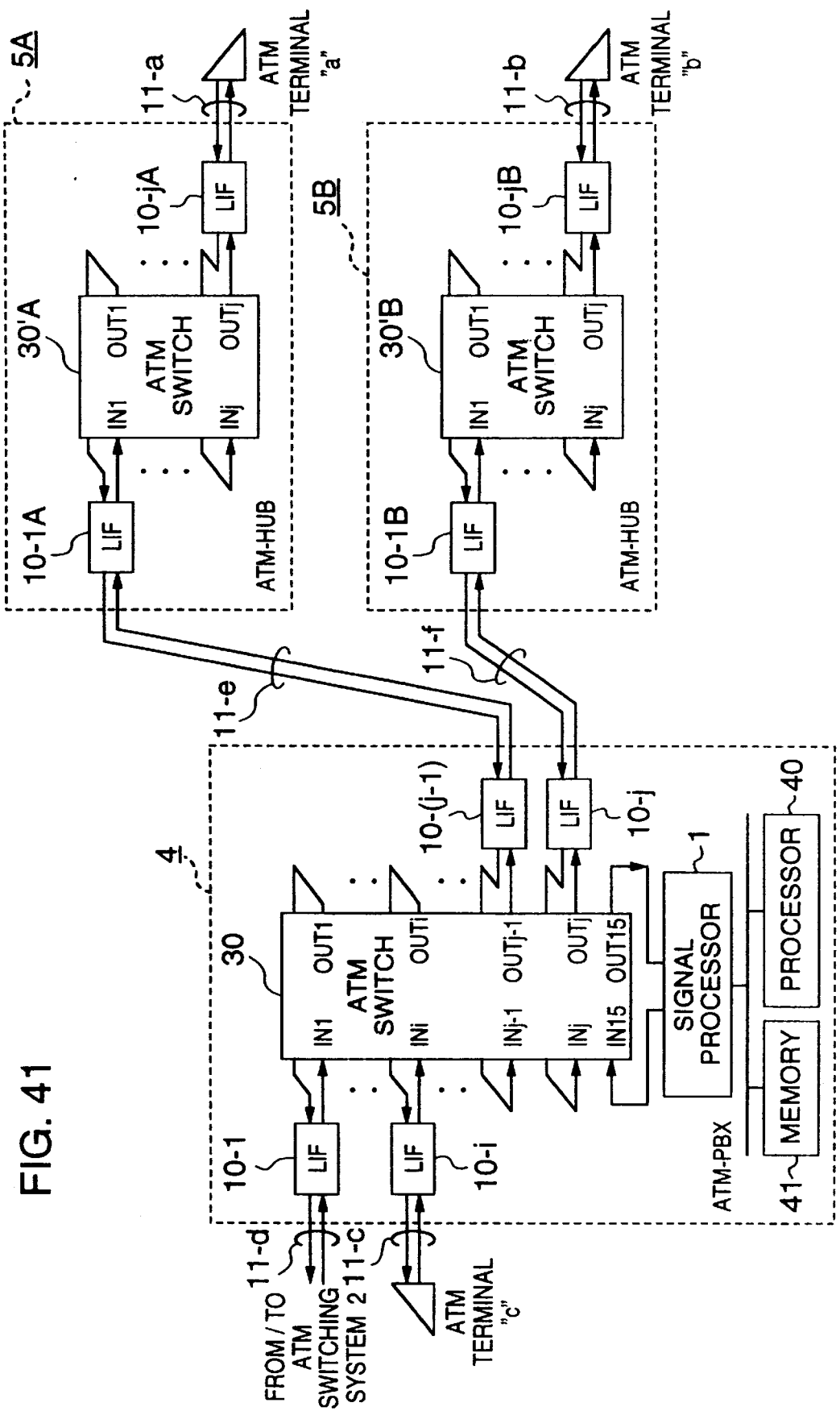
FIG. 41 is a diagram showing the detailed configuration of the switching network of FIG. 39.

FIG. 41 shows the detailed configuration of the ATM-LAN 20 illustrated in FIG. 39. With reference to FIG. 41, the ATM-PBX 4 has the same configuration as the ATM switching system 2 of FIG. 1 does. An LIF 10-1 of the ATM-PBX 4 is connected to the ATM switching system 2 via optical fibers 11-d (more precisely speaking, two optical fibers including an optical fiber 11-da for transmitting cells from the ATM-PBX 4 to the ATM switching system 2 and an optical fiber 11-db for transmitting cells in the reverse direction). An LIF 10-i of the ATM-PBX 4 is connected to an ATM terminal "c" via optical fibers 11-c. Furthermore, an LIF 10-(j–1) of the ATM-PBX 4 is connected to an LIF 10-1A of the ATM-HUB 5A via optical fibers 11-e. An LIF 10-j of the ATM-PBX 4 is connected to an LIF 10-1B of the ATM-HUB 5B via optical fibers 11-f.

Rewriting of the header conversion tables 211 (FIG. 4) in LIF 10-1A through LIF 10-jA and LIF 10-1B through LIF 10-jB respectively included in the ATM-HUBs 5A and 5B of the present embodiment is executed by a signal processor 1 and a processor included in the ATM-PBX 4 by using a procedure similar to the method described before with reference to the embodiment shown in FIG. 11 or 29 and using a control cell 60.

With reference to FIG. 11, the relation between the ATM switching system 2A and the ATM switching system 2B in such a state that processing of the steps 430 through 440 has been completed is identical to the relation between the ATM-HUB 5A and the ATM-PBX 4 in FIG. 41. In both cases, the signal processor 1 and the processor 40 included in the latter-cited switching system (PBX) exercise control over the header conversion table included in an LIF in the former-cited switching system (HUB).

In the same way as the setting examples of the header conversion tables 211 shown in FIGS. 15 and 16, or FIGS. 33 through 36, the processor 40 in the ATM-PBX 4 initializes the ATM-HUBs 5A and 5B. Specifically, the processor 40 in the ATM-PBX 4 sets the header conversion tables 211 in the LIF 10 included in each of the ATM-HUBs 5A and 5B by using control cells 60 so as to:

(1) transfer a signal cell inputted from an ATM terminal to the ATM-HUBs 5A and 5B and a control cell transmitted from the LIF 10 included in each of the ATM-HUBS 5A and SB, to the ATM-PBX 4; and (2) transfer a signal cell and a control cell sent from the ATM-PBX 4, to predetermined LIFs in the ATM-HUBs 5A and 5B.

In the case where the header conversion table 211 included in the LIF 10-jA in the ATM-HUB 5A is to be rewritten, for example, the processor 40 in the ATM-PBX 4 first orders the signal processor 1 to transmit the control cell 60. The control cell transmitted from the signal processor 1 is outputted from an output port OUTj–1 of an ATM switch 30 via an input port IN15 of the ATM switch 30. The control cell is then transferred from the LIF 10-(j–1) to the LIF 10-1A included in the ATM-HUB 5A via the optical fiber 11-e. The control cell which has arrived at the LIF 10-1A is outputted to an output port OUTj of an ATM switch 30'A via an input port IN1 of the ATM switch 30'A and transferred to the LIF 10-jA. The CTL 205 (FIG. 4) in the LIF 10-jA rewrites the header conversion table 211.

As another embodiment of a switching network according to the present invention, and as another network configuration suitable for a configuration of a small-scale switching network having a combination of a small-scale switching system and communication devices as represented by a network in an enterprise, a virtual ATM-PBX is formed. This embodiment will now be described by referring to FIG. 42.

Figure 42:
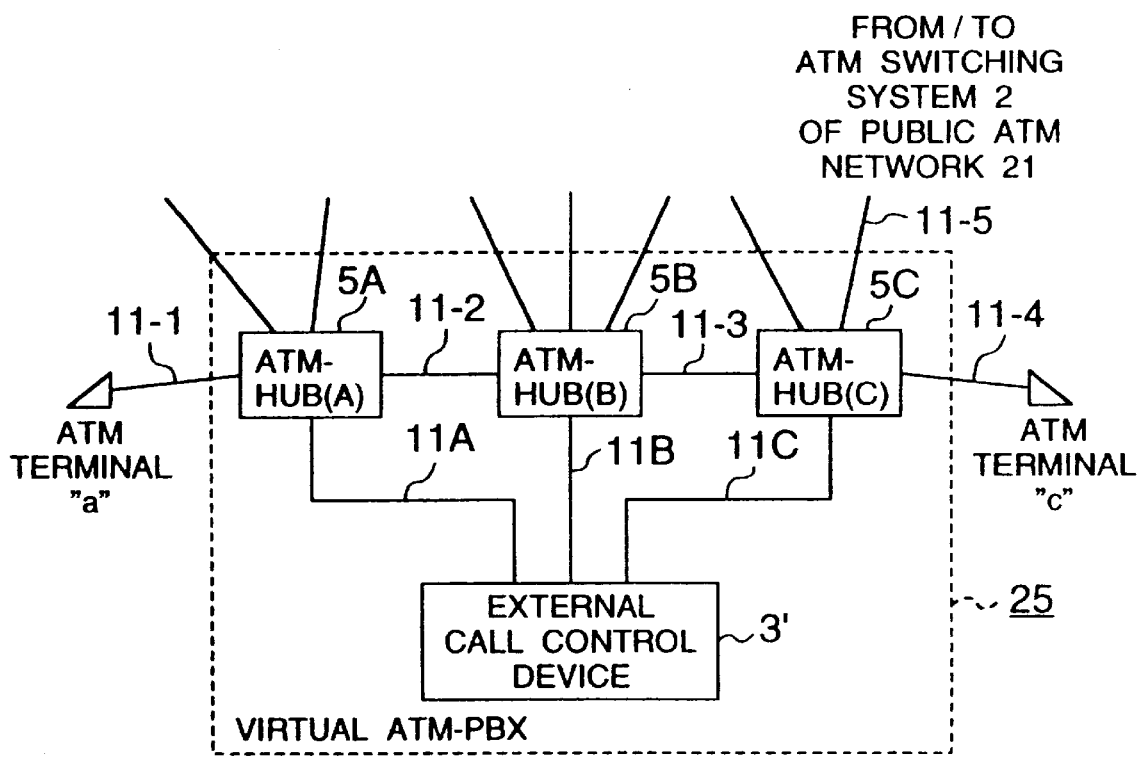
FIG. 42 is a diagram showing the configuration of another embodiment of an ATM switching network according to the present invention.

FIG. 42 is a block configuration diagram showing a configuration example of a virtual ATM-PBX according to the present invention. A virtual ATM-PBX 25 of the present embodiment includes three ATM-HUB 5 (5A, 5B and 5C) and an external call control device 3'. Between an arbitrary number of ATM terminals connected to the ATM-HUBs 5 and the ATM-HUBs 5, between ATM-HUBs 5, and between the ATM-HUBs 5 and the external call control device 3', optical fibers 11 (or copper pair lines or eight-bit width buses) are connected. In the present embodiment, arbitrary lines of the ATM-HUB 5C are connected to an ATM switching system included in a public ATM network 21 via optical fibers 11.

Figure 43:
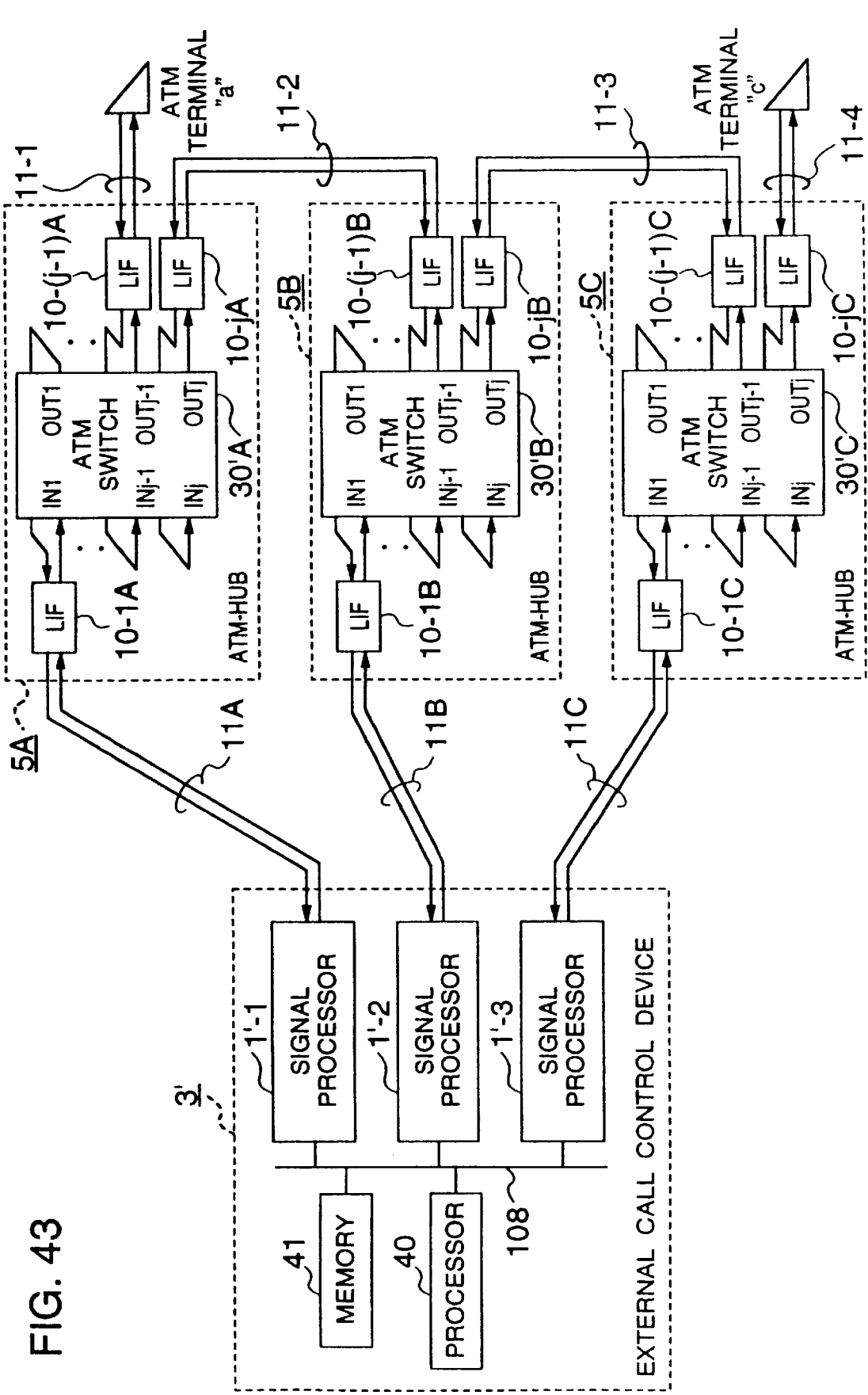
FIG. 43 is a diagram showing the detailed configuration of the switching network of FIG. 42.

FIG. 43 is a block diagram showing the detailed configuration of the virtual ATM-PBX illustrated in FIG. 42. As the ATM-HUBs 5A, 5B and 5C, the ATM-HUBs having neither signal processors nor processors therein as shown in the foregoing embodiment (FIG. 40) are used. As for the external call control device 3', two signal processors 1' are added to the external call control device 3 shown in the foregoing configuration embodiment of the ATM switching system (FIG. 37). Thus, the external call control device 3' has three signal processors, i.e., the external call control device 3' has signal processors respectively associated with ATM-HUBs.

With reference to FIG. 43, a signal processor 1'-1 is connected to an LIF 10-1A included in the ATM-HUB 5A via optical fibers 11A. A signal processor 1'-2 is connected to an LIF 10-1B included in the ATM-HUB 5B via optical fibers 11B. A signal processor 1'-3 is connected to an LIF 10-1C included in the ATM-HUB 5C via optical fibers 11C. Furthermore, an ATM terminal "a" is connected to an LIF 10-(j−1)A included in the ATM-HUB 5A via optical fibers 11-1. An ATM terminal "c" is connected to an LIF 10-jC included in the ATM-HUB 5C via optical fibers 11-4. Furthermore, an LIF 10-jA included in the ATM-HUB 5A is connected to LIF 10-(j−1)B included in the ATM-HUB 5B via optical fibers 11-2. An LIF 10-jB included in the ATM-HUB 5B is connected to LIF 10-(j−1)C included in the ATM-HUB 5C via optical fibers 11-3. Some of remaining LIFs included in the ATM-HUB 5C is connected to an ATM switching system included in the public ATM network 21 via optical fibers 11-5 shown in FIG. 42.

In the same way as the setting examples of the header conversion tables 211 shown in FIGS. 15 and 16, or FIGS. 33 through 36, the external call control device 3 initializes the virtual ATM-PBX 25, specifically, sets the header conversion tables 211 in the LIF 10 included in each of the ATM-HUBs 5A, 5B and 5C by using control cells 60 so as to:

(1) transfer a signal cell inputted from an ATM terminal (or a line connected to the ATM public network) to the ATM-HUBs 5A, 5B and 5C and a control cell transmitted from the LIF 10 included in each of the ATM-HUBs 5A, 5B and 5C, to the external call control device 3' and (2) transfer a signal cell and a control cell sent from the external call control device 3' to predetermined LIFs in the ATM-HUBs 5A, 5B and 5C.

The relation between each ATM-HUB 5 and the external call control device 3' in FIG. 43 is identical to the relation between the ATM switching system 2'' with the signal processor 1'-1, the processor 40-1 and the memory 41-1 deleted and the external call control device 3 in FIG. 37. Header conversion tables in LIFs included in each HUB (switching system) are controlled by the external call control device.

It is supposed that in this state the ATM terminal "a" transmits a SETUP message for requesting establishment of an information channel between the ATM terminal "a" and an ATM terminal "c" as a signal cell (which corresponds to the step 610 of FIG. 7). This cell is transferred to the signal processor 1'-1 of the external call control device 3' via the optical fiber 11-1, the LIF 10-(j−1)A, Inj-1 of the ATM switch 30'A, OUT1 of the ATM switch 30'A, the LIF 10-1A and the optical fiber 11A.

The signal processor 1'-1 reassembles the received signal cell into the original message (see FIG. 10) and transfers this message to the processor 40. The processor 40 analyzes contents of the received message and recognizes the message as a request from the ATM terminal "a" for connection of an information channel between the ATM terminal "a" and the ATM terminal "c." The processor 40 then generates a SETUP message for informing that there is a request for connection of an information channel between the ATM terminals "a" and "c" and orders the signal processor 1'-3 to transmit this message to the ATM terminal "c." (Note: the processor 40 stores, in the call control information table 42 (FIG. 3) included in the memory 41, information representing which line of which HUB is connected to each ATM terminal and which signal processor is connected to each HUB.) Upon receiving this order, the signal processor 1'-1 segments the message into one or more signal cells and transmit the one or more signal cells. (This corresponds to the step 620 of FIG. 7.) The transmitted signal cells are transferred to the ATM terminal "c" via the optical fiber 1C, the LIF 10-1C of the ATM-HUB 5C, In1 of the ATM switch 30'C, OUTj of the ATM switch 30'C, the LIF 10-jC and the optical fiber 11-4.

Then, the ATM terminal "c" transmits a CONNECT message representing that the establishment request of an information channel is accepted, as a signal cell. (This corresponds to the step 630 of FIG. 7.) This cell is transferred to the signal processor 1'-3 of the external call control device 3' via the optical fiber 11-4, the LIF 10-jC, Inj of the ATM switch 30'C, OUTi of the ATM switch 30'C, the LIF 10-1C and the optical fiber 11A.

The signal processor 1'-3 reassembles the received signal cell into the original message and transfers this message to the processor 40. The processor 40 analyzes contents of the received message and recognizes the message as the CONNECT message representing that the establishment request of an information channel issued from the ATM terminal "c" is accepted.

Then the processor 40 determines (VPI, VCI) values to be used for information channels respectively between the ATM terminal "a" and the ATM-HUB 5A, between the ATM-HUBs 5A and 5B, between the ATM-HUBs 5B and 5C, and between the ATM-HUB 5C and the ATM terminal "c." In order to transfer, to the ATM terminal "c" (or "a"), an information cell transmitted from the ATM terminal "a" (or "c"), the processor 40 transmits a control cell to each of the LIF 10-(j−1)A and the LIF 10-jA included in the ATM-HUB 5A, the LIF 10-(j−1)B and the LIF 10-jB included in the ATM-HUB 5B, and the LIF 10-(j−1)C and the LIF 10-jC included in the ATM-HUB 5C to order data for information channel (such as data corresponding to the area of (input VPI, VCI)=(0, 10) of FIG. 19 or (input VPI, VCI)=(0, 11) of FIG. 20) to be written into the header conversion table 211 therein. (This corresponds to the step 640 of FIG. 7.) By using a procedure similar to transmission of the above described SETUP message, the processor 40 transmits a CONNECT message to the ATM terminal "a" to inform the ATM terminal "a" of completion of establishment of the information channel and the (VPI, VCI) value for information channel. (This corresponds to the step 650 of FIG. 7.)

Furthermore, the processor 40 transmits a CONNECT ACK message to the ATM terminal "c" as well to inform the ATM terminal "c" of completion of establishment of the information channel and the (VPI, VCI) value for information channel. (This corresponds to the step 660 of FIG. 7.)

Thereafter, the ATM terminal "a" and the ATM terminal "c" mutually transmits/receives an information cell by using the allocated (VPI, VCI) value. For example, the information cell transmitted from the ATM terminal "a" is transferred to the LIF 10-jA via the optical fiber 11-1, the LIF 10-(j-1)A, the INj-1 of the ATM switch 30'A, and OUTj of the ATM switch 30'A. Furthermore, the information cell is transferred to the LIF 10-jB via the optical fiber 11-2, the LIF 10-(j-1)B, INj-1 of the ATM switch 30'B, and OUTj of the ATM switch 30'B. Furthermore, the information cell is transferred to the LIF 10-jC via the optical fiber 11-3, the LIF 10-(j-1)C, INj-1 of the ATM switch 30'C, and OUTj of the ATM switch 30'C. Furthermore, the information cell is transferred to the ATM terminal "c" via the optical fiber 11-4. The information cell transmitted from the ATM terminal "c", is transferred to the LIF 10-(j-1)C via the optical fiber 11-4, the LIF 10-jC, INj of the ATM switch 30'C, and OUTj-1 of the ATM switch 30'C. Furthermore, the information cell is transferred to the LIF 10-(j-1)B via the optical fiber 11-3, the LIF 10-jB, INj of the ATM switch 30'B, and OUTj-1 of the ATM switch 30'B. Furthermore, the information cell is transferred to the LIF 10-(j-1)A via the optical fiber 11-2, the LIF 10-jA, INj of the ATM switch 30'A, and OUTj-1 of the ATM switch 30'A. Furthermore, the information cell is transferred to the ATM terminal "a" via the optical fiber 11-1. (This corresponds to the step 670 of FIG. 7.)

In the present embodiment, the ATM-PBX 4 shown in FIG. 39 may be installed instead of the external call control device 3'.

Figure 44:
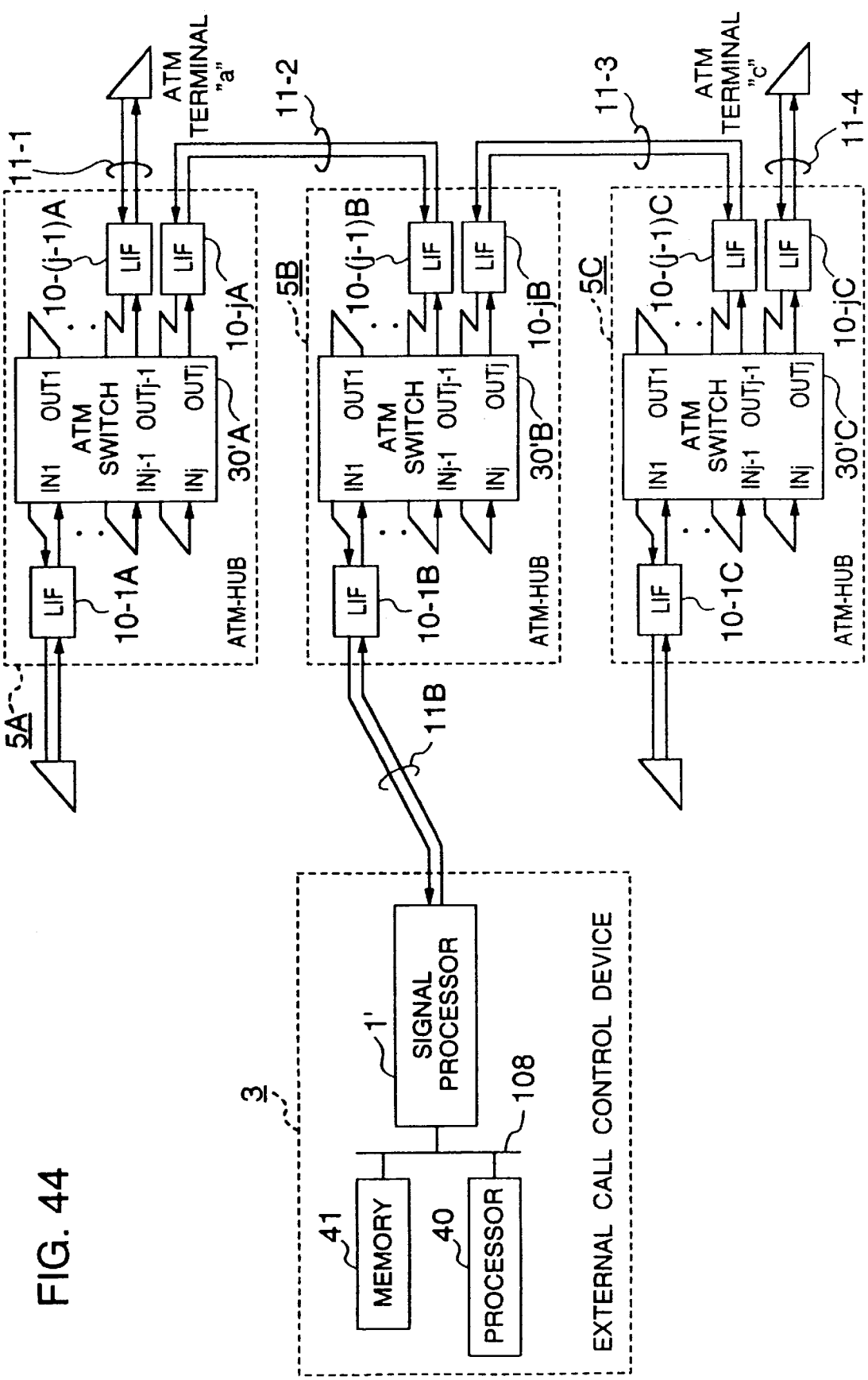
FIG. 44 is a diagram showing the detailed configuration of another switching network based upon the switching network of FIG. 42.

In another configuration of a virtual ATM-PBX according to the present invention, each ATM-HUB 5 is not connected directly to the external call control device 3', but some ATM-HUBs 5 are indirectly connected to the external call control device 3' via another ATM-HUB 5 as shown in FIG. 44. A concrete example of the configuration will now be described. In FIG. 43, the optical fiber 11A connecting the ATM-HUB 5A to the external call control device 3' and the optical fiber 11C connecting the ATM-HUB 5C to the external call control device 3' are deleted. In addition, the external call control device 3 described before by referring to FIG. 37 is used instead of the external call control device 3'. Signal cells and control cells leaving the external call control device 3 for the ATM-HUBs 5A and 5C or leaving ATM-HUBs 5A and 5C for the external call control device 3 are transferred via the ATM-HUB 5B and the optical fiber 11B.

In the present embodiment as heretofore described, one external call control device 3' sets the header conversion table in each of LIFs 10 included in a plurality of ATM-HUBs 5 having no call control functions by using control cells. Thereby, ATM-LANs and virtual ATM-PBXs can be realized inexpensively.

In addition, rewriting of the header conversion table 211 at the time of establishment or change of an information channel is also facilitated. For example, in the case where a signal processor and a processor for implementing the call control function are installed in each ATM-HUB, signal channel messages must be exchanged between processors of ATM-HUBs. In the present embodiment, however, such an exchange becomes unnecessary.

Furthermore, even if the ATM-HUBs are installed in physically separated locations such as on the first floor and on the second floor of an office building, those ATM-HUBs can be made to operate virtually as a single ATM-PBX.

In the present embodiment, a device having a signal processing function is installed in common in an ATM-LAN. Therefore, the performance of signal processing (i.e., the number of signal channel messages which can be processed per unit time) depends upon the processor capability of such a device. By using a processor of higher performance, however, the signal processing performance can be improved.

As apparent from the description heretofore given, the embodiments of the present invention described by referring to FIGS. 39 through 43 can be also applied to ATM switching systems and ATM switching networks having larger scales to be used for public communication networks.

As evident from the foregoing description, the ATM-HUB 5 accommodates terminals and cells sent from ordinary subscribers are inputted to it. It is important to provide a guard function for keeping false operations or mischief of subscribers from causing faults of the system. To take one example of the guard function, lines to which control cells can be inputted are limited by setting of header conversion tables. (With reference to FIG. 43, for example, lines via which control cells from the outside can be inputted to the ATM-HUB 5A are limited to the LIF 10-1A. Data for control cells are not provided in header conversion tables included in other LIFS.) Mischief from malicious terminals are thus prevented. In this way, a configuration for guarding ATM switching systems and a switching network can be realized.

The present invention is not limited to the above described embodiments, but includes ATM switching systems, ATM switching networks and signal processing methods of all forms which fall in appended claims.

We claim:

1. A signal processing method of an ATM switching network to which a plurality of ATM switching systems are connected, said signal processing method comprising the steps of:

installing a call control device in at least one of said ATM switching systems, said call control device comprising a signal processor for executing processing of a signal channel of layer 2 or below, a processor for executing processing of layer 3, and a memory; and making said call control device installed in said at least one of said ATM switching systems send a cell prescribed in ITU-T Recommendation I.361 to a line interface device of another one of said ATM switching systems in the network for rewriting a header conversion table of said line interface device, thereby implementing route control of information channel cells of said another one of said ATM switching systems.

2. An ATM switching system included in an ATM switching network to which a plurality of ATM switching systems are connected, said ATM switching system comprising:

an ATM switch;

a signal processor for executing processing of a signal channel of layer 2 or below; and a line interface device, said ATM switch being connected to said signal processor via said line interface device, a cell format between said line interface device and said signal processor being a standard cell format prescribed in ITU-T Recommendation I.361, additional information such as routing information in the ATM switch being not included in said standard cell format; and a header conversion table of said line interface device, which is rewritten when said line interface device receives said cell sent by said signal processor.

3. An ATM switching system according to claim 2, wherein when capability of the signal processor or the processor for executing processing of layer 3 has become insufficient, a signal processor or a call control device can be additionally installed with ease to enhance processing capability for signal channel cells.

4. An ATM switching system according to claim 2, wherein a plurality of signal processors and call control devices are installed for each protocol classification to be processed.

5. An ATM switching system according to claim 2, wherein the signal processor or the call control device can be connected to an arbitrary port of the ATM switch.

6. An ATM switching network to which a plurality of ATM switching systems are connected, at least one of said ATM switching systems comprising:

a call control device installed outside of said at least one of said ATM switching systems, said call control device comprising a signal processor for executing processing of a signal channel of layer 2 or below, a processor for executing processing of layer 3, and a memory; and a line interface device installed within said at least one of said ATM switching systems, a cell prescribed in ITU-T Recommendation I.361 for rewriting a header conversion table included in said line interface device being transmitted from said call control device to said line interface device, to exercise route control over information channel cells within said at least one of said ATM switching systems.

7. An ATM switching network according to claim 6, wherein when capability of the signal processor or the processor for executing processing of layer 3 has become insufficient, a signal processor or a call control device can be additionally installed with ease to enhance processing capability for signal channel cells.

8. An ATM switching network according to claim 6, wherein a plurality of signal processors and call control devices are installed for each protocol classification to be processed.

9. An ATM switching network according to claim 6, wherein the signal processor or the call control device can be connected to an arbitrary port of said at least one of said ATM switching systems.

10. An ATM switching system for forming an ATM switching network, said ATM switching system comprising:

switch means having a plurality of input ports and output ports, cells inputted from each input port to said switch means being selectively outputted to some output port depending upon routing information of each cell;

line interfaces respectively connected between paired input and output lines and paired said input and output ports;

a signal processor for processing control cells, said signal processor being connected to specific input and output ports of said switch means; and a call control processor connected to said signal processor, said signal processor including means responsive to a specific state of said call control processor to transmit a predetermined control cell to another switching system connected via any ones of said input and output lines and transfer call processing information and cells arriving on a signal channel thereafter.

11. An ATM switching system according to claim 10, wherein said signal processor comprises means for receiving a specific control cell which rewrites a header conversion table sent from another switching system and updates a header conversion table in one of said line interfaces.

12. An ATM switching network to which a plurality of ATM switching systems are connected, said ATM switching network comprising:

a first ATM switching system having a call control device, said call control device including a signal processor for executing processing of a signal channel of layer 2 or below, a processor for executing processing of a signal channel of layer 3, and a memory; and a second ATM switching system including line interface devices and an ATM switch, said line interface devices receiving cells prescribed in ITU-T Recommendation I.361 from said call control device of said first ATM switching system, and rewriting header conversion tables included in said line interface devices of said second ATM switching system and setting a route of information channel cells of said second ATM switching system, thereby effecting route control of information channel cells of said second ATM switching system.

13. An ATM switching system comprising:

line interface devices;

an ATM switch;

a signal processor for executing processing of a signal channel of layer or below; and a call control device, wherein said signal processor is connected to said ATM switch via said line interface devices and transmits information processed by said signal processor to said line interface devices by using cells prescribed in ITU-T Recommendation I.361 and a header conversion table in said line interface devices is rewritten according to said information of said cells, thereby signal processing of said ATM switching system is executed.

14. An ATM switching system comprising:

line interface devices;

an ATM switch; and a call control device, including a signal processor for executing processing of a signal channel of layer 2 or below, a processor for executing processing of layer 3, and a memory, wherein said call control device is installed outside a first ATM switching system including line interface devices and an ATM switch, said call control device transmits cells prescribed in ITU-T Recommendation I.361 to said line interface devices for rewriting header conversion tables included in said first ATM switching system, thereby exercising route control of information channel cells in said first ATM switching system.

15. An ATM switching system according to claim 14, wherein a plurality of said signal processors or a plurality of call control devices are installed according to cell processing capability of said ATM switching system, where each call control device includes a signal processor for executing processing of said signal channel of layer 2 or below, a processor for executing processing of layer 3, and a memory.

16. An ATM switching system according to claim 14, wherein a plurality of said signal processors or a plurality of call control devices are installed for each classification of protocols to be processed by said ATM switching system.

17. An ATM switching system according to claim 14, wherein said signal processors or call control devices are connected to arbitrary ports of said ATM switch via said line interface devices.

18. An ATM switching network comprising:
a first ATM switching system including a call control device, line interface devices, and an ATM switch, said call control device including a signal processor for executing processing of layer 2 or below, a processor for executing processing of layer 3 and a memory; and
a plurality of second ATM switching systems each including at least line interface devices and an ATM switch, each of said plurality of second ATM switching systems receiving cells prescribed in ITU-T Recommendation I.361 for rewriting header conversion tables of line interface devices included in said second ATM switching system from the call control device of said first ATM switching system, thereby exercising route control of information channel cells in said second ATM switching system.

19. An ATM switching network comprising:
a plurality of first ATM switching systems each including a plurality of line interfaces for transmitting/receiving cells to/from ATM terminal devices and other ATM switching systems, and an ATM switch connected to said line interfaces to exchange cells; and
at least one second ATM switching system including a plurality of line interfaces for transmitting/receiving cells to/from ATM terminal devices and other ATM switching systems, an ATM switch connected to said line interfaces to exchange cells, and a call control device, said call control device including a signal processor connected to said ATM switch to execute processing of a signal channel of layer 2 or below, a processor for executing processing of layer 3, and a memory, each of said first ATM switching systems being connected to said second ATM switching system and receiving cells prescribed in ITU-T Recommendation I-361 for rewriting header conversion tables of line interface devices included in each of said first ATM switching system from the call control device of said second ATM switching system, thereby establishing a route of information channel cells passing through one of said first ATM switching systems and said second ATM switching system.

20. An ATM-LAN comprising:
a plurality of ATM hubs each including a plurality of line interfaces for transmitting/receiving cells to/from ATM terminal devices and other ATM switching systems, and an ATM switch connected to said line interfaces to exchange cells; and
an ATM PBX each including a plurality of line interfaces for transmitting/receiving cells to/from said ATM hubs, ATM terminal devices and other ATM switching systems, an ATM switch connected to said line interfaces to exchange cells, and a call control device, said call control device including a signal processor connected to said ATM switch to execute processing of a signal channel of layer 2 or below, a processor for executing processing of layer 3, and a memory,
said call control device transmitting cells prescribed in ITU-T Recommendation I.361 for rewriting header conversation tables of line interfaces to line interfaces of said ATM hubs and line interfaces of said ATM PBX, thereby establishing a route of information channel cells passing through one of said ATM hubs and said ATM-LAN.

21. An ATM switching network comprising:
a plurality of ATM switching systems each including a plurality of line interfaces for transmitting/receiving cells to/from ATM terminal devices and other ATM switching systems, and an ATM switch connected to said line interfaces to exchange cells; and
a call control device including a signal processor for executing processing of a signal channel of layer 2 or below, a processor for executing processing of layer 3, and a memory, said plurality of ATM switching systems being mutually connected via said line interfaces, each of said plurality of ATM switching system being connected to said call control device, said call control device transmitting cells prescribed in ITU-T Recommendation I.361 for rewriting header conversion tables of said line interfaces to each of said plurality of ATM switching systems, thereby establishing a route of information channel cells within said plurality of ATM switching systems or via said plurality of ATM switching systems.

22. An ATM switching network comprising:
a plurality of ATM switching systems each including a plurality of line interfaces for transmitting/receiving cells to/from ATM terminal devices and other ATM switching systems, and an ATM switch connected to said line interfaces to exchange cells; and
a call control device including a signal processor connected to said plurality of ATM switching systems to execute processing of a signal channel of layer 2 or below, a processor for executing processing of layer 3, and a memory, said call control device transmitting cells prescribed in ITU-T Recommendation I.361 for rewriting header conversion tables of said line interfaces to each of said plurality of ATM switching systems, thereby establishing a route of information channel cells between said ATM terminal devices, between an ATM terminal device and another ATM switching system, and between ATM switching systems.

23. An ATM switching system comprising:
a plurality of ATM hubs each including a plurality of line interfaces for transmitting/receiving cells to/from ATM terminal devices and other ATM switching systems, and an ATM switch connected to said line interfaces to exchange cells; and
a call control device including a signal processor connected to said ATM hubs to execute processing of a signal channel of layer 2 or below, a processor for executing processing of layer 3, and a memory, said call control device transmitting cells prescribed in ITU-T Recommendation I.361 for rewriting header conversion tables of said line interfaces to each of said plurality of said ATM hubs, thereby establishing a route of information channel cells within said plurality of ATM hubs.

24. An ATM switching system comprising:
a plurality of line interfaces each including a header conversion table;
an ATM switch; and
first cell transfer control means, said first cell transfer control means including:
first signal processing means for executing processing of a signal channel of layer 2 or below;

first call control means for executing processing of layer 3 by using a call control processor; and first control cell generation means for generating control cells to rewrite header conversion tables, said first cell transfer control means being connected to said ATM switch via a first line interface, said first cell transfer control means sending cells prescribed in ITU-T Recommendation I.361 for rewriting header conversion tables of said plurality of line interfaces to each said plurality of line interfaces.

25. An ATM switching system according to claim 24, wherein said first line interface includes means for adding routing information to said control cells, said routing information determining a route within said ATM switch so as to make said control cells arrive at a desired line interface.

26. An ATM switching system according to claim 24, further comprising:

second signal processing means for executing processing of a signal channel of layer 2 or below; and second control cell generation means for generating control cells to rewrite header conversion tables;

said second signal processing means being connected to said ATM switch via a second line interface, said second signal processing means including interface means associated with said second line interface.

27. An ATM switching system according to claim 26, wherein said second line interface includes means for adding routing information to said control cells, said routing information determining a route within said ATM switch so as to make said control cells arrive at a desired line interface.

28. An ATM switching system according to claim 27, wherein said first and second signal processing means comprise means for processing mutually different protocols.

29. An ATM switching system according to claim 24, further comprising at least one second cell transfer control means installed outside said ATM switching system, said second cell transfer control means comprising:

second signal processing means for executing processing of a signal channel of layer 2 or below;

second call control means for executing processing of layer 3 by using a call control processor; and second control cell generation means for generating control cells to rewrite said header conversion tables;

said second cell transfer control means being connected to said ATM switch via a second line interface, said second cell transfer control means including interface means associated with said second line interface.

30. An ATM switching system according to claim 29, wherein said second line interface includes means for adding routing information to said control cells, said routing information determining a route within said ATM switch so as to make said control cells arrive at a desired line interface.

31. An ATM switching system according to claim 29, wherein said ATM switching system includes a plurality of said second cell transfer control means according to processing capability of said ATM switching system.

32. An ATM switching system according to claim 31, wherein said first and second cell transfer control means include means for processing mutually different protocols.

33. An ATM switching system according to claim 24, wherein said first cell transfer control means is installed outside said ATM switching system via a cell transfer line.

34. An ATM switching network including:

an ATM switching system; and at least one ATM switch means including a plurality of line interfaces having header conversion tables and an ATM switch, said ATM switching system including at least:

a plurality of line interfaces each including a header conversion table;

an ATM switch:

signal processing means for executing processing of a signal channel of layer 2 or below;

call control means for executing processing of layer 3 by using a call control processor; and control cell generation means for generating control cells to rewrite header conversion tables, an information channel route within said ATM switching network being formed by rewriting header conversion tables included in said plurality of line interfaces of said ATM switch means and said ATM switching system of said ATM switching network being formed by rewriting header conversion tables included in said plurality of line interfaces of said ATM switch means and said ATM switching system according to control cells prescribed in ITU-T Recommendation I.361 generated by said ATM switching system and sent to said plurality of line interfaces of said ATM switch means and said ATM switching system.

35. An ATM switching network according to claim 34, wherein said information channel route includes a first route between first and second ones of said ATM switch means and a second route between said ATM switching system and one of said ATM switch means.

36. An ATM switching network according to claim 34, wherein said ATM switching network comprises an ATM switching system comprising:

a plurality of line interfaces each including a header conversion table:

an ATM switch; and first cell transfer control means, said first cell transfer control means including:

first signal processing means for executing processing of a signal channel of layer 2 or below;

first call control means for executing processing of layer 3 by using a call control processor; and first control cell generation means for generating control cells to rewrite header conversion tables, said first cell transfer control means being connected to said ATM switch via a first line interface, said first cell transfer control means sending cells prescribed in ITU-T Recommendation I.361 for rewriting header conversion tables of said plurality of line interfaces to each said plurality of line interfaces.

* * * * *